United States Patent
Maguire, Jr.

(10) Patent No.: US 8,384,777 B2
(45) Date of Patent: Feb. 26, 2013

(54) APPARATUS AND METHOD FOR, IN AN IMAGE SPACE, DECODING AND PLAYING BACK A LIGHT CONTROL SIGNAL HAVING SUCCESSIVE COMPUTER GENERATED IMAGES IN CORRESPONDENCE WITH A CHANGING POINT OF VIEW ACQUIRED BY A DEVICE NAVIGATED IN MOTION IN AN OBJECT SPACE

(75) Inventor: Francis J. Maguire, Jr., Southbury, CT (US)

(73) Assignee: Simulated Percepts, LLC, Southbury, CT (US)

( * ) Notice: Subject to any disclaimer, the term of this patent is extended or adjusted under 35 U.S.C. 154(b) by 0 days.

(21) Appl. No.: 12/714,472

(22) Filed: Feb. 27, 2010

(65) Prior Publication Data

US 2010/0157045 A1    Jun. 24, 2010

Related U.S. Application Data

(63) Continuation of application No. 10/948,809, filed on Sep. 22, 2004, now Pat. No. 7,724,278, and a continuation of application No. 09/772,016, filed on Jan. 29, 2001, now Pat. No. 6,798,443, and a continuation-in-part of application No. 09/524,491, (Continued)

(51) Int. Cl.
*H04N 7/18* (2006.01)
(52) U.S. Cl. ............... 348/121; 348/115; 345/8; 345/9
(58) Field of Classification Search .............. 348/42–60, 348/113–124; 345/7–9, 630, 632, 633, 672, 345/679, 681; 434/40, 42, 43, 44, 34, 35
See application file for complete search history.

(56) References Cited

U.S. PATENT DOCUMENTS

| | | | |
|---|---|---|---|
| 2,339,780 A | 11/1940 | Huitt | |
| 2,240,398 A | 4/1941 | Huitt | |
| 3,542,457 A | 11/1970 | Balding | |
| 3,919,475 A | 11/1975 | Dukich | |
| 4,028,725 A | 6/1977 | Lewis | |

(Continued)

FOREIGN PATENT DOCUMENTS

| | | |
|---|---|---|
| JP | 05014776 A | 1/1993 |
| JP | 05244630 A | 9/1993 |

(Continued)

OTHER PUBLICATIONS

Haseba et al., "Real-Time Compositing System of a Real Camera Image and a Computer Graphic Image", Sep. 16-20, 1994, Amsterdam, IEE Conf. Pub. 1994, pp. 656-660, vol. 1994, Issue CP397, Institution of Electrical Engineers (IEE), Great Britain, 5 pages.

(Continued)

*Primary Examiner* — Michael Lee

(57) ABSTRACT

An apparatus and method in which a light control signal comprising successive computer generated images are retrieved from a storage medium and played back in an image space with a point of view with respect to a frame of reference of the image space synchronized with a changing point of view of images acquired in an object space by an image acquisition device sensed in an object space changing in its point of view with respect to a frame of reference of the object space, the frame of reference of the image space corresponding to the frame of reference of the object space.

24 Claims, 27 Drawing Sheets

Related U.S. Application Data filed on Mar. 13, 2000, now Pat. No. 7,453,451, and a continuation-in-part of application No. 08/794,122, filed on Feb. 3, 1997, now Pat. No. 6,181,371, and a continuation-in-part of application No. 08/452,510, filed on May 30, 1995, now Pat. No. 5,734,421.

(60) Provisional application No. 60/124,642, filed on Mar. 16, 1999.

(56) References Cited

U.S. PATENT DOCUMENTS

| | | | |
|---|---|---|---|
| 4,084,184 A | 4/1978 | Crain | |
| 4,181,408 A | 1/1980 | Senders | |
| 4,300,818 A | 11/1981 | Schachar | |
| 4,348,186 A | 9/1982 | Harvey | |
| 4,349,815 A | 9/1982 | Spooner | |
| 4,431,278 A | 2/1984 | Nohda | |
| 4,513,317 A | 4/1985 | Ruoff | |
| 4,621,283 A | 11/1986 | Feinbloom | |
| 4,651,201 A | 3/1987 | Schoolman | |
| 4,819,064 A | 4/1989 | Diner | |
| 4,984,179 A | 1/1991 | Waldern | |
| 5,072,218 A | 12/1991 | Spero | |
| 5,125,733 A | 6/1992 | Lee | |
| 5,175,616 A | 12/1992 | Milgram | |
| 5,252,070 A | 10/1993 | Jarrett | |
| 5,252,950 A | 10/1993 | Saunders | |
| 5,262,867 A | 11/1993 | Kojima | |
| 5,287,437 A | 2/1994 | Deering | |
| 5,291,234 A | 3/1994 | Shindo | |
| 5,305,012 A | 4/1994 | Faris | |
| 5,317,689 A | 5/1994 | Nack | |
| 5,320,534 A | 6/1994 | Thomas | |
| 5,363,241 A | 11/1994 | Hegg | |
| 5,365,370 A | 11/1994 | Hudgins | |
| 5,420,637 A | 5/1995 | Zeevi | |
| 5,436,638 A | 7/1995 | Bolas | |
| 5,479,597 A | 12/1995 | Fellous | |
| 5,499,138 A | 3/1996 | Iba | |
| 5,502,482 A | 3/1996 | Graham | |
| 5,515,130 A | 5/1996 | Tsukahara | |
| 5,526,183 A | 6/1996 | Chen | |
| 5,543,968 A | 8/1996 | Freeman | |
| 5,546,224 A | 8/1996 | Yokota | |
| 5,561,537 A | 10/1996 | Aritake | |
| 5,583,795 A | 12/1996 | Smyth | |
| 5,635,947 A | 6/1997 | Iwamoto | |
| 5,642,302 A | 6/1997 | Dumont | |
| 5,726,670 A | 3/1998 | Tabata | |
| 5,751,259 A | 5/1998 | Iwamoto | |
| 5,767,821 A | 6/1998 | Palsgard | |
| 5,796,991 A * | 8/1998 | Shimizu | 703/1 |
| 5,857,121 A | 1/1999 | Arai | |
| 5,883,670 A * | 3/1999 | Sporer et al. | 375/240.25 |
| 5,917,553 A | 6/1999 | Honey et al. | |
| 5,953,076 A | 9/1999 | Astle et al. | |
| 6,016,159 A * | 1/2000 | Faris | 348/57 |
| 6,020,931 A | 2/2000 | Bilbrey et al. | |
| 6,100,925 A | 8/2000 | Rosser et al. | |
| 6,359,621 B1 * | 3/2002 | Maeda et al. | 345/473 |
| 6,507,359 B1 * | 1/2003 | Muramoto et al. | 348/47 |
| 6,556,722 B1 | 4/2003 | Russell et al. | |
| 7,050,102 B1 | 5/2006 | Vincent | |

FOREIGN PATENT DOCUMENTS

JP 07146501 A 6/1995

OTHER PUBLICATIONS

G.A. Thomas, "Motion-compensated matteing", Sep. 16-20, 1994, Amsterdam, IEE Conf. Pub. 1994, pp. 651-655, vol. 1994, Issue CP397, Institution of Electrical Engineers (IEE), Great Britain, 5 pages.
Shimoda et al., "New Chroma-key imaging Technique with Hi-Vision Background", Dec. 1989, IEEE Transactions on Broadcasting, pp. 357-361, vol. 35, No. 4, 5 pages.
M. Hayashi, K. Fukui, and Y. Ito, "Image Compositing System Capable of Long-Range Camera Movement," Proc. ACM Multimedia 96, ACM Press, New York, Nov. 1996, pp. 153-161.
M. Hayashi et al, "Desktop Virtual Studio System," IEEE Trans. on Broadcasting, Vol. 42, No. 4, Sep. 1996, pp. 278-284.
S. Gibbs et al., "Interaction in the Virtual Studio," Computer Graphics, Nov. 1996, pp. 29-32.
S.E, Chen, "QuickTime VR—An Image-Based Approach to Virtual Environment Navigation," Computer Graphics (Proc. Siggraph 95), Aug. 1995, pp. 29-38.
Patent Abstracts of Japan, Publication No. 05014776 A, Jan. 22, 1993, 1 page.
Patent Abstracts of Japan, Publication No. 05244630 A, Sep. 21, 1993, 1 page.
Patent Abstracts of Japan, Publication No. 07146501 A, Jun. 6, 1995, 1 page.
Routsis et al., "Real-Time Camera Tracking Server on the ELSET Accelerator," Proc. European Workshop "Combined Real and Synthetic Image Processing for Broadcast and Video Production", Nov. 23-24, 1994, Springer-Verlag 1995, pp. 84-95.
Ogor, "Joint Estimation of Depth maps and camera motion in the construction of 3D Models from a Mobile Camera," Proc. European Workshop "Combined Real and Synthetic Image Processing for Broadcast and Video Production", Nov. 23-24, 1994, Springer-Verlag 1995, pp. 147-163.
G.A. Thomas, "Global Motion Estimation for Registering Real and Synthetic Images," Proc. European Workshop "Combined Real and Synthetic Image Processing for Broadcast and Video Production", Nov. 23-24, 1994, Springer-Verlag 1995, pp. 75-83.
A.V. Sahiner et al., "A Parallel Accelerator for Using Synthetic Images in TV and Video Production," Proc. European Workshop "Combined Real and Synthetic Image Processing for Broadcast and Video Production", Nov. 23-24, 1994, Springer-Verlag 1995, pp. 13-25.
L. Blonde, "The MONA LISA Project, General Presentation," Proc. European Workshop "Combined Real and Synthetic Image Processing for Broadcast and Video Production", Nov. 23-24, 1994, Springer-Verlag 1995, pp. 3-10.
Blonde et al., "A Virtual Studio for Live Broadcasting: The Mona Lisa Project," IEEE Multimedia, Summer 1996, vol. 3, Issue 2, pp. 18-29.

* cited by examiner

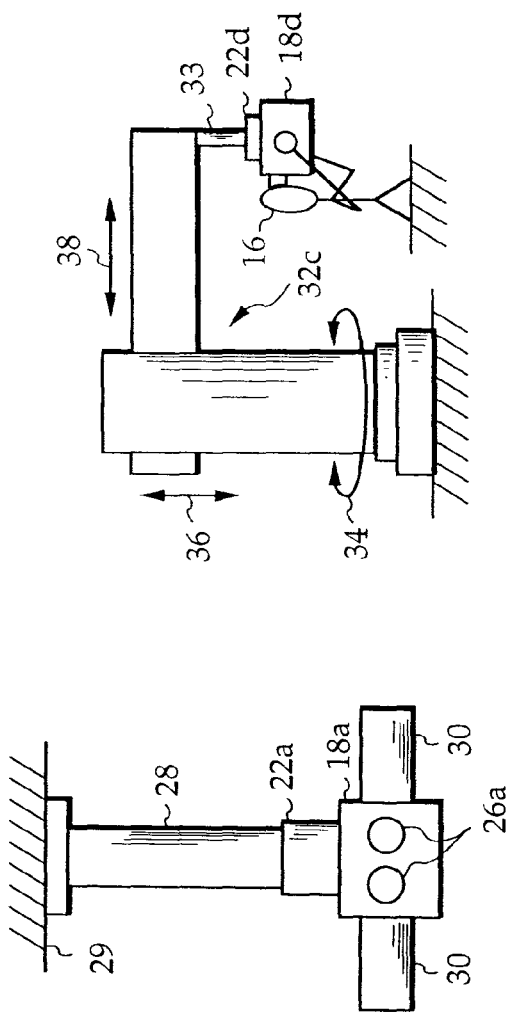
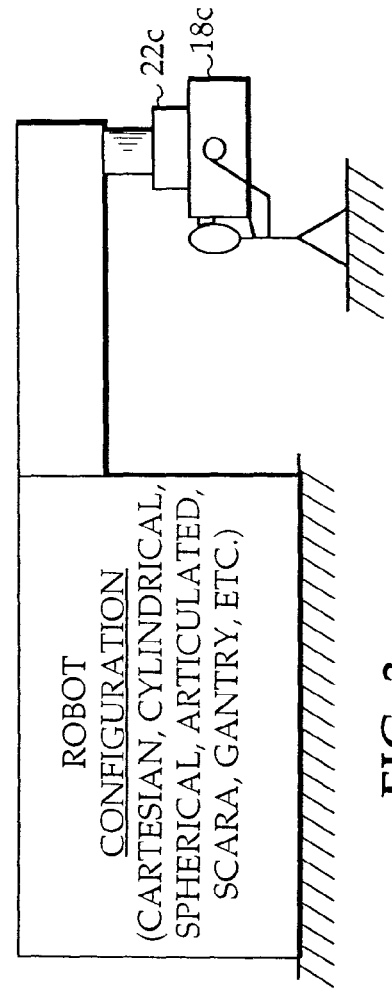

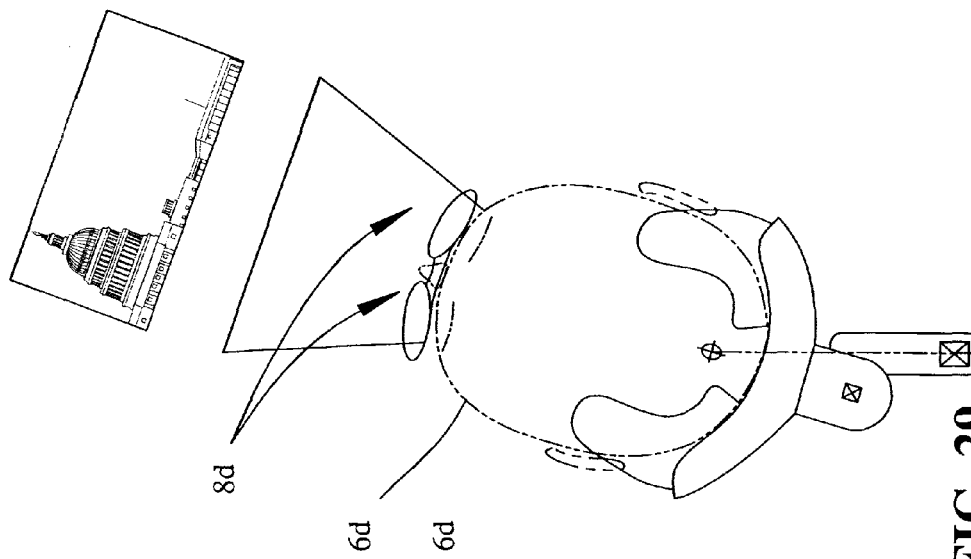
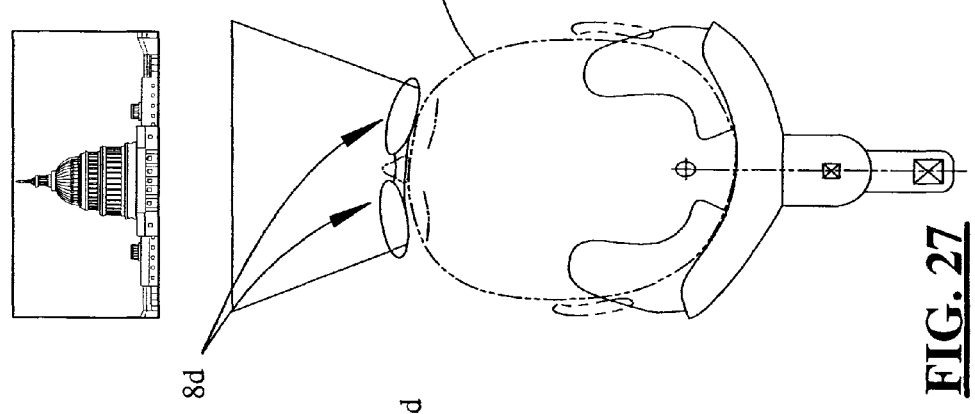
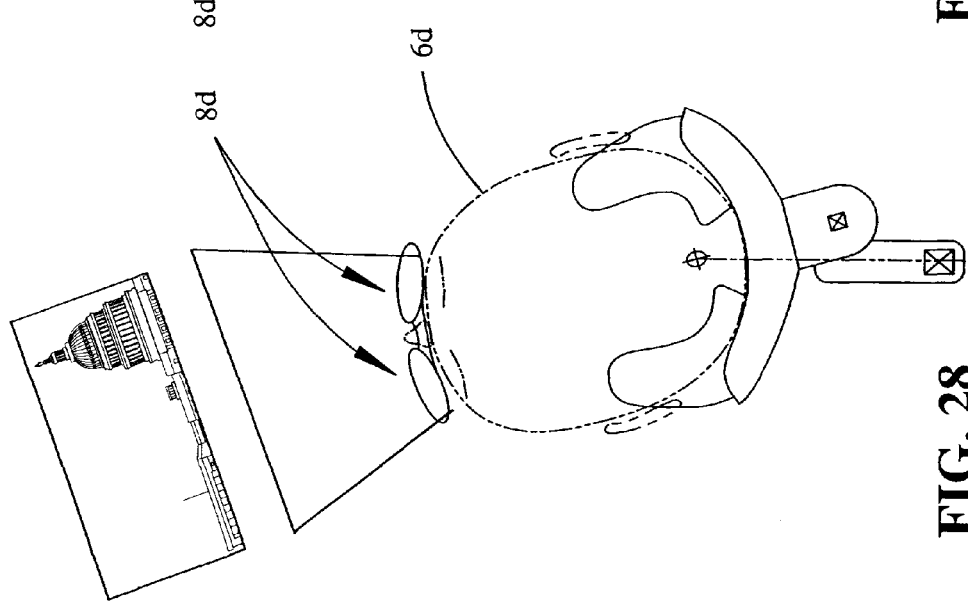

APPARATUS AND METHOD FOR, IN AN IMAGE SPACE, DECODING AND PLAYING BACK A LIGHT CONTROL SIGNAL HAVING SUCCESSIVE COMPUTER GENERATED IMAGES IN CORRESPONDENCE WITH A CHANGING POINT OF VIEW ACQUIRED BY A DEVICE NAVIGATED IN MOTION IN AN OBJECT SPACE

RELATED APPLICATIONS

This application is a continuation of U.S. patent application Ser. No. 10/948,809 filed Sep. 22, 2004, which is a continuation of U.S. patent application Ser. No. 09/772,016 filed Jan. 29, 2001 as a continuation-in-part of U.S. patent application Ser. No. 09/524,491 filed Mar. 13, 2000 (now U.S. Pat. No. 7,453,451 issued Nov. 18, 2008) and claiming priority from U.S. provisional application 60/124,642 filed Mar. 16, 1999 (now U.S. Pat. No. 6,798,443 issued Sep. 28, 2004), which application Ser. No. 09/772,016 is also a continuation-in-part of U.S. patent application Ser. No. 08/794,122 filed Feb. 3, 1997 (now U.S. Pat. No. 6,181,371 issued Jan. 30, 2001), which is itself a continuation-in-part of U.S. patent application Ser. No. 08/452,510, filed May 30, 1995 (now U.S. Pat. No. 5,734,421 issued Mar. 31, 1998).

BACKGROUND OF THE INVENTION

1. Field of the Invention

This invention relates to providing light for forming images and, more particularly, to providing light for forming images for a passive viewer.

2. Description of Related Art

Still photography, motion pictures and television were influenced by the way artists represented physical reality in paintings, as if through a window. A highly detailed perspective image is provided, typically within a rectangular frame. All provide highly detailed images which induce the viewer to cooperate with the cameraman's "vision" by assuming the artificial perspective of the representation. The viewer is enabled to deliberately suspend disbelief that the images themselves are not a real object space. The degree to which the viewer is thus enabled is influenced not only by the image resolution but by the field of view. It is usually thought desirable to increase both. For example, very high resolution commercial television standards have been formulated for increasing image quality. Such approaches typically increase the number of horizontal lines scanned to a number significantly greater than present standards. Larger format movie film such as 70 mm has been used to increase detail. Also, panoramic movies, e.g., "Cinerama" increased the field of view to increase realism. Various stereoscopic television approaches have also been conceived or developed to increase realism.

All of these traditional media take a rather objective view of the physical world. The image is framed by a window through which the viewer can gaze in any direction "into" a representation of an object space. Events are presented in both movies and television in a series of different action scenes in a story line which the viewer can observe from a stable and seemingly quasi-omniscient point of view. The viewer is led to take what appears to be a view of the world as it really is. Yet the choice of image and its perspective is picked by the creator of the image and the viewer actually assumes a passive role.

A Sensorama simulator was disclosed by Heilig in U.S. Pat. No. 3,050,870. The senses of an individual were stimulated to simulate an actual experience realistically with images, a breeze, odors, binaural sound and even motion. Heilig also disclosed a stereoscopic television in U.S. Pat. No. 2,955,156. This also was passive. "Virtual reality," in an electronic image context, goes even further in the direction of increased realism but enables the viewer to take a more active role in selecting the image and the perspective. It means allowing a viewer's natural gestures, i.e., head and body movements, by means of a computer, to control the images surroundings, as if the viewer were seeing and moving about in a real environment of seeing, hearing and touching. Due to the myriad of possible actions of the viewer, a corresponding multiplicity of virtual activities needs to be available for viewer choice. This would represent the ultimate in artificial experience.

A user of a "virtual reality" device will typically don a head-mounted display which provides images of a virtual space that are matched to the sensed position and orientation of the head of the user as the user moves his head in space and time (e.g., the x, y, z position of the head and/or the roll, pitch, yaw attitude of the head). For example, a Fakespace BOOM3C is a Binocular Omni-Orientation Monitor that provides visual displays and tracking integrated with a counter-balanced articulated arm for full six-degree of freedom motion (x, y, z, roll, pitch, yaw) and provided by Fakespace, Inc., 241 Polaris Ave., Mountain View Calif. 94043. Another example would be a wireless magnetic motion capture system such as the STAR*TRAK of Polhemus Incorporated of 1 Hercules Drive PO Box 560 Colchester Vt. 05446. It provides six-degree-of-freedom (position and orientation) data from up to 32 sensors capturing data at up to 120 Hz.

The images for such devices are created by a computer program with the assistance of pre-stored image information that is retrieved according to the user's head movements and presented to the user's eyes. The user's head may be coupled to the display. The aim is to present panoramic images covering a wide field of view in order to immerse the user in an artificial reality with which he can interact, as if real. The degree of artificiality need not be total and can instead constitute an "augmented reality" with some artificial objects or symbols superimposed or interposed within the real world as viewed with a see-through, head-mounted or head-coupled display.

These advances take advantage of converging technological developments in telecommunications including broadband services, projection optics for head mounted and head-coupled displays (including virtual retinal displays), the ever-increasing computational power of image processing computers, specialized sensors such as gloves designed to sense hand and finger movements, exoskeletons, and the like. They can be expected to lead to exciting interactive games and other new forms of interactive experiences within virtual worlds.

This new paradigm represents a very great improvement over the present imaging technology. It joins immersion to interactivity to increase the level of experience. It is now being applied to gaming applications and others such as virtual museums, architectural and interior design mockups, facility tours, "aircraft" rides and the like.

The new paradigm would likewise seem to hold the potential for an improvement over the old ways of traditional entertainment such as drama, comedy, documentaries, and the like. By joining immersion and interactivity, the user would be enabled to enter a completely new realm of artificial experience. The user would be given a very high degree of freedom, under his own volition, to navigate in the virtual world and to participate in completely new forms of such entertainment, where the user's own actions influence the sequence of images and audio provided.

Traditional entertainment applications, on the other hand, such as drama, comedy, documentaries, and the like, have not yet been explored by these new technologies. This could be because the traditional applications have usually been presented for passive enjoyment by the viewer. Even though immersion would provide a better experience, interactivity would be contrary to these known traditional entertainment applications, such as storytelling, where people like to relax and be passively led through stories and participate vicariously. Another obstacle would seem to be that the level of complexity of the possible alternative scenarios, depending on the user's actions, would need to be higher in the traditional arts than for the more predictable and mechanistic art of gaming.

For all these various kinds of virtual reality applications, the creation of many possible scenarios for viewer selection creates a massive demand for electronic image storage space and there is also the problem of a disconcerting time lag between the viewer's action and the response of the imaging system. These problems make this emerging technology hard to achieve using presently available hardware. The software task is equally daunting.

SUMMARY OF THE INVENTION

An object of the present invention is to provide a new method and means of providing light for forming images for a viewer.

According to the present invention, a method of providing light from a light source at an orientation of the light source to an eye in a head of a viewer for formation of images in the eye, comprises the steps of: providing the light from the light source for the formation of images with a changing point of view; and changing the orientation of the light source in correspondence with the changing point of view for guiding the head of the viewer in a correspondingly changing orientation for viewing the images with the eye in the head of the viewer at the changing orientation of the light source and from the changing point of view.

The present invention may be carried out by apparatus, comprising: a light source, responsive to a light control signal, for providing light for viewing images by an eye in a head of a passive viewer; and a light source actuator, responsive to a head guide control signal, for causing the light source to execute attitudinal movements for emulation by the head of the passive viewer.

The actuator may be a robot configuration selected from the group consisting of Cartesian, cylindrical, spherical, and articulated robot configurations.

The images may but need not be created by means of one or more cameras associated with a cameraman, for example, on the head of a cameraman. These are provided, according to the invention, for passive perception by a viewer whose head movements are guided by a motion-controlled head guide that is actuated in such a way as to emulate head movements of the cameraman in synchronism with the images actively sensed by the cameraman. The "cameraman," if there is such, can but need not have one or more cameras mounted on his head and the direction of his head with respect to a selected reference frame is monitored; head monitoring signals are stored in association with individual images picked up by the head-mounted camera or cameras. Such images are provided "live" or are played back to the passive viewer by way of a display fixed on or in the head guide, e.g., by way of a headup display fixed to the head guide. The motion of the head guide is controlled with respect to the individual images by retrieving the previously stored head monitoring signals in synchronization therewith. The head of the passive viewer is urged by the controlled movements of the head guide to execute head movements emulative of the monitored motions of the cameraman at the time of image acquisition.

Simulated active percepts, according to the present invention, permit a viewer to experience percepts passively, as if inside the head of another person. This "other person" is the "one" controlling the acquisition of the percepts experienced by the passive viewer. Even though the images presented to the passive viewer may be panning about and changing perspective at the whim of the "other person," e.g., the cameraman, the passive viewer has those images presented to his eyes while his head is also urged to move in the same direction as that of the cameraman's head so that it is directionally coordinated with the images viewed by the cameraman, as if he were viewing them himself, through his own eyes.

It should be realized that cameras are not needed and the images can be created by means of a computer workstation or even by known animation techniques coupled with computers and/or cinematography. In that case, the head movements can be preplanned rather than sensed.

There can be a large number of passive viewers with their own motion-controlled head guides. These can be embodied in second-hand (passive) experience simulators, e.g., in the form of self-contained booths each with a multi-degree of freedom head guide for connection within. The viewer's head guide may be actuated in any number of degrees of freedom, as a matter of design choice, to exert some minimum degree of mechanical head guidance control with just a few actuators or can provide a full complement of actuators, e.g., providing control in six or even more axes. A booth can be for home or arcade use, for example. Such a viewer enters the booth, sits down and mechanically couples his head to the head guide. E.g., the display may be a panoramic display fixed in the wall of the booth or may be a helmet mounted display, as known in the art. The invention need not be embodied in a booth. It can be desk mounted or mounted in any convenient way.

The images provided to the passive viewer's eyes can be varied in their apparent distances, e.g., by changing the focus of the optics in an eyepiece of the light source. In this way, the accommodation of the eyes of the viewer can be urged to follow the changes in focus at differing depths within the image space.

The invention may be made even more like a re-experience of experiences of another, according to another aspect of the present invention, by effectively controlling eye movements of the passive viewer in such a way as to emulative of eye movements of the other, e.g., the cameraman. This can be done in a nonintrusive way by presenting nonuniform images emulative of the human fovea, e.g., with nonuniform resolution, nonuniform dynamic range, a small colored area in an otherwise wide-field black and white image, nonuniform image informational content, nonuniform image concentration, nonuniform brightness, or some other equivalent nonuniform images to the passive viewer, made so as to draw the viewer's attention to an accentuated area, wherein such area moves about between successive images presented within the field of view of the viewer. In this way, not only the head of the passive viewer has its motions guided but the eye movements are guided as well. So the passive viewer can have his head guided to be directed in one direction while the attention of his eyes is drawn or guided in another direction. In this way, the passive viewer feels even more like he is undergoing experiences of another, e.g., the cameraman. Such images can be created by monitoring one or both eyes of the cameraman and causing the image information gathered by the cameras to be encoded in a nonuniform way such as by having finer scanning in a small area dictated by where the cameraman happens to be looking at a given moment with the rest of the field scanned coarsely.

Furthermore, when coupled with the previously described changing focus for changing the apparent distances of the images, the foveal viewing aspect of the invention can be used to "control" the exact point of fixation to which the passive viewer's visual attention is directed, thereby establishing a sequence of fixations at various points at various depths in the image space with correspondingly differing accommodation and convergence of the viewer's eyes.

Such simulated active percepts may be presented "live" or may be stored and retrieved from storage and later presented for passive perception. A booth can, for example, be provided with a video cassette recorder to playback the image and head guide control information. The stored imagery could even be downloaded or provided "live" from the Internet.

In the case of stored simulated active percepts, according to the teachings hereof, since there is only one set of images to store, the massive memory demand problem of the prior art of "virtual reality" is solved. Similarly, for the "live" case, since the simulated active percept is provided at the same time as it is created, there is no storage requirement at all, i.e., beyond temporary, "on-the-fly" storage needs.

Moreover, by providing simulated active percepts for passive perception, there is no longer any time lag or latency problem as is presently the case for known virtual reality applications. Since the simulated active percepts induce the passive viewer to emulate those physical actions which caused or would have caused the simulated active percepts, the hardware need not be faster or as fast as the viewer. In fact, it may be much slower. Although the viewer is relegated to a passive role, the novelty and richness of the "virtual reality," immersive experience more than compensates in opening a whole new world of opportunity for representing reality.

These and other objects, features and advantages of the present invention will become more apparent in light of a detailed description of a best mode embodiment thereof which follows, as illustrated in the accompanying drawing.

BRIEF DESCRIPTION OF THE DRAWING

FIG. 2A shows a suspended embodiment of the apparatus of FIG. 1.

FIG. 3 shows various robot embodiments of the apparatus of FIG. 1.

FIG. 4 shows one of the robot configurations of FIG. 3 in more detail.

FIG. 27 shows the head of the user of FIG. 26 from above as the user views a scene with a straight-ahead direction-of-view.

FIG. 28 shows the head of the user of FIG. 26 from above as the user views a scene with a leftward direction-of-view.

FIG. 29 shows the head of the user of FIG. 26 from above as the user views a scene with a rightward direction-of-view.

DETAILED DESCRIPTION OF PREFERRED EMBODIMENTS

Figure 1:
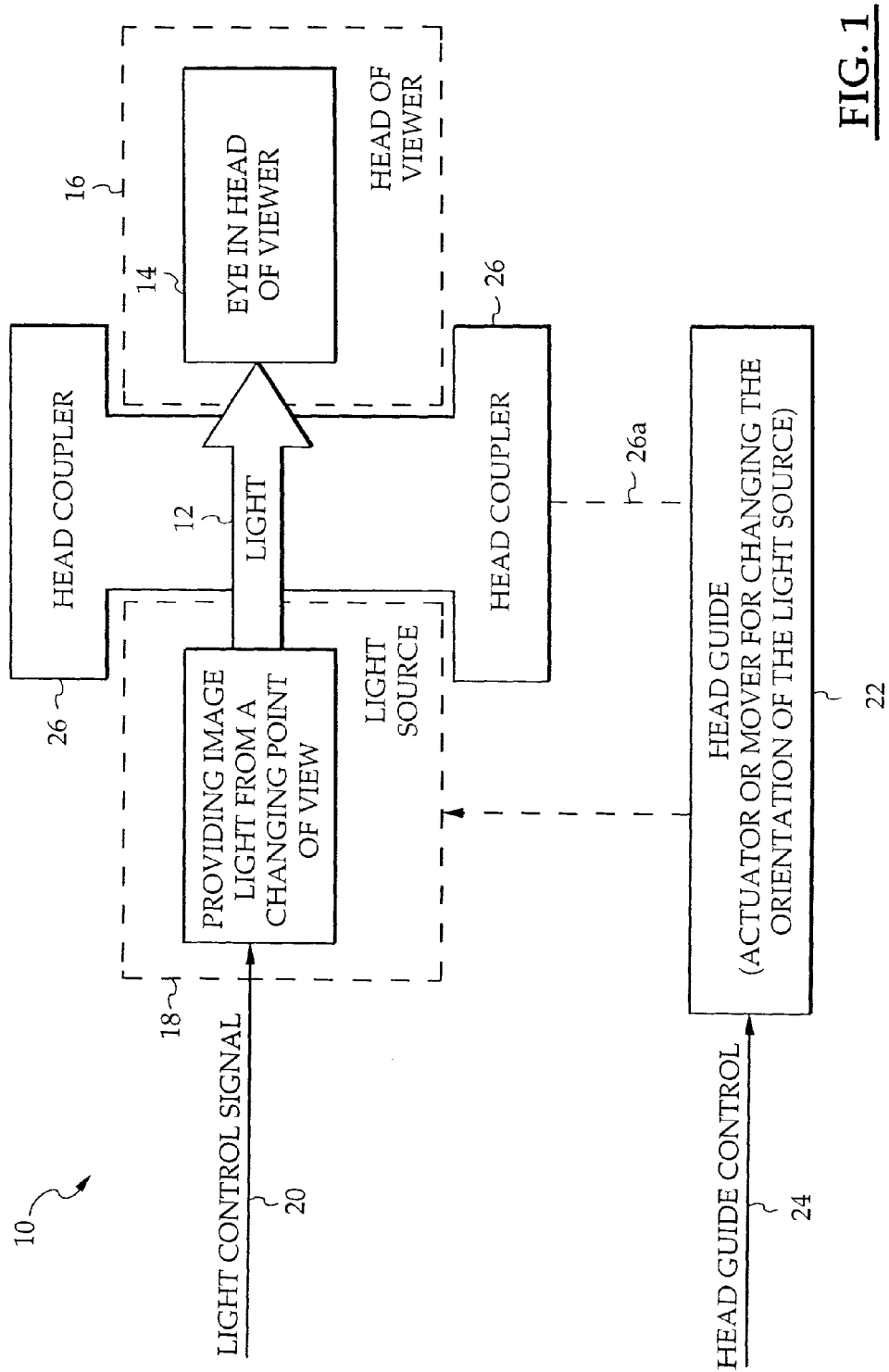
FIG. 1 shows apparatus for providing light to an eye in a head of a viewer for formation of images in the eye, according to a first aspect of the present invention.

FIG. 1 shows an apparatus 10, according to the present invention, for providing light 12 to an eye 14 in a head 16 of a passive viewer for formation of images in the eye 14. The apparatus 10 comprises a light source 18, responsive to a light control signal on a line 20, for providing the light 12 for the formation of the images with a changing point of view. The light source 18 may be any kind of device for providing light which is cast on the retina to form an image. In other words, it should be realized that the light source 18 could be any type of light source, including but not limited to the many various known types of displays. Such displays may include those where an image is first formed outside the eye, including but not limited to any type of head mounted display (HMD) or, e.g., any type of display where the image is first formed inside the eye including any type of virtual retinal display (VRD). See U.S. Pat. Nos. 5,184,231; 5,189,512; 5,406,415; 5,293,271; 4,969,714; 4,968,123; and 4,961,626 for typical examples of HMDs. See U.S. Pat. Nos. 5,467,104, 5,596,339 and 5,574,473 for examples of VRDs.

A head guide 22 is connected to the light source 18 and is responsive to a head guide control signal on a line 24, for mechanically changing the orientation of the light source 18 in correspondence with the changing point of view for guiding the head 16 of the viewer in a correspondingly changing orientation for viewing the images with the eye 14 in the head 16 of the viewer at the changing orientation of the light source 18 and from the changing point of view. "Changing orientation" is used in the same sense as one or more of the pitch, roll, or yaw components of changing attitudes for aircraft or spacecraft. The head guide is thus a light source actuator or mover of the light source in order to be a guider of corresponding movements of the head of the viewer.

A mechanical head coupler 26 for coupling the head 16 of the viewer to the light source 18, or even to the head guide 22 as indicated by a line 26a may, but need not, be provided as well for assisting in guiding the head of the viewer in changing its orientation in following the changing orientations of the light source. In other words, the function of the head coupler 26 is to provide a way to couple the head or face of the viewer to the display so as to facilitate guidance of the head of the viewer 16 in passively following movements of the light source 18 as controlled by the head guide 22. Such a head coupler 26 can take the form of a hollow casing, a portion being concave to fit about the face of the head of the viewer 16, said portion have two eye openings to be looked through by the viewer's eyes as shown, e.g., by M. L. Heilig in U.S. Pat. Nos. 2,955,156 or 3,050,870 or as similarly shown, more recently, in a wrap-around viewer by the Nintendo "Virtual Boy" (Part #32787 Item #NESM128). It could simply be eyecups which the viewer inserts his eyes into and rests his brows, cheeks or eye-orbits against. It could be a head or face "rest" that is rigidly attached to the light source as shown in FIG. 3 of U.S. Pat. No. 5,584,696 where the viewer looks through a single aperture. It could be a helmet or headrest. In other words, it can be any means for more or less weakly or strongly mechanically coupling the head of the viewer to facilitate the function of the head guide in mechanically guiding the head of the viewer to follow the movements of the light source.

With the passive viewer seated or standing before the light source, the head 16 of the viewer is coupled to the light source 18 by the means for coupling 26. The light source provides light 12 to the eye for forming an image in the eye from a particular point of view as controlled by the light control signal on the line 20. As long as the point of view remains the same, the head guide 22 does not change the orientation of the light source and the scene remains the same. However, the light control signal can then gradually or even quickly change the point of view and the head guide will at the same time correspondingly change the orientation of the light source according to the dictates of the head guide control signal. The head of the viewer is thus guided in such a way as to feel the changing orientation of the point of view as if experiencing the change in reality.

Figure 2B:
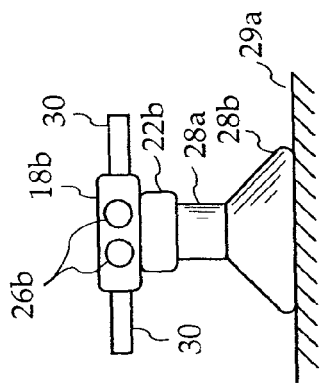
FIG. 2B shows a desktop supported embodiment of the apparatus of FIG. 1.

For a simple case such as shown for example in FIG. 2A, the means for changing the orientation of the light source (in the form of a display housing 18a) may be supported on a fixed support 28 on a base 29 so that the position of the display housing, to which it is connected, e.g., by means of a one-or-more axis wrist, e.g., a three-axis wrist 22a, is also essentially fixed, ie., with respect to translations in position. The base shown is a ceiling or roof base but could as well be reversed as a floor base. As shown in FIG. 2B, the base could be any surface such as a desk 29a with a support 28a, 28b holding the display much like a desktop computer except with a wrist 22b. Both of the wrists of FIGS. 2A & 2B have an actuator such as a motor in one or more axes for causing movement thereabout. The motor can be of any type including electrical, hydraulic, or the like. The display housings 18a, 18b are shown with the head coupler in the form of simple eyecups 26a, 26b such as found on binoculars. Behind each eyecup may be a separate light source such as shown, e.g., in U.S. Pat. No. 4,406,532. Other kinds of displays without separate eyecups are equally usable. Handgrips 30 may be provided as part of such means to assist the viewer in coupling his or her head to the eyecups. This embodiment is somewhat similar to a submarine periscope except that such a periscope has a telescoping support for changing the vertical position of the scope and only has a single degree of freedom of orientation, i.e., for changing the orientation of the scope about the axis of the support.

On the other hand, the head guide 22 of FIG. 1 may, in addition to being capable of changing the orientation of the light source, be equipped to change the translatory position of the light source. As shown in FIG. 3, the means for changing the orientation of a light source 18c, e.g. in the form of a motorized wrist 22c, can be mounted on a means 32 for changing not only the orientation but the position of the display as well. Such a means 32 can take the form of a selected robot configuration as shown, for example, in FIG. 3. Such a robot has a work envelope having a shape depending on the selected configuration. Various configurations are shown at pages 2154-62 of *The Electrical Engineering Handbook*, CRC Press 1993, edited by Richard C. Dorf, in section 94.1 entitled "Robot Configuration" at pages 2154-62 by Ty A. Lasky, Tien C. Hsia, R. Lal Tummala, and Nicholas G. Odrey, e.g., "Cartesian" as described and shown at pages 2155-6, "cylindrical" as shown at page 2156, "spherical" as shown at pages 2157, "articulated" as shown at pages 2157-8, "SCARA" as shown at pages 2158-9, and "gantry" as shown at pages 2159-61. As explained there, "configuration" refers to the way the manipulator links are connected at each joint. Each link will be connected to the subsequent link by either a linear (sliding or prismatic) joint, or a revolute (or rotary) joint.

For example, as shown in FIG. 4, the means for changing the orientation of a light source 18d, e.g., in the form of a wrist 22d, can be mounted by a rigid bar 33 onto a cylindrical robot configuration 32c for changing the position of the display. It has one vertical revolute joint 34 and two orthogonal linear joints 36, 38. Such a cylindrical robot has a work envelope in the form of an annulus or part thereof as illustrated in FIG. 94.4 at page 2157 of *The Electrical Engineering Handbook*, referred to above. Cylindrical robots are made by many different manufacturers, e.g., the RT3200 or RT 3300 of Seiko Instruments USA, Inc., 2990 W. Lomita Blvd., Torrance, Calif. 90505.

Figure 5:
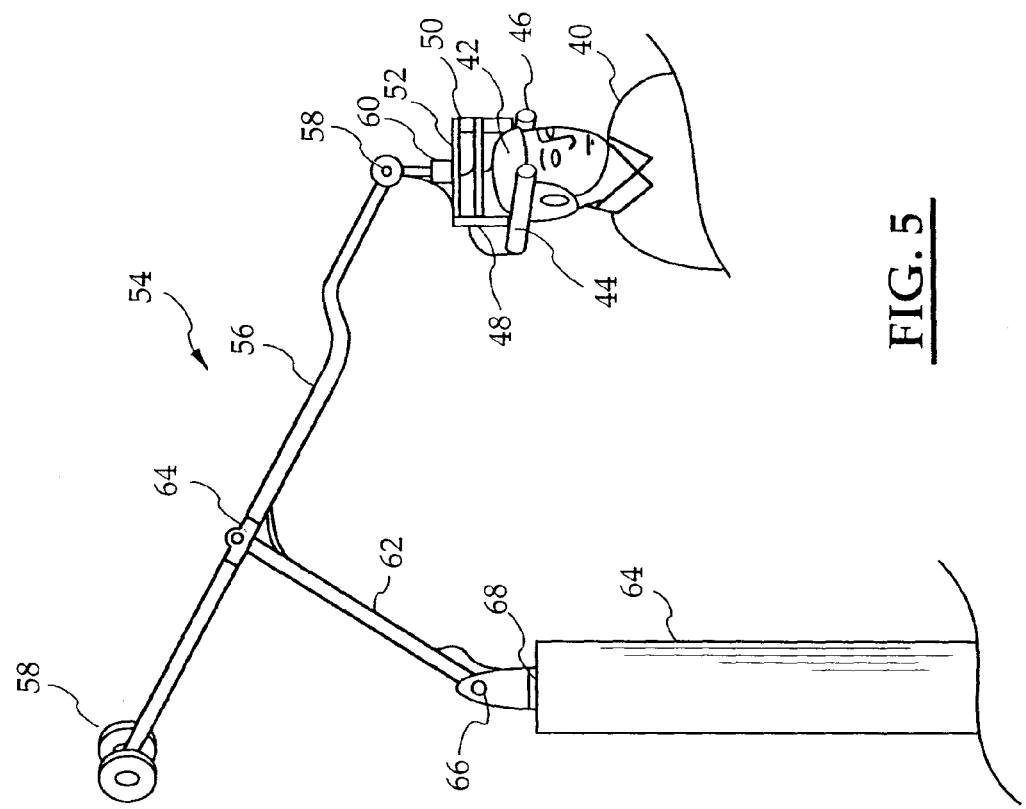
FIG. 5, according to a second aspect of the invention, shows a cameraman in an image space for gathering light in cameras for transformation into the light control signal of FIG. 1.

There are many possible alternatives for creating the light control signal on the line 20 and the head guide control signal on the line 24 of FIG. 1. For example, FIG. 5 shows a studio cameraman 40 having headgear with stereo cameras 44, 46 attached thereto for providing the light control signal on the line 20 of FIG. 1. The cameras can be of high definition, e.g., according to the new HDTV standard recently promulgated by the FCC or can instead be any other type for providing a wide field of view image. See, for example, U.S. Pat. No. 4,323,925 for an image sensor suitable for resolving a high-resolution image. The cameras can instead be mounted on rails 48, 50 of a structure 52 or in any other convenient location that permits the cameras to be mounted so as to be pointing in the same direction as the cameraman's head and so as to gather images of a scene from the moving point of view of the cameraman. The structure 52 is in turn connected to a counterbalanced articulated arm 54 such as heretofore used for a different purpose in the BOOM3C of Fakespace Inc., 241 Polaris Ave., Mountain View, Calif. 94043. For example, it can have a first arm 56 connected at one end to the structure 52 by joints 58, 60 and at the other end to a counterweight 62. A joint 64 connects the first arm 56 to a second arm 62 which is in turn connected to a pedestal 64 by additional joints 66, 68. The joints need not be located at the exact same positions shown but can be changed, if a different design is desired. Each of the joints has a transducer associated therewith for monitoring rotation about the axis of the associated joint. Signal processing of signals from the transducers provides an indication of position and orientation of the cameraman's head in space. Thus, the structure 52 is used for providing full six-degree of freedom motion monitoring for providing the mover control signal on the line 24 of FIG. 1. The articulated arm 54 is mounted on a pedestal 56 which may be stationary or movable on a studio dolly. For the embodiment shown, the cameraman can move his head in different orientations and positions. He can walk about within the confines of the work envelope of the articulated arm and thus provide the light control signal 20 of FIG. 1 for use by the light source in providing light at a point of view that changes with movements of the cameraman's head. It should be realized that there are numerous other similar mechanical monitors available. See, e.g., U.S. Pat. No. 4,586,515 for a device for measuring the position and/or motion of a body part.

Figure 6:
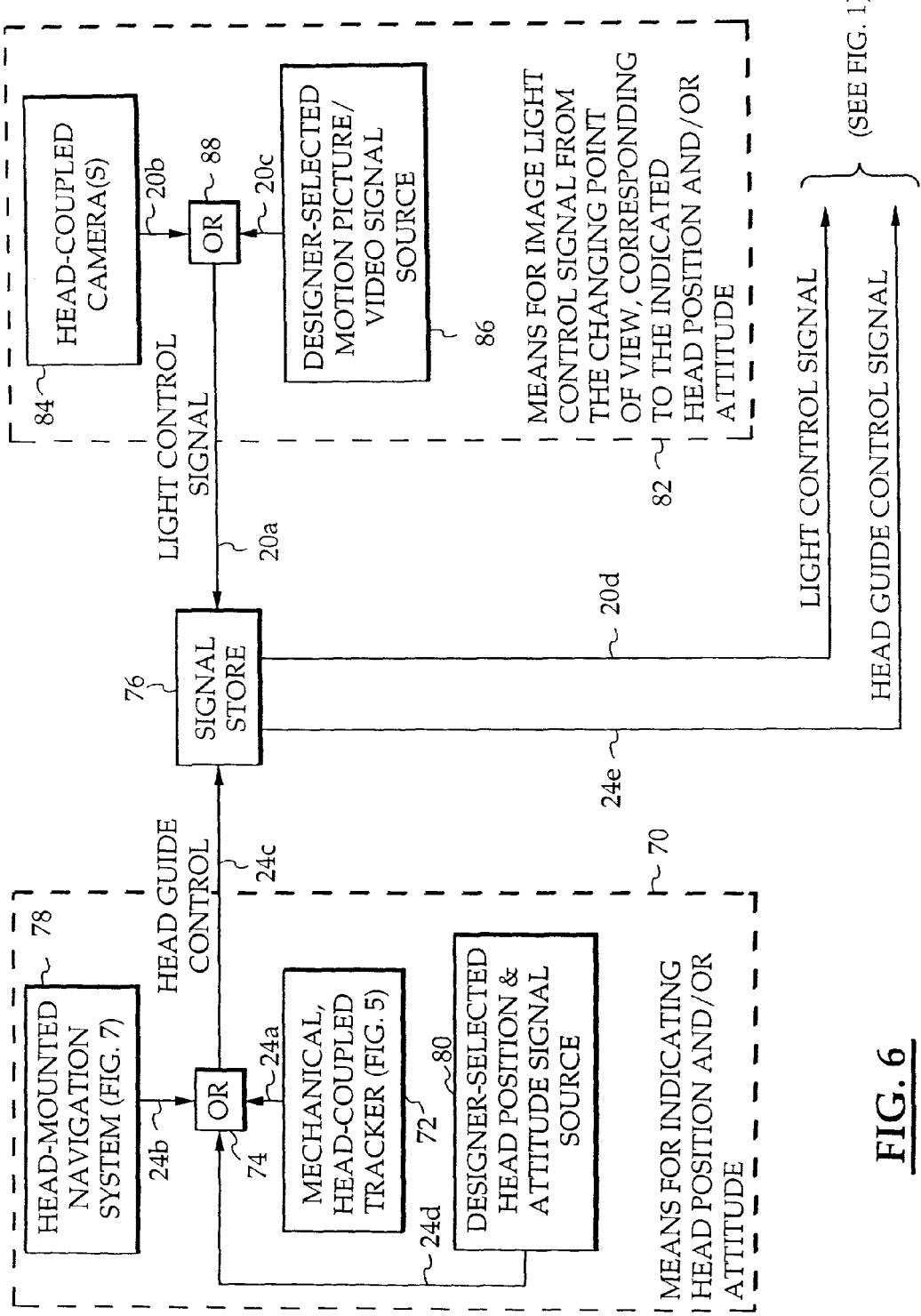
FIG. 6 illustrates various ways, according to a second aspect of the present invention, to create the light control signal and the head guide control signal of FIG. 1.

As mentioned above, it should be realized that there are alternative ways to create the light control signal on the line 20 as well as the mover control signal on the line 24. FIG. 6 shows a generalized means 70 for indicting head attitude, as well as head position if desired. The means 70 can take the form of a mechanical head-coupled tracker 72 such as shown in FIG. 5 for providing a mover control signal on a line 24a. An OR gate 74 is shown in the means 70 of FIG. 6 merely to indicate that there are alternatives to the arrangement of FIG. 5 for providing a mover control signal on a line 24c to a signal storage medium 76. Such an OR gate 74 would not actually be present since only one alternative is needed. It is shown for the purpose of indicating that there are various alternatives. Another way for indicating head position and attitude is to use a head mounted navigation system 78 for sensing position and attitude with gyros, accelerometers, radio, magnetic sensors, or the like for providing a mover control signal on a line 24b. Such a system is shown in the object space of FIG. 7 below. Another approach would be a system from Polhemus Inc., such as the system mentioned above. Yet another approach is shown by a block 80 in FIG. 6 which represents a way for a designer to provide a head guide control signal on a line 24d. This could be done by a computer workstation.

FIG. 6 also shows a means 82 for providing a light control signal 20a to the storage medium 76. It can comprise cameras such as head coupled cameras 84 for providing a light control signal on a line 20b such as shown in FIG. 5 and in FIG. 7 below or it can comprise a means 86 such as a computer workstation for providing a light control signal on as line 20c. The two alternative signals on the lines 20b, 20c are shown provided to a fictitious OR gate 88 to signify that either alternative 84, 86 can be used. The OR gate 88 of course need not be actually and would not usually be present. This is not to say, however, that post-production work could not be done on camera generated imagery by means of a workstation.

The signal storage medium 76 is responsive to the head guide control signal on the line 24c and the light control signal on the line 20a for storing them in timed relation to each other in such a way that they can later be retrieved in the same timed relation and provided on lines 20d, 20e as a combined output signal for use by a light source such as shown in FIG. 1. It should be understood that although the various signals on the lines 20, 24 may be shown as single lines that they can each typically comprise a plurality of signal lines.

Figure 7:
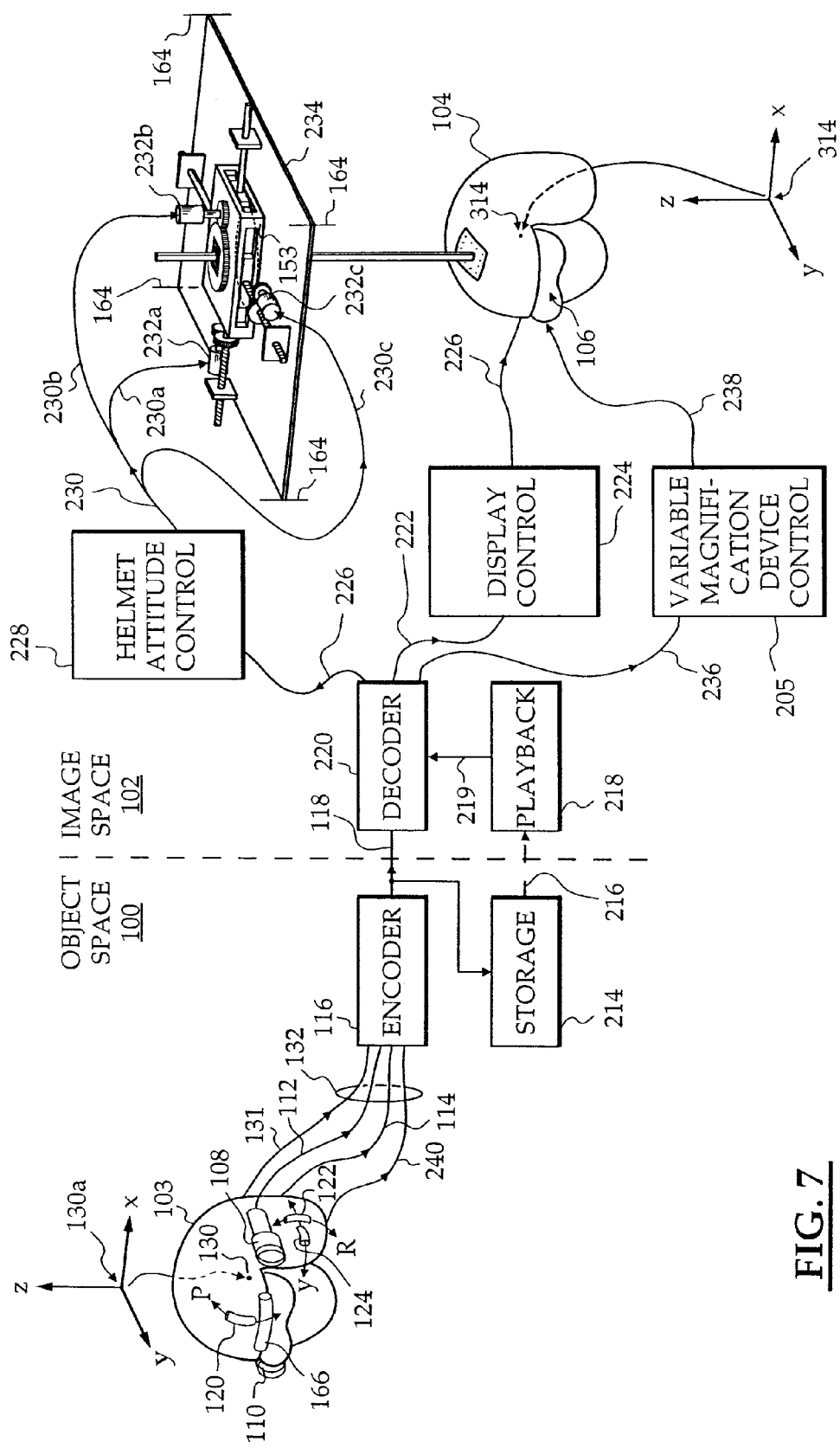
FIG. 7, according to an embodiment of the second aspect of the present invention, shows a helmet for a cameraman in an object space having at least one camera and various sensors for at least monitoring head attitude and a signal processor or encoder for providing an encoded signal to a decoder, according to the first aspect of the invention, in an image space where decoded signals are provided to a helmet attitude control and to a display control for providing actuator control signals to at least a helmet attitude actuator mounted in a frame such as an arcade booth and to a helmet mounted display.

FIG. 7 shows in an object space 100 one of the particular means 78 for the means 70 as well as one of the particular means 84 for the means 82 of FIG. 6. It should be realized, however, that the various particular means of the means 70 of FIG. 6 can be used in various combinations with the various particular means of the means 82 of FIG. 6.

FIG. 7 shows both the object space 100 and an image space 102, each of which may have respective helmets 103, 104 therein, or their equivalents, according to the present invention. The image space is for presentation of images to a "viewer" while the object space is for image acquisition, e.g., by an "observer." The linguistic convention of calling the active creator of the image the "observer" in the "object" space and the passive consumer of the created image in the "image" space as the "viewer" will be used throughout.

According to the present invention, the helmet 104 in the image space 102 is worn by a passive viewer (not shown), e.g., seated within a stationary arcade-like housing (not shown) with respect to which the helmet 104 is made to move. It is made to execute at least some minimum movement such as one or more attitudinal movements emulative of pitch, roll and yaw movements of the helmet 103 in the object space 100 and worn by a cameraman observer (not shown) who is free to move about while directing his head and gaze in various directions. In other words, translatory movements of the head of the observer with respect to some referent may, but need not be, emulated by the helmet of the viewer. For the detailed embodiment shown below, however, only the attitude of the cameraman's head is emulated in the image space. Translations are ignored. This makes it possible for the embodiment shown for the viewer's head to remain relatively stationary (not be forced to undergo various translatory accelerations) in the image space in a positional sense. Such can be introduced but are best imparted to the body of the viewer rather than directly to the head. Such requires additional sets of external platforms and associated superstructures depending on the number of axes of control and are shown below in other embodiments. For the case shown where only head attitude is emulated, the viewer can be seated or standing in one position within a stationary structure.

It will be realized, therefore, that the invention can be used in platforms in which the viewer can be controlled in other ways. For instance, the viewer could be seated as shown in FIG. 1 of U.S. Pat. No. 5,515,078 with the display FIG. 1 of that patent controlled in the manner disclosed herein. The display 21 of that patent could be positioned as shown therein or more closely, with its arm 11 angled to bring the display 21 close to the face of the user to facilitate use of a head coupler as taught herein. In addition to controlling the orientation of the display 21 as taught herein, however, the position and/or orientation of the seated viewer can be controlled as shown in FIG. 3 of U.S. Pat. No. 5,515,078 except not based on the joystick 30, 35 choices of the viewer, but passively, based on monitoring of the position and/or orientation of the cameraman in the object space based on the same principles as disclosed herein. The invention can similarly be used with like devices such as shown in U.S. Pat. Nos. 5,388,991; 5,551,920; 5,453,011; and 5,353,242, among many others.

At the same time, a helmet mounted display 106, to be described below, mounted on the helmet 104, provides images to the passive viewer wearing the helmet 104 that are gathered by the cameraman "observer" in the object space 100 wearing the helmet 103 with cameras mounted thereon. The images viewed by the passive viewer in the image space are therefore presented in such a way as to be emulative of images seen by the cameraman as he moves his head, at least attitudinally, in the object space. It should be realized that translational position of the observer's head can be monitored in the object space as well, with respect to a selected referent, and such translations can be emulated by the helmet 104 in the image space by means of the already mentioned additional platforms and associated superstructures (not shown). Or, rather than urging the head of the viewer to translate directly, such positional translations can instead be imparted to a platform supporting the body of the viewer, as shown below in other embodiments. It should be mentioned that the body of the cameraman can be monitored as well or instead of the head, at least for purposes of translation.

The helmet 103 in the object space 100 has at least one camera 108, and preferably a second camera 110 as well, mounted on opposite sides of the helmet 103 for respectively gathering monocular or preferably stereoscopic images of objects in the object space according to the cameraman's head movements. The cameras provide image signals on lines 112, 114 to a signal processor or encoder 116 where they are encoded for transmission to the image space 102 via a signal on a line 118.

Figure 8:
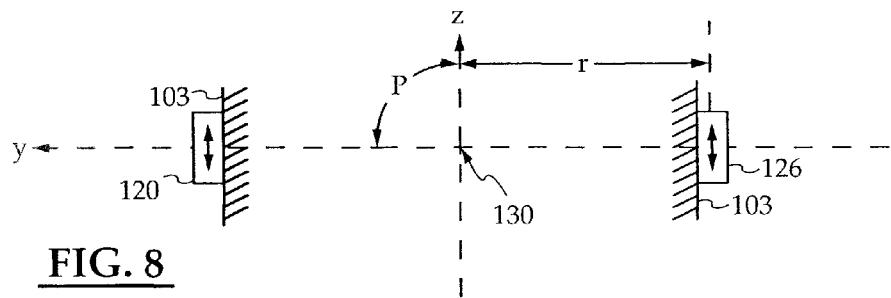
FIG. 8 shows one of the three attitude sensing planes of FIG. 7 for sensing pitch attitude of the cameraman's head, according to the invention.

Also illustrated mounted on the helmet 103 are helmet attitude sensors 120, 122, 124 such as, but not limited to, accelerometers for monitoring the cameraman's head attitude, respectively, its pitch (P), roll (R) and yaw (Y). Opposite on the helmet to each of the illustrated sensors 120, 122, 124 may be located corresponding sensors 126, 128, 129 (not shown in FIG. 1) as twins to sensors 120, 122, 124 for sensing equidistantly on opposite side of the helmet. For example, as shown in FIG. 8, the pitch (P) sensor 120 on the front of the helmet 103, e.g., just above the visor, may have a corresponding twin pitch sensor 126 (not shown in FIG. 7) on the back of the helmet opposite to the sensor 120. These two sensors are shown in FIG. 8 located on positive and negative equally spaced sides of a y-axis in a y-z plane of a three-axis (x,y,z) coordinate system (having three such mutually orthogonal planes) having an origin centered on the head of the observer at a point 130. Such a three axis system is illustrated with the origin 130 translated to a point 130a for purposes of clarity, above the helmet 103 of FIG. 7 but it should be understood that it is most convenient to position the origin of the illustrated coordinate system at the point 130 at the center of the cameraman's head, as shown. Of course, the origin can be located at any convenient point and translated as desired by appropriate coordinate translations and transformations.

In any event, the two sensed pitch signals from the accelerometers 120, 126 of FIG. 8 may be used together to be indicative of pitch (P) rotations in the y-z plane about the point 130 midway between them, e.g., in the center of the cameraman's head. It should be realized, however, that a single sensor can suffice. Similarly, twin roll and yaw sensors may be positioned at equal distances apart (in corresponding mutually orthogonal roll and yaw sensing planes) on opposite sides of the helmet for sensing roll and yaw motions about substantially the same center point 130. For example, as shown in the object space of FIG. 7, the roll acceleration sensor 122 may be positioned as shown on the helmet over left ear of the observer and oriented as shown on a positive side of the x-axis while a not shown acceleration sensor 128 may be similarly positioned over the right ear of the observer on the other side of the helmet on a negative side of the x-axis. Together, they may be used inter alia to measure rotations in the x-z axis about the point 130 in the center of the cameraman's head. Similarly, the acceleration sensor 124 of FIG. 7 may be positioned over the left ear of the observer and oriented as shown in FIG. 7 on the positive x-axis with a not shown acceleration sensor 129 similarly positioned over the right ear of the observer on the other side of the helmet on the negative x-axis. Together, they may be used inter alia to measure rotations in the x-y axis about the point 130. It should be realized that it is also possible to monitor the attitude of the cameraman's head with any appropriate sensor with respect to another referent, such as but not limited to his body.

The sensors need not be accelerometers but could be gyros of the electromechanical type, SAGNAC effect fiber optic gyros, or conceivably even more bulky laser gyros. Other types of attitude sensors based on magnetic sensors, light beam sensors, radio sensors, or the like, are known and are of course useable as well, as will be understood by those of skill in the art.

It should be realized that although FIG. 7 shows the image creation process as taking place in an "object" space 100 by means of a camera on a helmet gathering images of real objects and mounted on a helmet, similar images can be created in other ways, e.g., by animation or successive images created on computers, using software, as suggested above in connection with the block 86 of FIG. 6.

In any event, as shown in FIG. 7, the sensed attitude signals may altogether be provided on an illustrative line 131 to the signal processor or encoder 116 for being encoded along with the image signals on the lines 112, 114. They may be combined, for example, using time division multiplexing techniques or by any other convenient technique. Or the signal processor or encoder can calculate the attitude of the cameraman's head based on the sensed signals in the object space and encode appropriate actuator signals for transmission to the image space. It should be realized, however, that the helmet attitude and image signals need not be processed and combined into a single signal on the line 118, but may be processed and provided separately. Each of the acceleration signals may be separately processed in the signal processor or encoder 116 to provide an indication of angular displacement in each of the separate pitch, roll and yaw axes. For example, the pitch axis may, but need not, be defined in the y-z plane shown by the x-y-z axes of FIG. 7 centered at the point 130 in the object space of FIG. 7. Similarly, the yaw axis may, but need not, be defined in the x-y plane and the roll axis in the x-z plane.

Figure 9:
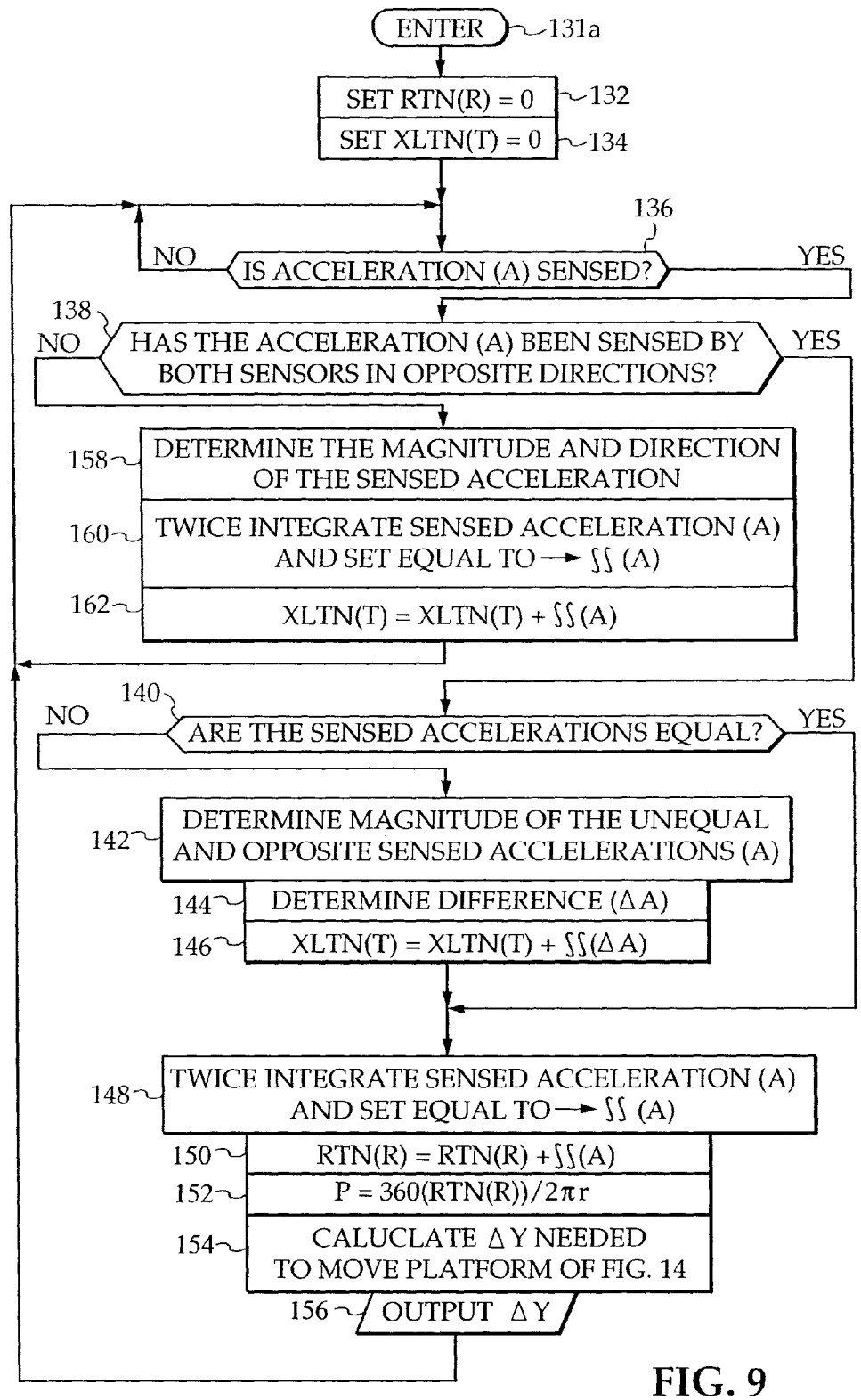
FIG. 9 shows a series of steps which may be carried out by the encoder of FIG. 7 prior to encoding the pitch control information for subsequent use in the image space, according to the invention.

FIG. 9 shows a signal processing method which may be used for evaluating the sensed acceleration signals to determine the cameraman's head attitude in the y-z (pitch) plane of FIGS. 7 & 8. Though not shown, a similar signal processing method may be used for evaluating the sensed acceleration signals in the x-z (roll) and x-y (yaw) planes. At the outset, it should be realized that other equally effective coordinate systems (such as polar or cylindrical coordinate systems) and methods may be used and the following is just one example.

According to FIG. 9, after entering in a step 131a, a pair of initialization steps 132, 134 are executed to set a rotation variable RTN(R) and a translation variable XLTN(T) equal to zero at a selected cameraman reference attitude and position, e.g., standing erect and head pointing straight-ahead with respect to a selected axis. For this example, the variable XLTN(T) represents the position of the point 130 with respect to the z axis of FIG. 7 or 8.

After initialization, a decision step 136 is executed to determine if acceleration (A) has been sensed by the accelerometers 120, 126 of FIG. 8. If not, then the step 136 is re-executed until such is sensed. Due to their bidirectionality and orientation in the z direction, both sensors will sense an acceleration along the z axis whether it be positive or negative. Once acceleration is sensed, a step 138 is executed to determine if a rotational acceleration is sensed by the accelerometers or not. I.e., if the accelerometers sense translations in opposite directions at the same time, this is interpreted as sensing a rotation.

If a rotation has been sensed, a decision step 140 is executed to determine if the sensed rotation is a pure rotation in the y-z plane about the point 130 or if it is accompanied by a translation of the point 130 in the z direction. It can do this by comparing the absolute magnitudes of the oppositely sensed accelerations of the two sensors 120, 126. If they are equal, then they represent a pure rotation. If not, then there is also a translation present in the positive or negative direction.

In the case where they are not equal, a step 142 may be executed to determine the magnitude of the equal and opposite sensed accelerations that are together indicative of the magnitude of the arc of rotation and its direction. The equal but opposite accelerations will either both indicate a clockwise rotation or a counterclockwise rotation. For instance, if sensor 120 indicates an acceleration in the positive z direction and sensor 126 indicates an acceleration in the negative z direction then the rotation is in the clockwise direction.

If knowledge of translations is desired, the step 142 can be executed to determine the magnitudes of the two oppositely sensed accelerations and then, in a step 144, to determine the part of one of the sensed accelerations that exceeds the other, i.e., to determine the difference ($\Delta A$) between the sensed accelerations. The difference can then be integrated twice to determine the length of the translation and summed with the previous value of XLTN(T), as indicated in a step 146, to indicate the current z position. Such knowledge may be needed for instance in all three orthogonal planes, not just the y-z plane, where it is desired to keep track of the three dimensional translatory position of the head of the cameraman. Such is not used in the present application but it could be used in other applications.

In a step 148, executed subsequent to either the translation update step 146 or the decision step 140, the sensed acceleration (A) (i.e., the acceleration that is equal in terms of absolute value in both sensors) is twice integrated to determine the length of arc of rotation of the movement of the cameraman's head about the point 130. The doubly integrated acceleration is summed in a step 150 with the previous value of the pitch rotation value RTN(R). Since the radius (r) from the point 130 to each of the accelerometers is known and since the arc of rotation is known from the foregoing, the angle of rotation in the y-z plane can be determined. I.e., if the radius (r) of a circle is known, the length of an arc (a=RTN(R)) on the circumference can be used to measure the corresponding angle (P) at the center. Consequently, the pitch angle (P) can be determined in degrees as shown in a step 152 according to the relation $2\pi r/RTN(R)=360/P$. At this point, as described in more detail below, calculation of the necessary movement of the platform 153 of FIG. 14 in the y direction can be made and output for encoding with the video signal as indicated in steps 154, 156.

The step 136 is then re-executed to determine if additional accelerations have been sensed. Once again, if no additional accelerations have been sensed then the step 136 is executed again ad infinitum until an acceleration is sensed. At that time, the decision step 138 is executed to determine if there has been a rotation.

If it is important to determine translations in the y-z plane, a step 158 may be executed after the step 138 to determine the magnitude and direction of the acceleration (A) from the sensors 120, 126. The step 160 is next executed in order to twice integrate the sensed acceleration (A). This determines a pure translation which is added in a step 162 to the previous value of the translation variable XLTN(T). A return is then made to the step 136 to determine if additional accelerations have been sensed. Once again, if no additional accelerations have been sensed then the step 136 is executed again ad infinitum until an acceleration is sensed. At that time, the decision step 138 is executed to determine if there has been a rotation.

As mentioned, a similar signal processing method as shown in FIG. 9 may be executed at the same time (serially or in parallel) for evaluating the sensed acceleration signals in the x-z (roll) and x-y (yaw) planes. These various signal processing procedures may be carried out as shown in FIG. 9 by means of the signal processor or encoder 116 of FIG. 7 shown in detail in FIG. 12. As also mentioned, for the embodiment shown, translations need not be tracked. Here, it is desired to "divorce" attitudinal motions of the cameraman's head from translations thereof because of the stationary nature of a structure 164 with respect to which the body of the viewer in the image space 102 is also relatively stationary. In other words, for the preferred embodiment, it is not desired to positively translate the head or body of the viewer in the image space. So, for the illustrated embodiment, the steps 144, 146, 158, 160, 162 may be omitted. I.e., if the answer to the question posed in the decision step 138 is negative, then the step 136 may be re-executed directly and steps 1158, 160, 162 may be omitted completely from the procedure.

Figure 12:
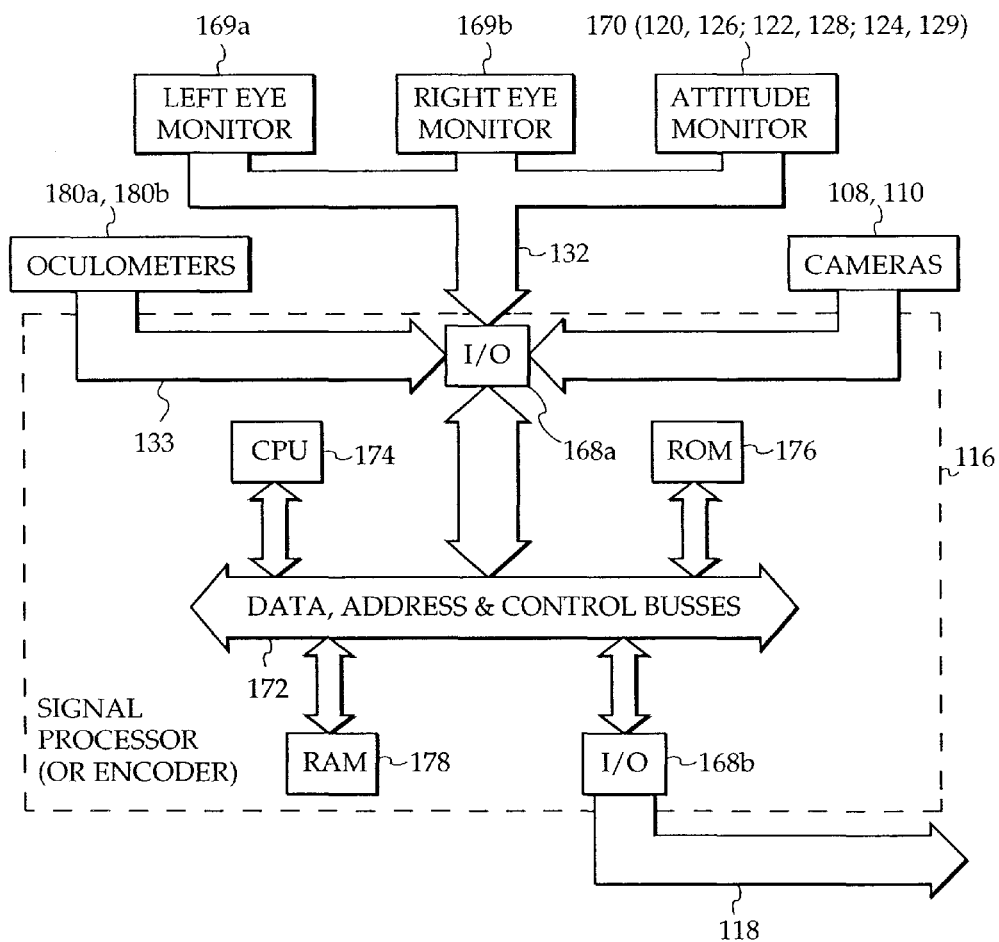
FIG. 12 shows more details of the relation between the sensors and encoder in the object space of FIG. 7, according to the invention.

FIG. 12 shows the signal processor or encoder 116 of FIG. 7 as a general purpose signal processor capable of carrying out the steps of FIG. 9. It may include an input/output (I/O) device 168 which may be represent din part by a device 168a for interfacing with an attitude monitor 170 which may, but need not, include the accelerometers 120, 122, 124, 126, 128, 129, a left eye monitor 169a, and a right eye monitor 169b. These may be any kind of eye monitor such as for monitoring accommodation, position, direction, or the like. It may also include various data, address and control busses 172 for interfacing with a central processing unit (CPU) 174, one or more memory devices which may include a read-only-memory 176 and a random access memory (RAM) 178. The I/O device 168 may also be represented in part by a device 168b for interfacing with the image space 102 over the line 118.

The left and right eye monitors 169a, 169b of FIG. 12 may take the form of a pair of left and right oculometers 180a, 180b. Such a pair of oculometers are capable of monitoring the eyes' attitudes or directions (sometimes called "positions") and providing a monitored signal such as shown on a line 133 which represents signals indicative thereof. An oculometer device 180 of the illustrated eye direction sensor, for one or both eyes, can for example take the form of an infrared source for illuminating the cameraman's eye which reflects the infrared light into a directionally sensitive infrared sensor inside the helmet (not shown) for sensing the direction of eye movement. Such is shown for example in U.S. Pat. No. 4,034,401, among many others. It should also be realized that other types of eye monitoring methods may be used as well, and further that it is not necessary to monitor eye attitude at all. Eye attitude is chiefly useful, according to the present invention, for providing a control signal for controlling an area of image nonuniformity such as an area of high resolution, dynamic range, brightness, or the like, in the images displayed to the passive viewer. It many not be necessary in some applications to have such a control signal (and consequently no eye monitoring) since uniform images can certainly be used. Equally, it should be realized that eye attitude, if monitored, can be monitored in any number of axes of eye attitude, including not only pitch and yaw but roll, i.e., torsion (rotation about the visual axis), and could even include, beyond attitude, position monitoring (in the strict sense of the word, i.e., small translations of the eyeball within its socket), although torsion and position monitoring are currently deemed not necessary for a preferred embodiment.

Figure 10:
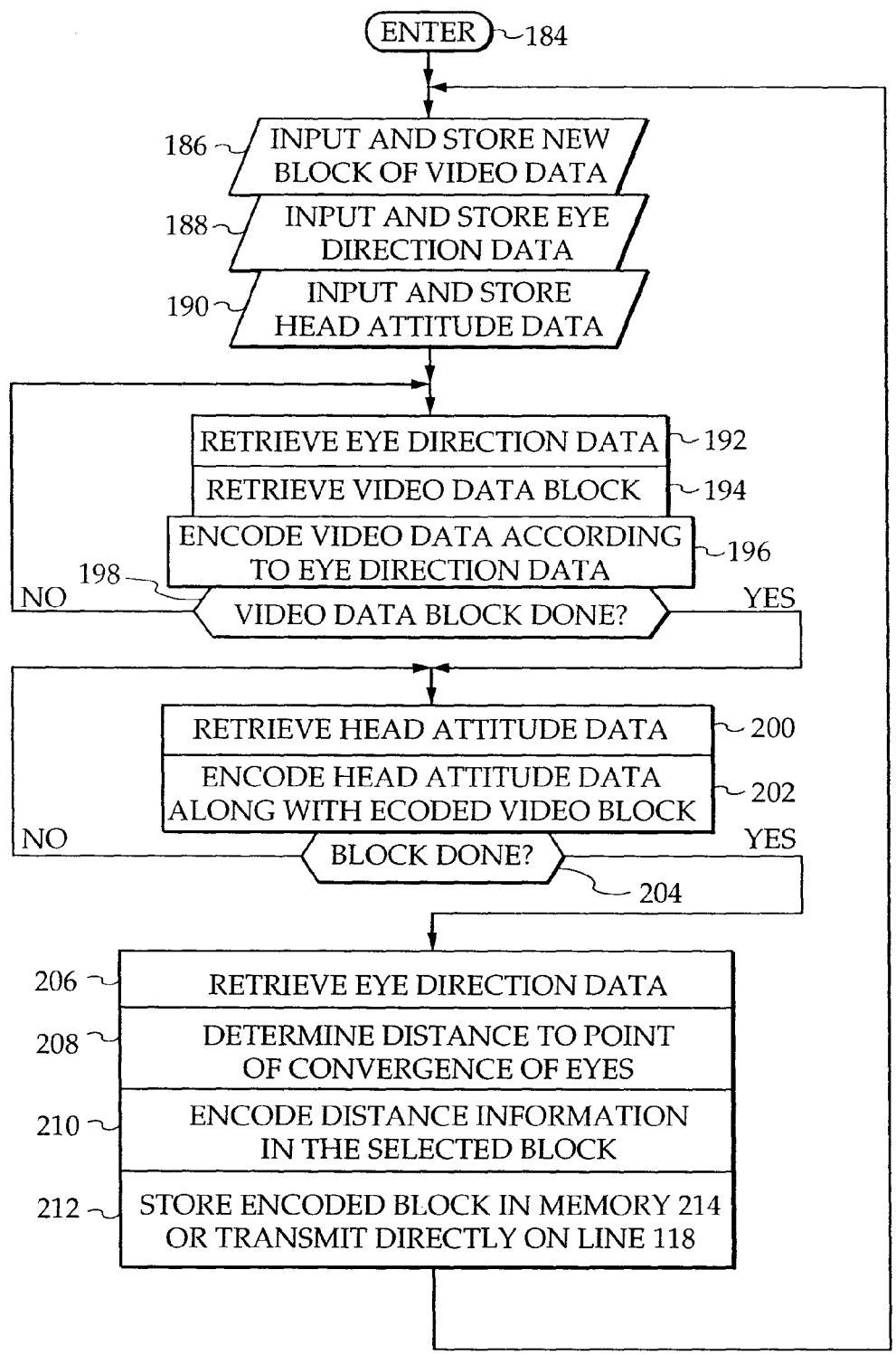
FIG. 10 shows a series of steps that may be carried out in the encoder in the object space for encoding the video, head attitude and eye direction data, according to the invention.

All of the various sensed signals in the object space 100 may be represented as a generalized group of sensed signals on the bundle of lines 132 (see FIGS. 7 & 12) for being encoded in a convenient format in the signal processor or encoder 116 for being provided on the line 118 to the image space 102. Encoding can take place in the encoder 116, for example, as shown in FIGS. 10 & 12. After entering in a step 184, a block of a selected size of video data from the cameras is input and stored in a step 186. A step 188 is next executed to input and store eye direction data from the oculometer sensors 180a, 180b. Head attitude data is next input as indicated in a step 190. Once the sensed head attitude, eye direction and video data is input and stored, a step 192 is then executed in order to retrieve the eye direction data stored in the step 188. Similarly, at least a part of the video data previously stored in the step 186 is retrieved in a step 194. The retrieved video data is then encoded in a step 196 according to the retrieved eye direction data. That is, if the eye direction signal indicates that the video data to be encoded is in a portion of the overall image that is to be encoded with a higher or lesser degree of resolution, then the encoding is carried out accordingly. A decision step 198 is then executed to determine if the encoding of the video block is done. If not, the steps 192, 194, 196 are again executed until the block is encoded.

It should be realized that the eye attitude signal can instead be used to directly control the attitude of a 3-axis platform mounted e.g. on the helmet (or elsewhere) and having a camera with a nonuniform lens (e.g., U.S. Pat. No. 3,953,111) mounted thereon which is thereby directed in the same direction as the cameraman's eye. In that case, the optics of the camera effects the desired nonuniform imagery and nonuniform encoding techniques are not needed. Similar 3-axis camera mounts could be used for the cameras of FIG. 5.

Head attitude data stored previously in the step 190 is next retrieved as indicated in a step 200. The head attitude data is then encoded with at least part of the selected video block as indicated in a step 202. A decision step 204 then determines if the encoding is done. If not, the steps 200, 202 are repeated until it is determined in the step 204 that the block is encoded. If a variable focal length device such as a device 205 of FIG. 7 is used, a step 206 is executed to retrieve the eye data input and stored in step 188. This may be eye direction or similar data. A step 208 is next executed to determine the distance from the monitored eyes to the point of fixation converged upon by the monitored eyes. This information is then encoded in the selected block of data as indicated in a step 210. After that, as indicated in a step 212, the encoded block is stored or transmitted directly to the image space and the step 186 et seq. is executed again.

It should be understood that numerous alternative encoding techniques could be carried out as well including analog techniques using dedicated analog circuitry. Anyone of skill in the art could devise a signal encoding technique for transmitting both the video and control information required in the image space based on the teachings hereof. For instance, the video image may be encoded in the conventional analog manner with odd and even raster fields which are interlaced to form a single frame. In that case, several of the horizontal video lines at the top or bottom of a field can be used for encoding the changing pitch, roll and yaw control information. For a given horizontal line used for a control purpose, a selected fixed voltage level between "white" and "black" levels will indicate the delta x, delta y or yaw rotation described in FIGS. 14-16 and 17 below. Such a control concept is shown for example in FIGS. 2-3 of U.S. Pat. No. 4,513,317 albeit for a different purpose. It should be realized that the encoding technique is not restricted to conventional digital techniques but could take other forms such as, but not limited to, a new HDTV format. Other as yet undefined formats such as for virtual retinal displays may also be used. It should also be realized that the signal on the line 118 need not be provided directly to the image space 102 but can instead be stored on a mechanical, magnetic, optical, electronic, or the like storage medium 214 for subsequent transfer as indicated on a line. 216 for playback on a playback device 218 in the image space. The bundle 132 can take the form of a wire harness connected to the encoder 116 which may be carried by the cameraman in a backpack, for example, along with the storage device 214.

Figure 13:
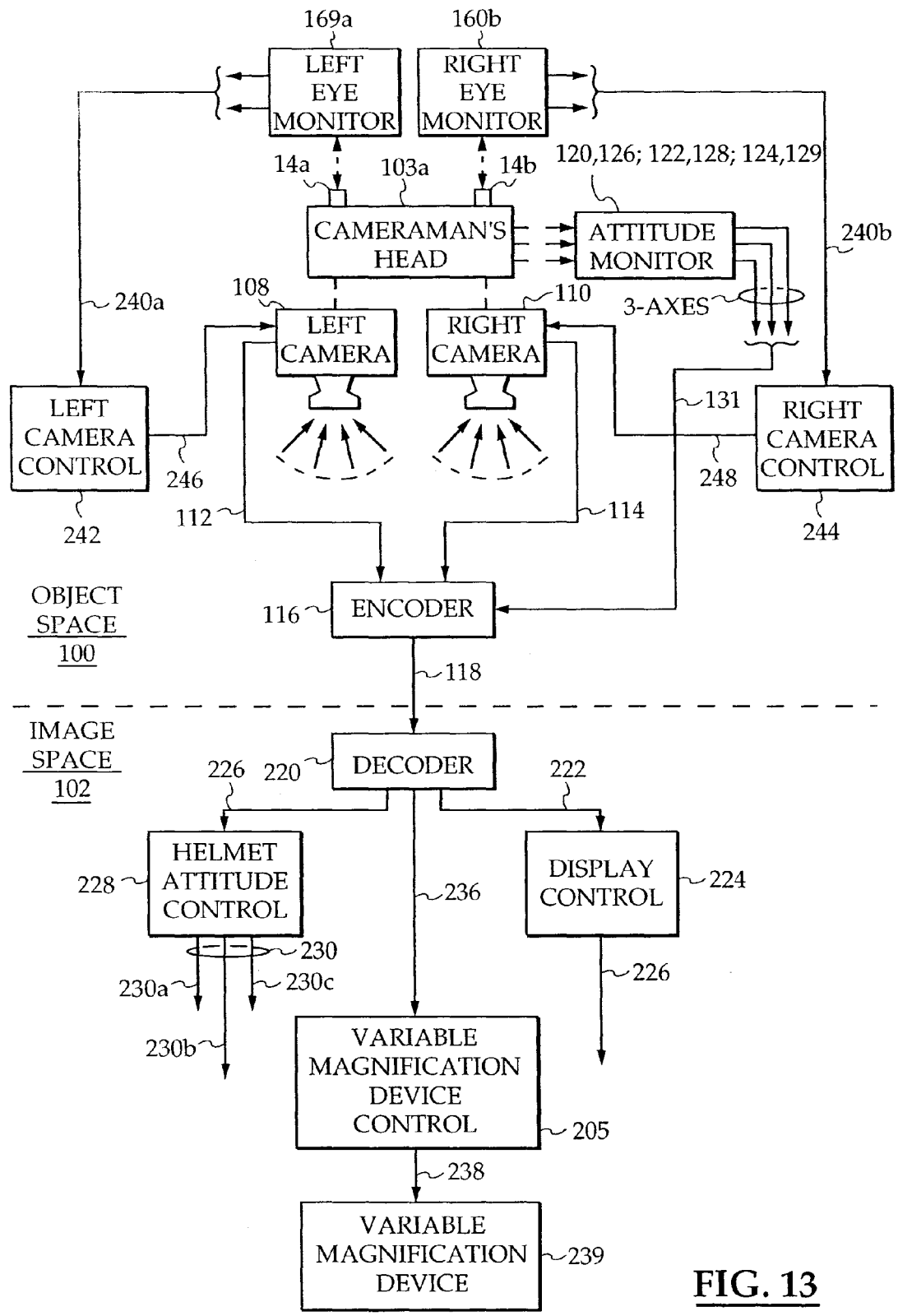
FIG. 13 illustrates aspects of the sensors and encoder of the object space as well as the decoder and controls of the image space in more detail, according to the invention.

A signal processor or decoder 220 in the image space 102 of FIGS. 7 & 13 is responsive to the encoded signal on the line 118 either directly (live) from the object space or prerecorded and played back on the playback device 218 and provided on a line 219. The decoder provides decoded image signals on a line 222 to a display control 224 which provides a signal on a line 226 for controlling the display 106 which may be mounted on the helmet 104 which may be monoscopic or stereoscopic, as described previously. The decoder 220 also provides a decoded helmet attitude signal on a line 226 to a helmet attitude control 228 which in turn provides a helmet attitude control signal on a line 230 to a plurality of actuators such as three actuators 232a, 232b, 232c mounted on a stationary plate 234 for actuating the helmet 104 in a corresponding plurality of axes such as three axes, as shown, emulative of the motions of the helmet 103 in the pitch, roll and yaw axes sensed in the object space 100. The attitude control 228 may, e.g., be a simple open loop having proportional plus integral gain. Although not shown, sensors could be provided on the platform 234 to sense position of the plate, for example, for providing feedback signals for a closed loop control. In any event, the control 228 provides actuator command signals on the line 230 for causing the actuators to carry out the control strategy described in connection with FIG. 17 below.

The decoder 220 may also provide a variable magnification control signal on a line 236 to the variable magnification device control 205 which in turn provides a variable magnification device control signal on a line 238 to a variable magnification device 239 (see FIG. 13) associated with the display 106 and as disclosed in more detail in application Ser. Nos. 08/025,975 and 08/001,736, now U.S. Pat. No. 5,422, 653. Of course it should be realized that one or more or even all of the signal processing for the control functions carried out in the image space by the controls 224, 205, 228 need not be carried out in the image space but could equivalently be carried out in the object space based on raw data available on the line 132 in the object space.

The plate 234 may, but need not, be fixedly mounted on a structure (not shown) that, e.g., has fixed structural parts 164 that are indicative of structurally stable parts of a mount for the plate 234 such as an arcade-like booth within which a viewer may be standing or seated for placing the helmet 104 on the viewer's head for guiding or inducing head movements of the viewer for passive viewing of images gathered in the object space by the cameraman in the helmet 103. In other words, the seated or standing passive viewer wearing the helmet 104 in the image space 102 is induced or guided to at least emulate pitch, roll and yaw head movements corresponding to the corresponding monitored head movements of the cameraman in the object space, in response to the encoded attitude information in the signal on the line 118, while at the same time watching corresponding images gathered by the cameras 108, 110 also encoded on the line 118 and decoded in the image space for passive viewing.

FIG. 13 shows in more detail the image acquisition apparatus in the object space 100 of FIG. 7, according to the present invention. The object space 100 of FIG. 13 shows a cameraman's head 103a which may be inserted in the helmet 103 of FIG. 7 and may therefore be considered to have a common coordinate system origin. The cameraman's head is illustrated as having a pair of left and right eyes 14a, 14b that are monitored by left and right eye monitors 169a, 169b that provide sensed eye attitude signals on lines 240a, 240b to respective left and right camera controls 242, 244. These in turn provide camera control signals on lines 246, 248 to the left and right cameras 108, 110, respectively. As mentioned, according to the invention, these control signals may, but need not, be used to control the relative position of a region of image nonuniformity including but not limited to a region of increased resolution, dynamic range, or the like, within each of the images provided to the passive viewer in the image space. Such a region is emulative of the increased sensitivity of the fovea of the particular monitored eye along the visual axis thereof.

The image space 102 of FIG. 13 is the same as shown in FIG. 7 except also showing a variable magnification device 239 which may be used with the display 106 of FIG. 7 so as to provide images with variable magnification, i.e., at various apparent distances. In other words, the device 239 causes the images from the display 106 to be provided in such a way as to cause the eyes of the viewer to accommodate differently for the various successive images presented thereto. The device 239 may be the same or similar to that shown in copending U.S. patent (application Ser. No. 08/025,975) or in the U.S. patent application Ser. No. 08/001,736, now U.S. Pat. No. 5,422,653, particularly in connection with FIGS. 3, 5, 6, 17, 19, 20, 21, and 26-35 thereof.

Figure 11:
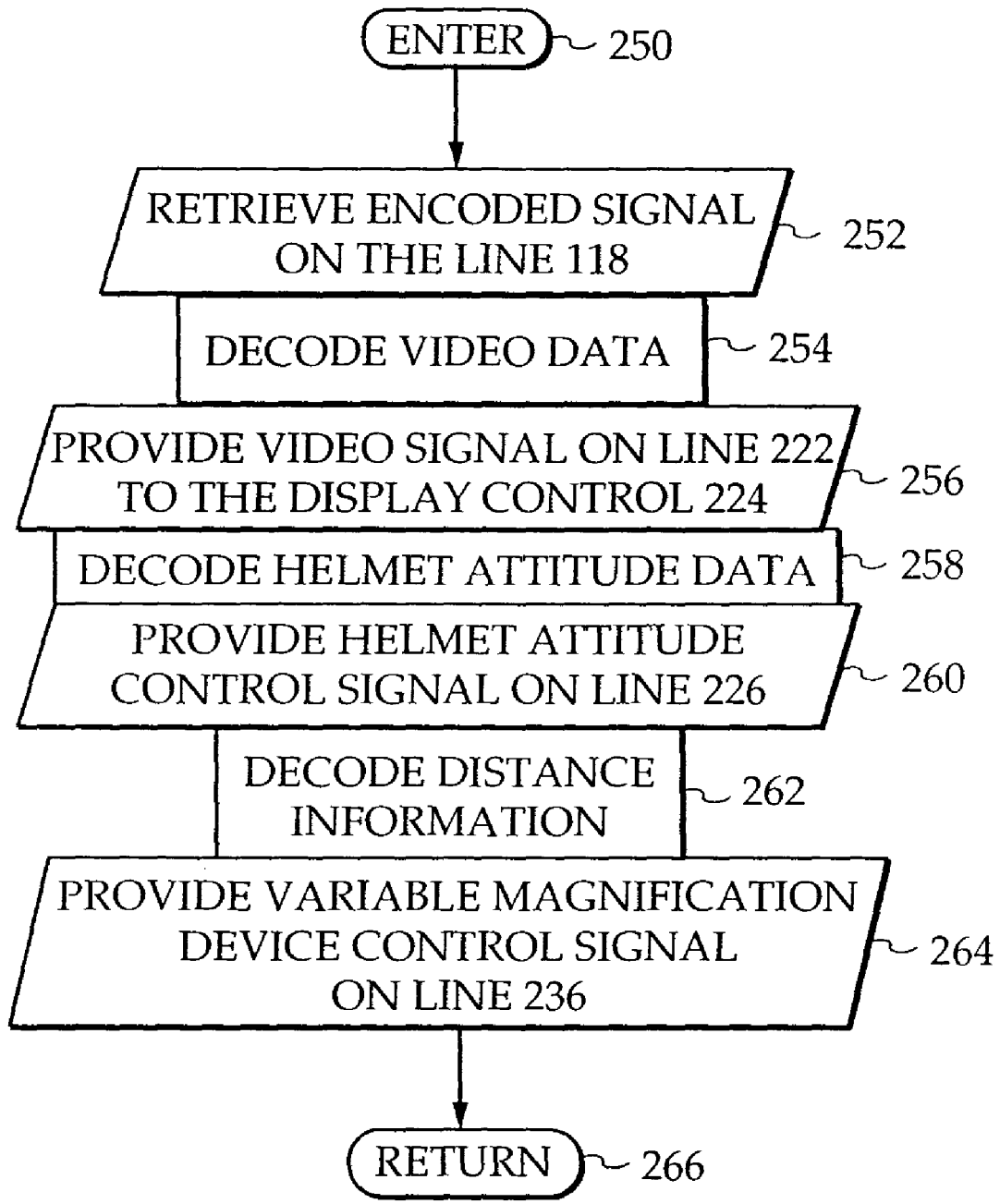
FIG. 11 shows a series of steps that may be carried out in the decoder in the image space, according to the invention.

FIG. 11 shows a process that may be carried out in the decoder 220 for decoding the signal on the line 118. After entering in a step 250, a step 252 is executed to extract the information encoded on the line 118. The video information may be decoded first, as indicated in a step 254. The video signal on the line 222 is then provided from the decoder 220 to the display control 224. A step 258 may next be executed to decode the helmet attitude data. In a step 260, the helmet attitude control signal on the line 226 is provided. After that, the previously encoded distance information is decoded in a step 262, and the variable magnification device control signal on the line 236 is provided in a step 264. A return is then made in a step 266.

Figure 14:
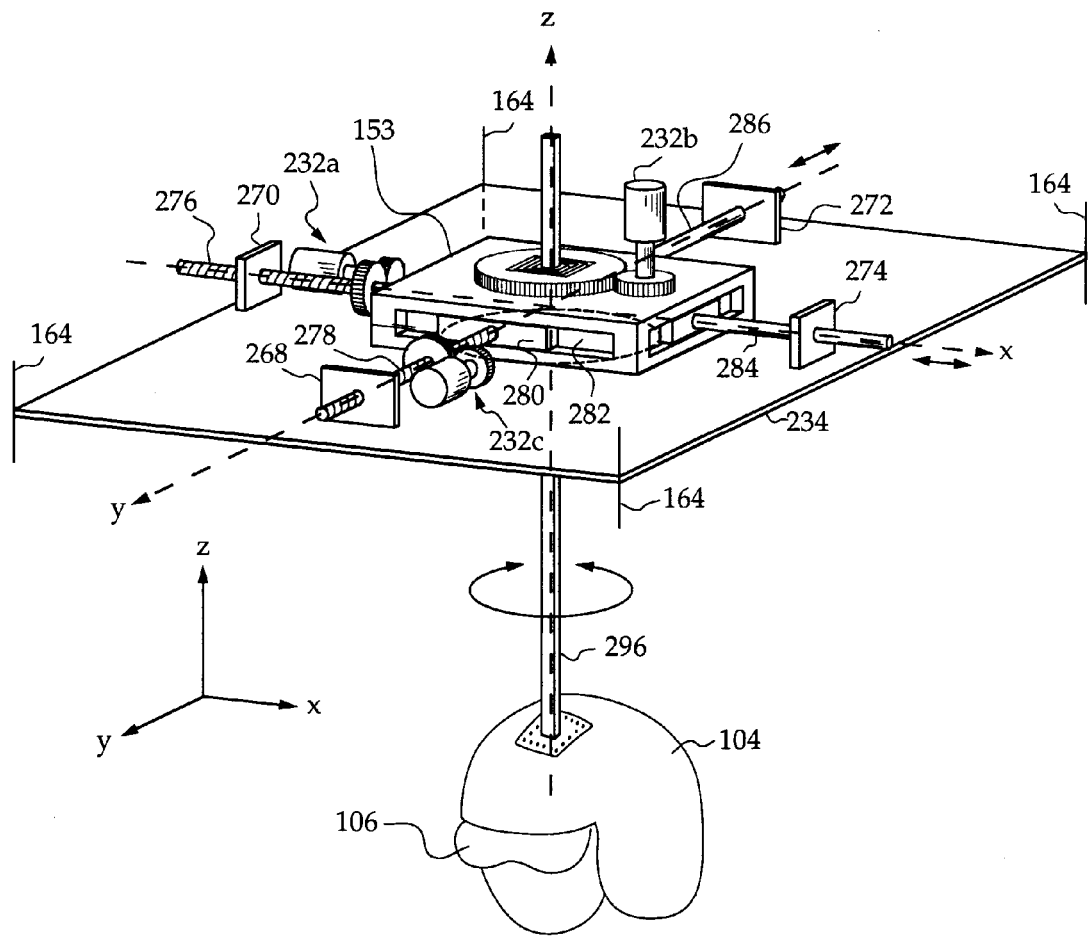
FIG. 14 shows in an expanded view the details of the motion-controlled helmet of the image space of FIG. 7, according to the present invention.

FIG. 14 illustrates the example of a motion-controlled helmet 104 of FIG. 7 in enlarged detail, according to the present invention. A structure (not shown) such as a stationary arcade-type booth or a moving positional and/or attitudinal simulator such as a vehicle simulator, has the platform 234 mounted fixedly within. This embodiment includes a moveable platform 153 mounted on the inside of the not shown structure, e.g., in the inside top part of a booth structure as an extension thereof. The booth may be designed for having the passive viewer standing or seated. Several pedestals 268, 270, 272, 274 are mounted fixedly on the platform 234. The moveable platform or plate 153 is controlled in the x-y plane by a pair of orthogonal, screw gear drives 232a, 232c corresponding to two actuators of the three actuator embodiment of FIG. 1. The first screw gear drive 232a includes a motor-gear assembly that drives the plate 153 by means of a screw 276 in the plus or minus x-direction. Similarly, the motor-gear assembly 232c drives the plate 153 by means of a screw 278 in the plus or minus y-direction. Mounted perpendicularly at the ends of the screws 276, 278 are slide bars, such as the slide bar 280 shown at the end of the screw 278. The slide bar 280, e.g., is slidably mounted within a slide guide 282 and the screw 278 is attached to a point of the slide bar but can rotate on that point. Similarly, stabilizing rods 284, 286 can be installed on opposite sides of the plate 153 with similar slides in slide guides in axial alignment with corresponding screws 276, 278 in order to give the control a framework within which to push the plate 153 about in the x-y plane.

Figure 15:
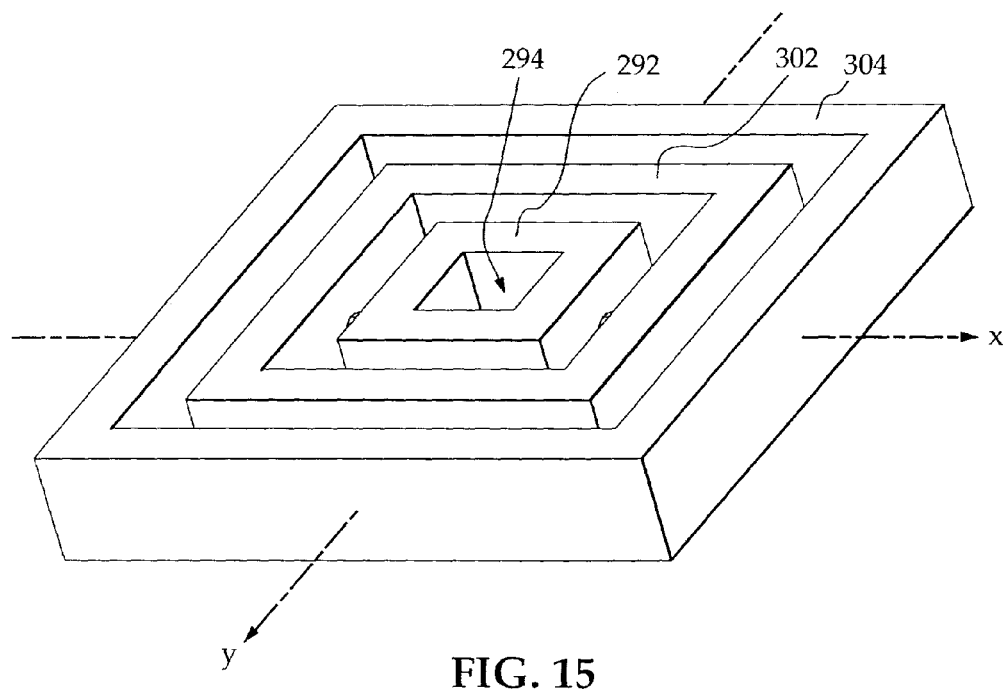
FIG. 15 shows a perspective view of a universal-joint such as may be fixedly mounted within the joint 106 of FIG. 14.
Figure 16:
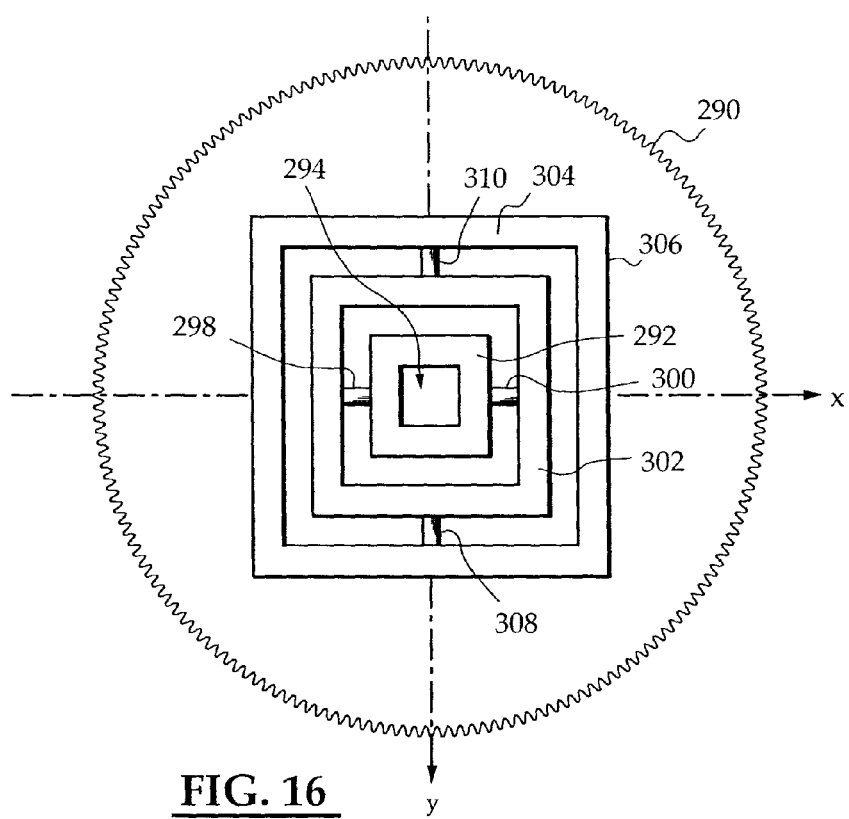
FIG. 16 shows in plan view the U-joint of FIG. 15 within the gear of FIG. 14.

The third actuator 232b turns a gear 288 that turns another gear 290 that has a universal-joint such as shown in FIG. 15 that has an internal part 292 (see FIG. 15) with a square hole 294 within that accepts a square rod 296 fixed on the helmet 104 for connection thereto, e.g., by slidable insertion therein. The internal part 292 is connected by pins 298, 300 (see FIG. 16) to an intermediate part 302 along the x-axis so that the parts 292 and 302 are freely rotatable with respect to each other along the x-axis. The intermediate part 302 is in turn connected to an outer part 304 that has an outside square boundary 306 that fits tightly in a square hole in the gear 290. The intermediate part 302 is connected to the outer part 304 by pins 308, 310 along the y-axis so that the parts 302, 304 are freely rotatable with respect to each other about the y-axis.

It will be realized that the illustration of FIG. 14 is for teaching purposes and the motor 232b will have to be fixedly attached in some way, e.g., by a bracket (not shown), to the plate 153. The gears 288, 290 are likewise rotatable within casings (not shown) fixed to the plate 153. The square rod 296 is connected to the U-joint of FIG. 15 and slides up and down freely through the square hole 294 of the universal joint. Similarly, the rod 296 of the helmet 104 is not shown actually inserted in the universal joint for purposes of clarity. It will also be realized that the universal joint need not take the form shown, since many other u-joints are known, and that even if the form taken is generally the same, the various parts of the universal joint need not be square. The display 106 is shown mounted on the helmet but the display may instead be a panoramic display mounted in a stationary manner with respect to the not shown structure 164. The three actuators 232a, 232b, 232c are separately responsive to corresponding separate components 230a, 230b, 230c of the control signal 230 of FIG. 7 for being actuated thereby.

It should be realized that the number of axes of control need not be as extensive or could even by more extensive than that shown, since many simplifications or elaborations are quite possible. It was already indicated above that it was not desired, for the preferred embodiment, to control position (translations) per se. It was preferred to leave the control of head positioning to the viewer himself given that his head's pitch, roll and yaw axes were being so fully constrained. This freedom is granted to the viewer by making the rod 296 freely slidable within the U-joint. Position was therefore divorced from attitude in the preferred embodiment and only attitude was positively controlled. In this way, the viewer could have the freedom to move his head along the axis of the rod 296. It should be realized, however, that it would be possible to more positively control position, at least to some degree, i.e., with respect to the fixed referent, such as the arcade booth, by simply adding another actuator to the device of FIG. 14 for retracting or extending the rod 296 (e.g., with teeth added) in or from the U-joint and making some minor modifications thereto. In other words, it should be realized that there are many different ways of connecting or coupling an actuator to a passive viewer's head for controlling or guiding the movements thereof and the invention is broadly directed to having an apparatus that can be controlled to move a display to guide the passive viewer's head to allow the viewer to view an image in a manner emulative of a corresponding active viewer's head movements. It should be realized that the sensed attitude signals of FIG. 7 need not be actually sensed but can instead be dictated by a pre-planned program of head movements by a workstation 80. It will therefore be understood that the various devices including actuators shown here are merely illustrative of the invention and many other embodiments are within the scope of the claims.

Figure 17:
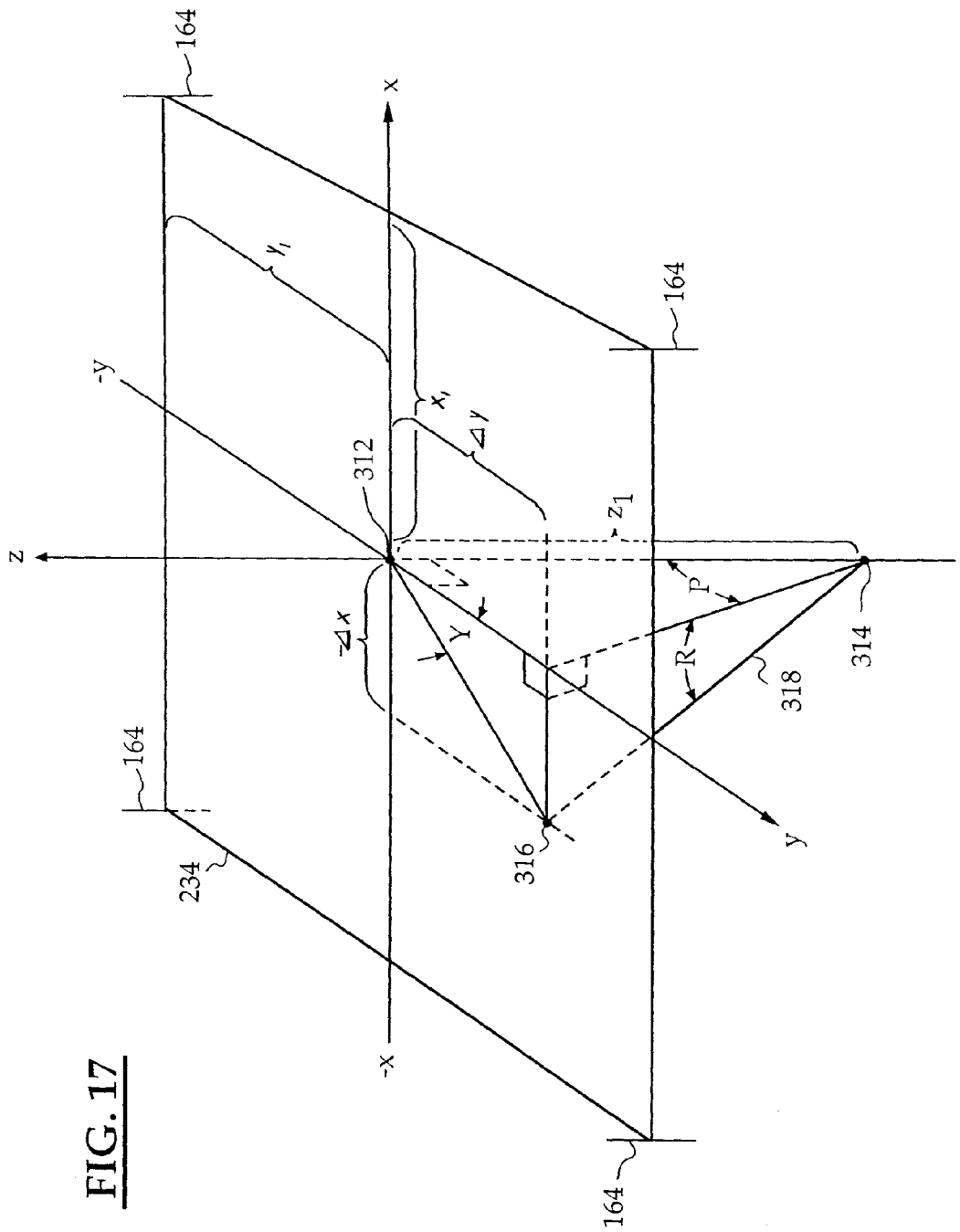
FIG. 17 shows a coordinate system appropriate for the motion-controlled helmet of FIGS. 7 and 14 by means of which the sensed signals in the object space of FIGS. 7, 12, and 13 can be transformed into attitudinal movements of the viewer's head.

With this in mind, an example will now be given of how to use the sensed head attitude signals from the image space to cause the actuators 232a, 232b, 232c to actuate the helmet, using the exemplary actuator of FIGS. 7 and 14, in such a way as to cause the passive viewer to emulate the corresponding attitudinal head movements of the cameraman. FIG. 17 shows such an example where the platform 234 of FIGS. 7 & 14 is shown with the x, y, z coordinate system of FIG. 14 with its x-y origin 312 so placed as to be entered on the platform. Of course, this is just a convenient place to put it and it could be centered elsewhere as well. A point 314 represents the center of the head of the viewer in the helmet 104 in the image space 102 (see also FIG. 7). It may be assumed for purposes of the example that a distance $Z_1$ between the points 312, 314 is constant. This is an approximation good for the case where only three attitudinal axes are positively measured and/or controlled, and not position, as in the exemplary embodiment of FIG. 7. It will therefore also be assumed that there is no positional (i.e., translatory) movement of the head origin 314 in the x, y and z directions with respect to the origin 312 and that all the distances $x_1$, $y_1$ and $z_1$ are therefore constant as well. It should be well understood, however, that more or less than three axes may be positively measured and controlled, including translatory position of the head. In the exemplary embodiment, where only head attitude is of interest and is measured in three axes and similarly controlled in those axes, it may be assumed for purposes of approximation, that the origin of the head of the cameraman/viewer is positionally stationary, i.e., is not translating with respect to the origin 312 of the platform 234. However, it should clearly be understood that this may not and need not be the case and that the distances $x_1$, $y_1$, and $z_1$ between the platform 234 and the origin 314 can be positively controlled and used as a parameter in determining the image to be provided to the eyes of the viewer. This of course implies a sensing of a similar parameter in the object space as previously explained in connection with the steps of FIG. 9, for example. This applies to the distances $x_1$ and $y_1$ in the x and y axes separately or equally, as desired.

In any event, it may be assumed for purposes of approximation for the illustrated embodiment that the head origin 314 is positionally immobile and that, as a result, $x_1$, $y_1$, $z_1$ are constant and that the only variables are the sensed pitch, roll, and yaw parameters, as indicated in FIG. 17 by angles P(y-z plane), R(x-z plane) and Y(x-y plane), respectively. It may be assumed for purposes of visualization and convenience of illustration that the not illustrated viewer in a rest or zero position is sitting or standing erect with his head centered at point 314 and facing in the positive y direction.

If it is desired to move the viewer's head so as to be guided to assume a particular pitch and roll attitude, such as dictated by the signals on the line 230 of FIG. 7, the plate 153 of FIG. 14 will be moved into a position so as to position the universal joint in the gear 290 at a particular position such as centered at a position 316 shown in FIG. 17. A shift of minus Δx and positive Δy, as shown, will effect such a change. This will cause the rod 296 to be aligned along an axis 318 intersecting the points 314 and 316 and the viewer's head will assume the desired pitch and roll attitude at particular pitch and roll angles P, R. Trigonometry can be used to calculate the Δx and Δy movements that will result in the desired pitch and roll angles. For example, if the P angle is determined in the step 152 of FIG. 9, as previously described, the step 154 calculates the Δy needed to obtain the desired P angle based on the fixed distance z.sub.1 and the desired angle P. I.e., Δy=$z_1$ tan P. The actuator 232c of FIG. 14 then causes the platform 153 to move in the positive y direction by the calculated length Δy.

Correspondingly to the method of FIG. 9 for the pitch axis, it will be realized that the method of FIG. 9 can be adapted to apply as well to the roll axis. The illustrated roll angle R is obtained, e.g., by a negative Δx translation of (Δy)(tan R)/(sin P) or, equivalently, $\Delta x = z_1 \tan R$. The actuator 232a of FIG. 14 may then be used to move the platform a distance of Δx in the negative direction.

The third degree of freedom, i.e., the yaw axis may be controlled directly by means of the actuator 232b of FIG. 14. By turning the gear 288, the gear 290 and the universal joint within are rotated by the angle Y and the head of the passive viewer is accordingly rotated by the angle Y.

Upon induced movement by the apparatus of FIGS. 14 & 17, for the illustrated embodiment, the viewer's head need not stay precisely centered or positioned at point 314 as this is just an approximation. The attitudinal changes of the viewer's head induced by the apparatus of FIGS. 14 & 17 will naturally be accompanied by some small translatory movements due to the interaction of the head, neck, and body of the viewer even though the body be relatively stationary. In other words, the rod 296 is able to slide within the U-joint and the viewer can have some control over the translatory position of his head along the axis of the rod 296. Nevertheless, other embodiments are possible in which the passive viewer's head position is more precisely controlled.

Similarly, it will of course be realized that the known principles of transformation of coordinate systems may be employed to transform and translate the sensed signals in the object space of FIG. 7 into the coordinate system of FIG. 17, as desired.

It should also be understood that the attitude control signals on the line 230 of FIG. 7 change from time to time to cause the viewer's head to assume various different attitudes. At the same time, it should be understood, correspondingly different attitudinal views of the depicted scene are presented on the display 106 so as to provide a harmoniously changing viewpoint for the passive viewer. In other words, the viewer is made to think that he is viewing a real world object space from different angles as his head is guided in changing attitudes. These different views may be provided by the cameras 108, 110 on the cameraman's head but can be generated by other means 86 such as animation or computer generated imagery.

As mentioned above, in connection with FIGS. 7 & 13, the signal processor or encoder 116 receives at least one video signal from at least one camera and, in the embodiment illustrated, receives two video signals 112, 114 from left and right video cameras 108, 110 to provide a stereoscopic video signal to the image space. These signals that are encoded by the signal processor or encoder 116 may be provided to the decoder 220 in the image space 102 so as to provide a viewer with stereoscopic images of the object space. These may be provided by separate displays, one for each eye, or may be provided by the same display alternately, using light shutters, as known in the art of stereo television.

As described above, the viewer can be drawn even more deeply into the experience of the cameraman (or a computer generated version thereof) by having his visual axes induced or guided to emulate those of the cameraman. This is not necessary but represents an enhancement of the invention. This is done by monitoring the visual axes of one or more eyes of the cameraman in order to determine the direction of his gaze. That information is then used to produce each image in such a way that it has nonuniform informational content over its expanse. In other words, a portion of each image will have more or less information content concentrated or highlighted therein, in order to draw the attention of the viewer thereto. The particular portion of each successive image that has this extra level of informational content or highlighting will be changed between successive images such that it moves about within the field of view of the viewer according to the direction of the cameraman's gaze within his field of view and the passive viewer's eyes will naturally move about in emulation thereof. This sort of a passive viewing of an image nonuniformity, e.g., of a high concentration portion of the image is disclosed in detail in U.S. patent application Ser. No. 08/001, 736, now U.S. Pat. No. 5,422,653.

As also mentioned, FIG. 13 shows a pair of eye monitors 169a, 169b that provide sensed signals on the lines 240a, 240b to left and right camera controls 242, 244 which in turn provide left and right camera control signals on the lines 246, 248 for controlling the image nonuniformity or high informational content portion of the respective image signals on the lines 112, 114.

The nature of the nonuniform images can be selected according to the demands of a given application and need not be of any particular type. They may be of the type shown, for example, in U.S. Pat. No. 3,953,111 by a nonlinear lens or as shown in U.S. Pat. Nos. 4,028,725 or 4,405,943 or 4,513,317 (see FIGS. 2, 3 & 4 in particular) or U.S. Pat. No. 3,507,988 or as shown in the above mentioned application U.S. Ser. No. 08/001,736 (nonuniform resolution), now U.S. Pat. No. 5,422,653 or as described below by images having nonuniform dynamic range for the individual pixels therein. Nonuniform resolution images may be provided in analog or digital fashion as described in the U.S. patent application Ser. No. 08/001,736 (now U.S. Pat. No. 5,422,653) in connection with FIGS. 7(a), 7(b), 8-12, 13(a)-(c), and 14 and as described in the accompanying text thereof beginning at page 29, line 3 through page 51, line 14 which is hereby expressly incorporated by reference. Similarly, a nonuniform dynamic range technique may be used in lieu of nonuniform resolution, particularly for digital embodiments. In such a case, a small group of pixels within the total picture are selected to be sensed and/or encoded with a greater number of levels or shades of gray than the larger remainder portion of the total picture. For these pixels, more digital bits are used so as to achieve the greater number of levels. The position of the small group within the total image may be moved as between successive images or within a single image according to the cameraman's monitored eye movements within the cameraman's field of view. To carry out the nonuniform imagery, regardless of type, all that is required is that the portion of each successive image that contains the nonuniformity content be presented in such a way as to draw the attention of the viewer's gaze so that the nonuniform portion falls on the viewer's fovea.

Figure 18:
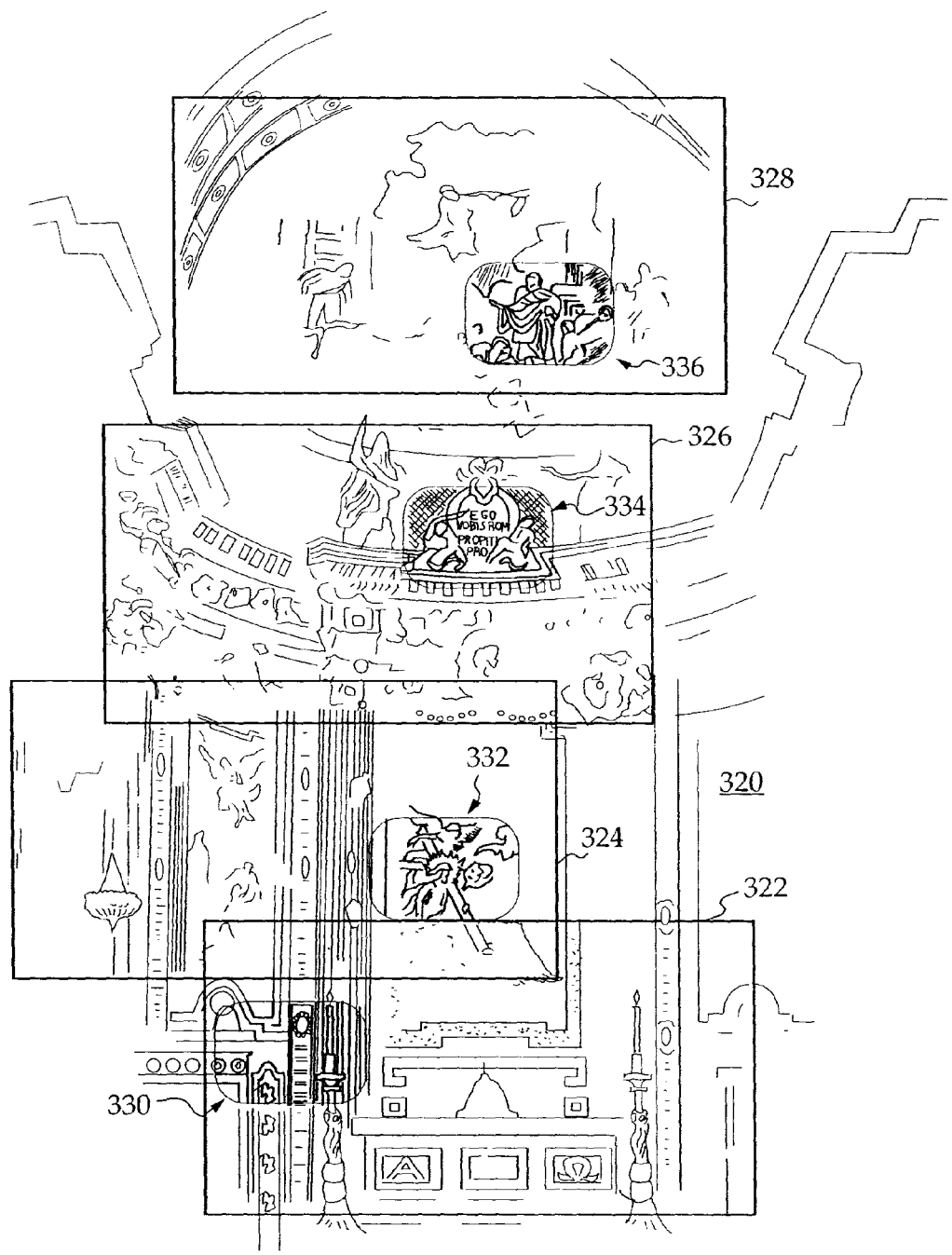
FIG. 18 shows a series of monocular images gathered by a cameraman in an object space for presentation to a passive viewer as nonuniform images, according to the invention.

For example, FIG. 18 shows an object space 320 comprising the interior of St. Ignatius in Rome. A cameraman such as the cameraman of FIGS. 7 and 13 is located in the object space 320 with a helmet for gathering monocular or stereoscopic images. Assuming the cameraman is seated in the church, as the cameraman moves his head to look about by making attitudinal (pitch, roll, and yaw changes, the camera or cameras pick up the images 322, 324, 326, 328 shown over a short period, e.g., a second or two more or less. It may be assumed that for the first image 322, the cameraman is seated, with his head level and pointing straight ahead, e.g., pointing in the +y direction of FIG. 17. Due to the attitude monitors of FIG. 7 and the control signals developed therefrom as explained in connection with FIG. 9, the display apparatus in the image space will also be oriented so as to cause the passive viewer's head to be similarly oriented so as to see the same image 322 with his head in the same attitude as that of the cameraman.

The images may be provided with uniform resolution. In the particular instance illustrated, however, for the acquired image 322, the cameraman's visual axis is not directed straight ahead but off to the left as monitored, e.g., by the oculometer 166 of FIG. 7 or 180a, 180b of FIG. 12 or monitors 169a, 169b FIG. 13. As a result, the displayed image has a small area 330 that has higher image informational content than the rest of the image which is shown with fainter lines to indicate a lesser degree of image informational content. The area 330 may be of higher resolution, dynamic range, or the like. The passive viewer's visual axis is naturally drawn to be directed on the area 330 for viewing by the fovea of the passive viewer's eye. As a result, the viewer emulates with foveal viewing not only the head movements of the cameraman but also his eye movements.

Figure 20:
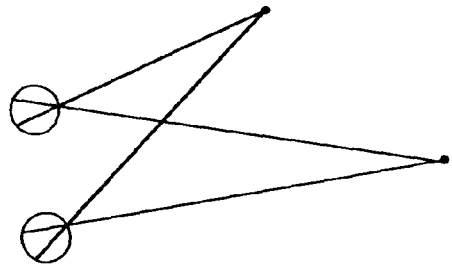
FIG. 20 shows a pair of eyes fixating at different points.
Figure 19:
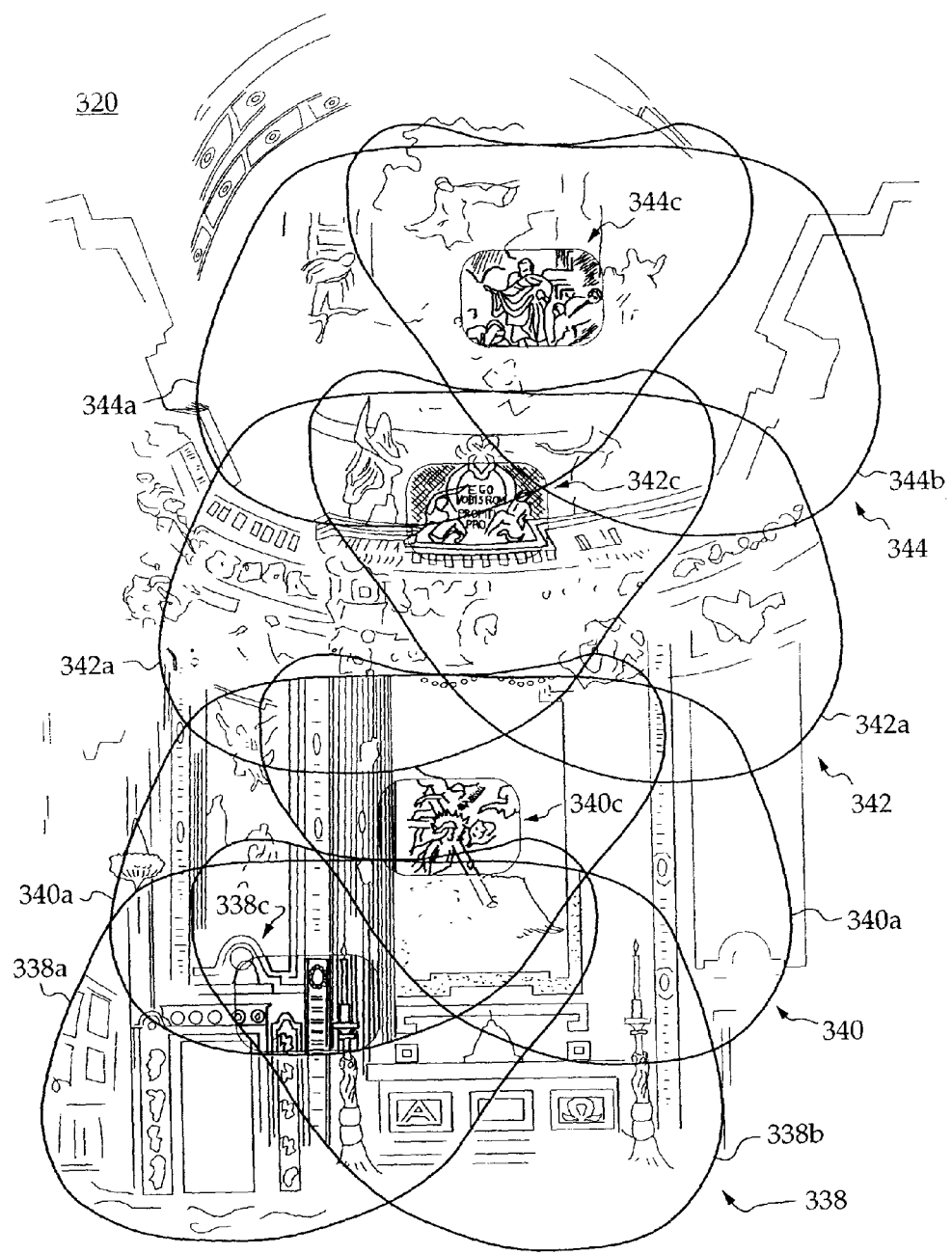
FIG. 19 shows a series of stereo images similar to those of FIG. 18, according to the invention.

It should be mentioned that if a variable magnification device such as the device 239 of FIG. 13 is used, the magnification of the image 132 can be changed according to the control signal on the line 238 to change the accommodation of the eyes of the passive viewer. An example of such is shown in FIG. 20, where a pair of eyes are shown fixating first at a straight ahead point at a far distance and then at a closer point but off to the side. Thus, the images 134, 136, 138 to be described below can be viewed with differing accommodation, especially to the extent that they represent objects at differing distances as indicated by the eye monitor or monitors 169a, 169b. In this way, the variable magnification device is responsive to light from the light source and to a variable magnification control signal, for changing the apparent distances of the images. It should be realized that the changing of the apparent distances can also be accomplished by changing the actual distance of the display, in response to a control signal. It should also be realized that the degree of accommodation experienced in the eyes of the viewer can be coordinated with convergence of the eyes so as to maintain a selected relationship therebetween, preferably a normal relationship, e.g., as shown in FIG. 19 of copending application Ser. No. 08/462,503.

The cameraman next moves his head up and to the left, i.e., executes a clockwise movement (pitch) in the y-z plane and a counterclockwise (viewed from above) movement (yaw) in the y-x plane of FIG. 17. The acquired image 324 is the result. It will be observed that the cameraman's visual axis has changed its point of attention within the object space to a small area 332 on a lower right hand side of "his" field of view. The display apparatus in the image space of FIG. 7 will cause the passive viewer to execute similar attitudinal head movements. Similarly, the passive viewer's eyes are naturally drawn to the small area 332 for viewing by the fovea of the passive viewer's eye. If the small area 142 is or should be represented at a different distance than the area 140 then the variable magnification device may be used to cause a differing accommodative response.

The cameraman next moves his head up and to the right, i.e., executes a clockwise movement (pitch) in the y-z plane and a clockwise movement (yaw) in the y-x plane and acquires the image 326. The cameraman's visual axis in this case is still directed to the right but slightly above to a small area 334 of higher image informational content. The display apparatus in the image space of FIG. 7 will cause the passive viewer to execute similar attitudinal head movements. Similarly, the passive viewer's eyes are naturally drawn to a small area 334 for viewing by the fovea of the passive viewer's eye.

And if a change in accommodation is appropriate, such can be controlled according to the device 239 of FIG. 13.

Finally, the cameraman next moves his head further up and to the right, i.e., executes a clockwise movement (pitch) in the y-z plane and a clockwise movement (yaw) in the y-x plane and acquires the image 328. The cameraman's visual axis in this case is still directed to the right but slightly down to a small area 336 of higher image informational content. The display apparatus in the image space of FIG. 7 will cause the passive viewer to execute similar attitudinal head movements. Similarly, the passive viewer's eyes are naturally drawn to the small area 336 for viewing by the fovea of the passive viewer's eye and appropriate accommodative changes can be induced. The illustrated head movements then continue in a similar way.

Although no roll movements (in the x-z plane) have been illustrated (as a tilt) in FIG. 18, such are of course contemplated, according to the invention. It should be realized that the images gathered in the object space and presented in the image space succeed each other at a very rapid rate, e.g., 30, 60, 120 or even more frames per second. Thus, for the illustration of FIG. 18 there will likely be a multitude of images presented beyond the few shown so that the sequence or presentation of images is much smoother than indicated.

As already indicated in connection with FIG. 7, the images gathered in the object space may be stereoscopic. Such may be presented by the display in the image space of FIG. 7 in any convenient stereoscopic format of uniform or nonuniform resolution presentation. For a narrow field of view such as shown in FIG. 18 (e.g., on the order of 30-45 degrees) the stereopair images are completely overlapped and still only cover half of the full 90 degrees of binocular vision of the human visual process. An Asher-Law stereoscope as taught in FIGS. 20-22 of copending application Ser. No. 08/462,503 would be a suitable means of presentation as described at page 64, line 24 through page 68, line 8 which is hereby incorporated by reference.

As shown in application Ser. No. 08/462,503, based on U.S. Ser. No. 08/1,736, now U.S. Pat. No. 5,422,653, a stereopair may be partially overlapped as described at page 57, line 6 through page 63, line 20 and as shown in FIGS. 17 and 18(a)-(d) with separate very narrow field of view areas of high image informational content in the separate left and right views coinciding and moving about together within an area of binocular overlap. Such an approach is particularly appropriate where an overall very wide field of view is presented, e.g., wider than 90 degrees, i.e., where the areas outside 90 degrees are monocular, in imitation of the human field of view. Such wide angle images can be acquired with a high degree of detail over the full field of view of the human visual apparatus using an array of image sensor modules such as shown in U.S. Pat. No. 4,323,925. Or, a pair of virtual retinal displays such as shown in U.S. Pat. Nos. 5,467,104, 5,596,339, or 5,574,473 can be used. The degree of detail achieved, however, is chiefly important in the area of stereoscopic foveal viewing.

For example, as shown in FIG. 19, a sequence of four stereoscopic images 338, 340, 342, 344 similar to the sequence of FIG. 18 are shown, each comprising corresponding overlapping left and right halves 338a, 338b; 340a, 340b; 342a, 342b; 344a, 344b. Each half represents the field of view of a respective left or right eye. Each can have a horizontal field of view of as wide as 140 degrees, approximately corresponding to the full human monocular field. An inverted triangular shaped area of overlap of each pair is viewed stereoscopically, i.e., binocularly and can be as wide as 90 degrees horizontally corresponding to the full horizontal extent of human binocular overlap. As in FIG. 18, the images sequence from the bottom to top of the Figure with an accompanying sequence of head movements. Within each triangular shaped area of binocular overlap in each pair are two overlapping areas of high concentration image information 338c, 340c, 342c, 344c. Since these are overlapping in the Figure, they appear as one. They are similar to those shown in FIG. 18 except for being indicative of binocular foveal fusion.

For thus viewing stereo images by two eyes, the light control signal contains information for providing light for viewing stereo images having a portion with high informational content and a portion with low informational content and wherein the portion with high informational content changes position within the images for foveal viewing by the two eyes by following the position changes. If it is desired to include one or a pair of variable accommodation devices, such can be used to change the accommodation of the two eyes either together or independently. Moveover, the light control signal can contain information for providing the light for viewing stereo images having a portion with high informational content and a portion with low informational content and wherein the portion with high informational content changes position within the images for foveal viewing by the two eyes by following the position changes at correspondingly changing convergence, i.e., at correspondingly changing visual fixation points. In other words, the visual axes of the eyes will intersect at varying points in a three-dimensional image space. The accommodative changes to be induced at each such fixation point can be controlled for each eye independently, or for both eyes to the same degree. Independent treatment is more important at close fixation point distances. This is because the distance from one eye to the point of fixation may be markedly different from that of the other. Such occurs primarily when a close fixation point is markedly off to one side or the other of the viewer's field of view.

Figure 21:
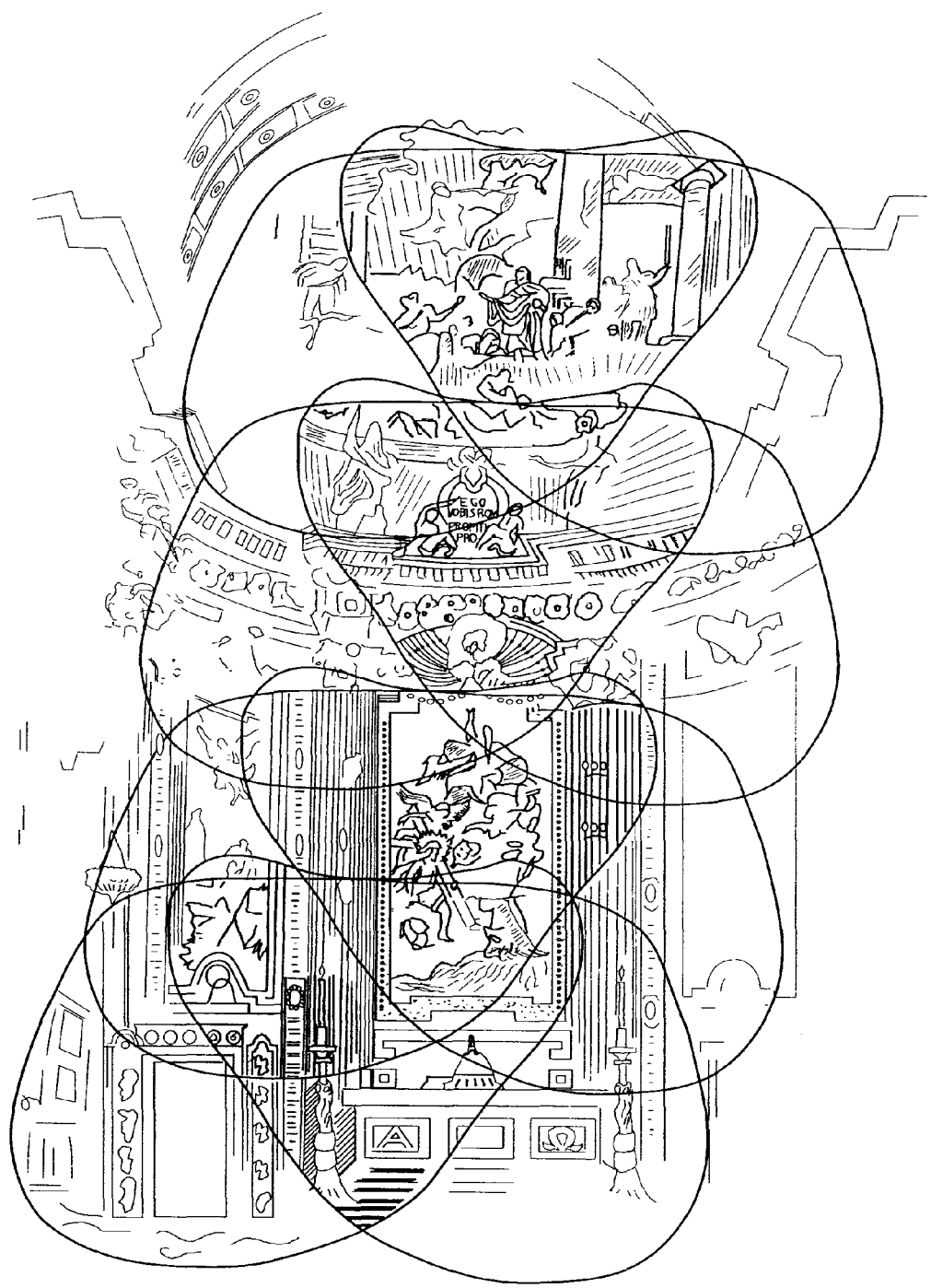
FIG. 21 shows a series of stereo image pairs similar to those of FIGS. 18 and 19 that achieves high resolution binocular viewing, except without a need for eye tracking in the object space, according to the invention.

It may be the case that eye tracking in the object space is not desired but that an emphasis of the binocular area of overlap is nonetheless wanted. In that case the area of high resolution emphasis can be enlarged, e.g., as shown in FIG. 21 to cover the entire area of binocular overlap in a sequence similar to those shown in FIGS. 18 & 19. In such a case, no matter where the viewer chooses to fixate within the binocular overlap area he will view the imagery with a high level of resolution. This would eliminate the need for controlling the position of a small area of high informational content by eye monitoring or the like while at the same time reducing the informational content in the areas of nonoverlap of the monocular fields, albeit with the loss of full control of simulation of active percepts for passive viewing. Similarly, a central, fixed area of each of the images FIG. 18 could be rendered with higher informational content or highlighted in a selected manner.

As already suggested above, it may also be useful to provide the image to the viewer at various apparent distances as shown for example in copending application U.S. Ser. No. 08/25,975 at page 6, line 25 through page 32, line 10 by means of a variable magnification device such as shown (but not limited to) in application having U.S. Ser. No. 08/1,736 at page 24, line 23 through page 29, line 2 in connection with FIGS. 3-6 thereof, and at page 70, line 11 through page 72, line 2 in connection with FIGS. 26-35 thereof, all of which is hereby expressly incorporated by reference.

For a virtual retinal display, on the other hand, all the objects can be represented at the same time at their various apparent distances by appropriate defections of the scanning light beam, e.g., by actuating lenses and mirrors for providing the light beam from a selected trajectory for each pixel impinging on the retina of the viewer. In that case, according to the present invention, the eyes of the passive viewer can be induced to follow a selected series of visual fixations by "painting" only a small portion of the scene with a fine light beam and the rest a coarse beam. The viewer's eyes will then be induced to turn their foveas in the direction of the fine portion of the scene.

In connection with any of these various types of images, as also suggested above, it may be desired to present the images to the eyes of the viewer at various apparent distances in such a way as to preserve a selected relationship such as, but not necessarily, a normal relationship between accommodation and convergence in the eyes of the viewer. Such is shown, for example, beginning with FIG. 19 and as described beginning at page 63, line 21 through page 68, line 8 and in further connection with FIGS. 20-22 of the above mentioned U.S. Ser. No. 08/1,736, now U.S. Pat. No. 5,422,653, which is incorporated by reference. For a virtual retinal display as modified as described above, the effect is automatic, assuming the representative of apparent distances is accurate. Merely by being induced to fixate on a point at the desired distance, the eyes of the passive viewer accommodate and converge harmoniously, in a normal manner.

Figure 23:
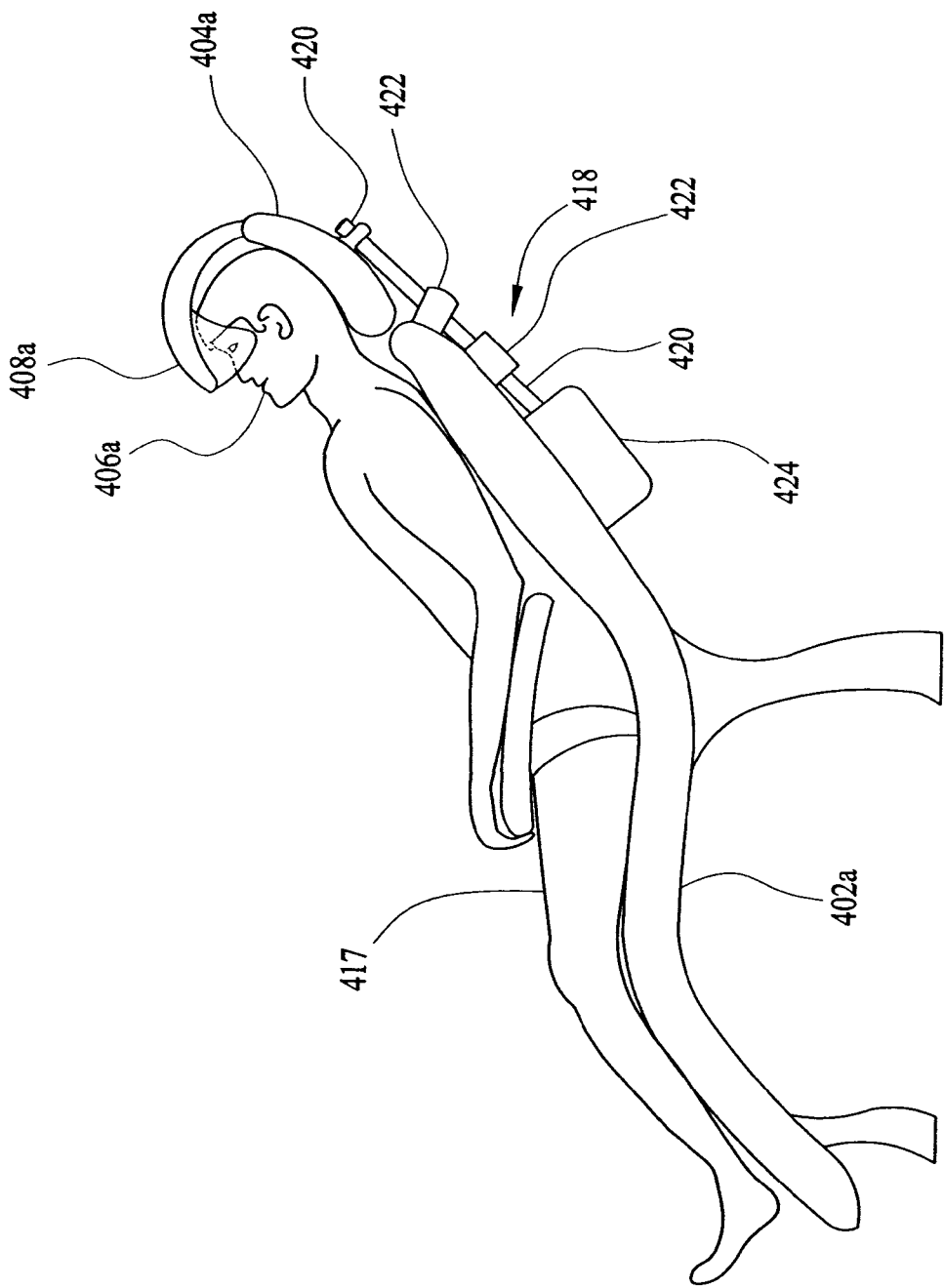
FIG. 23 shows a user reclining on a support in the form of a recliner equipped with a moveable headrest while viewing images from a changing direction, according tot invention.
Figure 24:
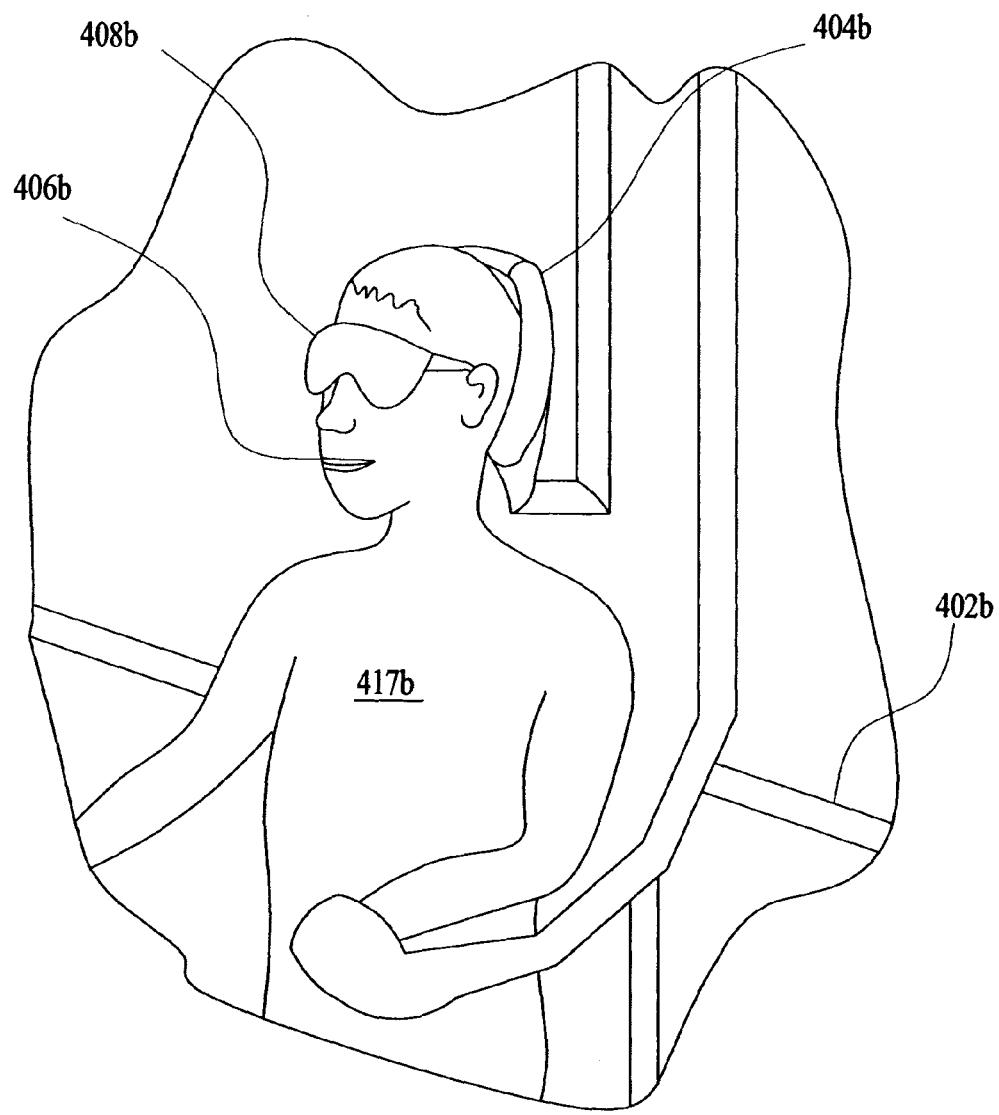
FIG. 24 shows a user standing on a support in the form of a human activity simulator equipped with a moveable headrest while viewing images from a changing direction, according to the invention.
Figure 25:
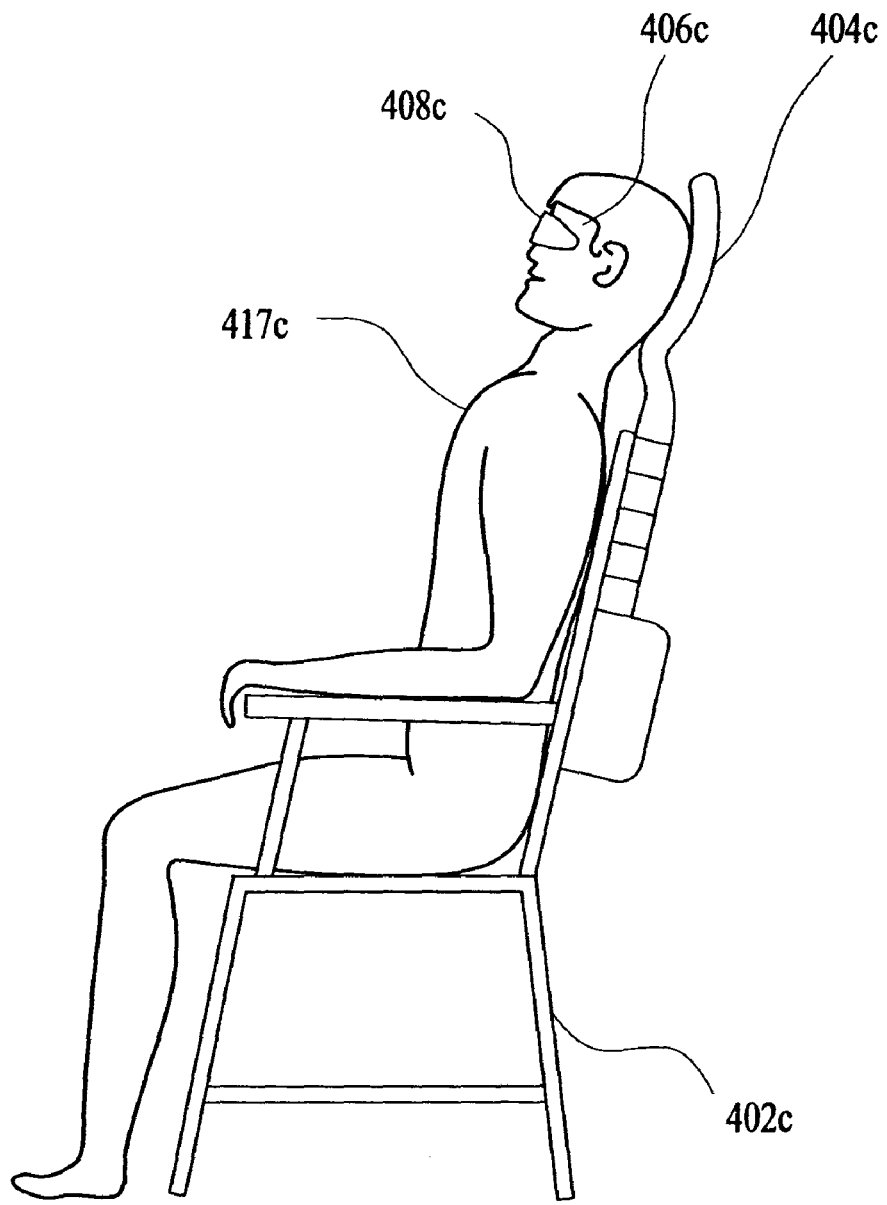
FIG. 25 shows a user seated on a support in the form of a chair equipped with a moveable headrest while viewing images from a changing direction, according to the invention.

The helmet mounted display of the image space of FIG. 1 can take the form as shown, for example, in FIGS. 23-25 of U.S. patent application Ser. No. 08/1,736 as described beginning at page 68, line 9 through page 70, line 10, now U.S. Pat. No. 5,422,653, which is incorporated by reference.

Similarly, although not disclosed herein, it should be realized that an audio component of the video signal on the line 226 may be provided as well by placing microphones in the object space such as positioned in strategic locations on the cameraman's head. Similarly, speakers may be provided in the image space and located in analogous positions about the head of the viewer for receiving decoded audio signals from the decoder. I.e., the speakers may be placed strategically about the helmet for reproducing sound as if from three dimensions as heard by the cameraman. Such is shown in detail in (application Ser. No. 08/1,736) U.S. Pat. No. 5,422,653 at col. 29 (page 52), line 4 (18 through col. (page 57), line (5) in connection with FIG. 16 and at col. (page 68), line (14) through col. (page 69), line (7) in connection with FIG. 23, all of which is hereby expressly incorporated by reference.

Figure 22:
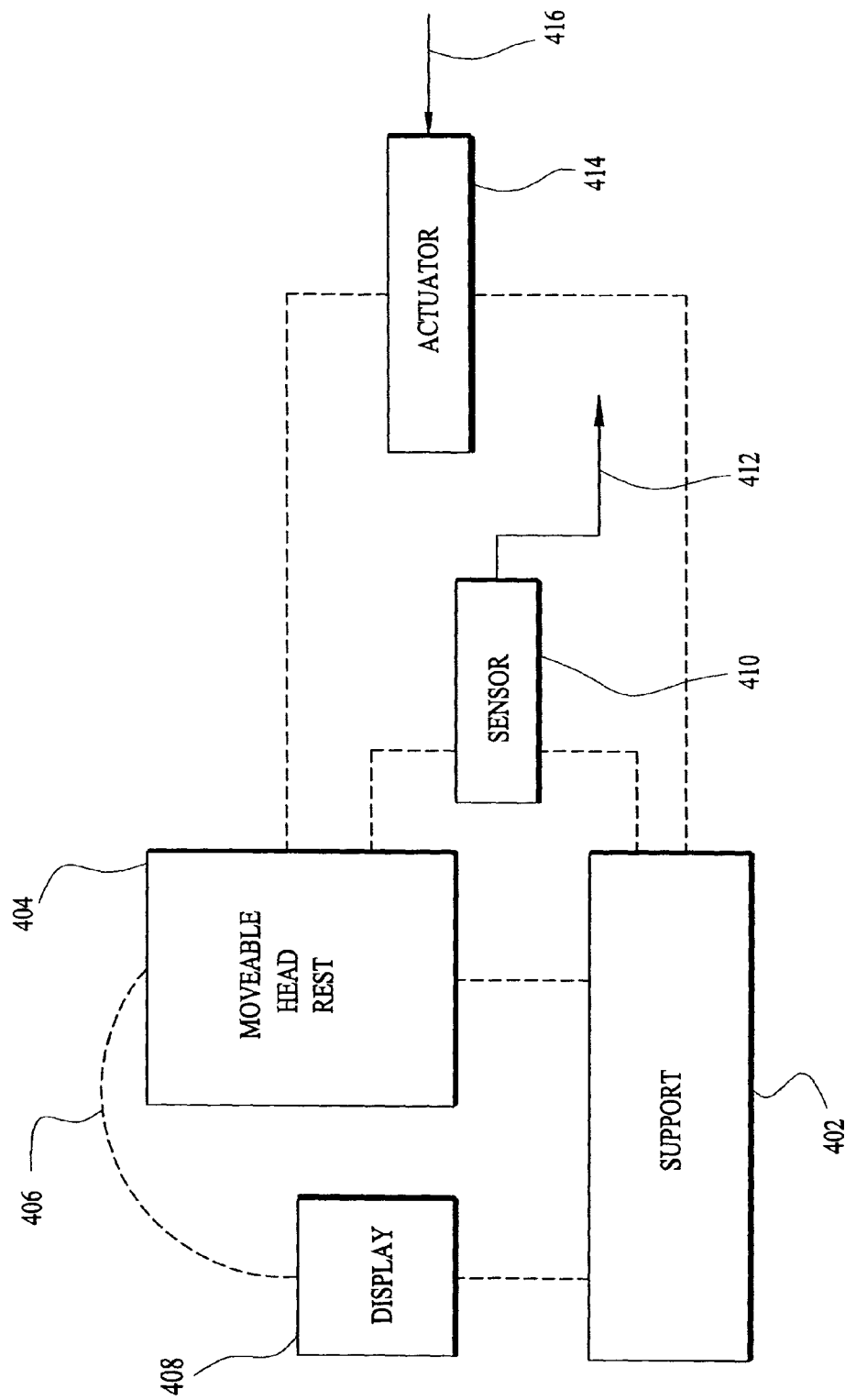
FIG. 22 shows a moveable headrest for supporting the head of a user in executing head movements while viewing images from a changing direction, according to the invention.

Although most of the embodiments shown thus far show the user in a standing or otherwise semi-erect position in a chair, it should be realized that the invention is applicable to a more relaxed position for the user. For instance, FIG. 22 shows a support 402 for supporting the body of a user and more particularly for supporting a moveable headrest 404 for supporting the back of the head 406 of the user in executing head movements while viewing images provided by a display 408 from a changing direction, i.e., a changing "direction-of-view," according to the invention. In other words, the direction, i.e., attitude of the head of the viewer actively changes or is passively changed for viewing images from a correspondingly changing direction. In the case where the moveable headrest is moveable by the user actively changing the direction of his head, i.e., under his own volition, the movements are monitored by a sensor 410 for the purpose of providing an input signal on a line 412 to a reality engine (see FIGS. 32 and 33) for selecting the images according to the changing direction. In the case where the attitude of the head of the user is passively changed, the moveable headrest is moveable by an actuator 414 to change the "direction-of-view" of the head of the user in response to a command signal on a line 416 from a reality engine (see FIGS. 34 and 35) with the images changing their direction-of-view correspondingly, according to an image signal from the reality engine. Although the display 408 is shown adjacent the head 406, it should be realized that it can be apart from the head.

FIG. 23 shows a user 417 reclining on a support in the form of a recliner 402a equipped with a moveable headrest 404a with a rod 20 supported by a support 418 that is attached to or part of the support 402a. The support 418 may comprise brackets 422 through which the rod 420 is threaded. The rod may come to rest or be fixedly terminated on a stop 424. The head 406a of the user in a reclining position rests on the headrest 404a for viewing images from a changing direction-of-view provided by a display 408a which may be any kind of display. One of the many types of display that may be used is a head mounted display such as shown in U.S. Pat. No. 5,671,037. Although the recliner 402a is shown as a stationary support, it can be of the type preferably as shown in U.S. Pat. No. 5,695,406 but also as shown in other chair type simulators such as, among others, U.S. Pat. Nos. 6,056,362, 5,678,889, 3,628,829, 5,490,784, as well as others filed after the Mar. 13, 1999 U.S. parent (60/124,642) of the present application such as U.S. Pat. Nos. 6,152,828 or 6,113,500. In such cases, the translations determined in the steps of FIG. 9, particularly accelerations associated therewith, can be used to control the chair or other platform.

It should be realized that although the moveable headrest is shown supported by a support 402 which may also support the body of the user, the body of the user need not be supported by the support 402 but may be supported in some other way. In other words, the moveable headrest may equivalently be supported by a support that is different from the support provided for supporting the body of the user. For instance, the headrest might be wall-mounted and the user support positioned nearby to allow the head of the supported user to rest on the headrest in the same way as shown above while the user may lean against or stand next to the wall.

For another instance, FIG. 24 shows a user 417b secured in a standing position on a support 402b in the form of a human activity simulator such as shown in U.S. Pat. No. 5,792,031. The simulator is equipped, according to the present invention, with a moveable headrest 404b for supporting the head of the user while viewing images provided by a display 408b from a changing direction.

In yet another instance, FIG. 25 shows a user 417c seated on a support in the form of a chair 402c equipped with a moveable headrest 404c while viewing images provided by a display 408c from a changing direction, according to the invention. Although the chair 402c is shown as a stationary support, it can be of the type shown in U.S. Pat. No. 5,642,302, modified appropriately to be continuously positionable, as in the recliner of U.S. Pat. No. 5,695,406.

Figure 26:
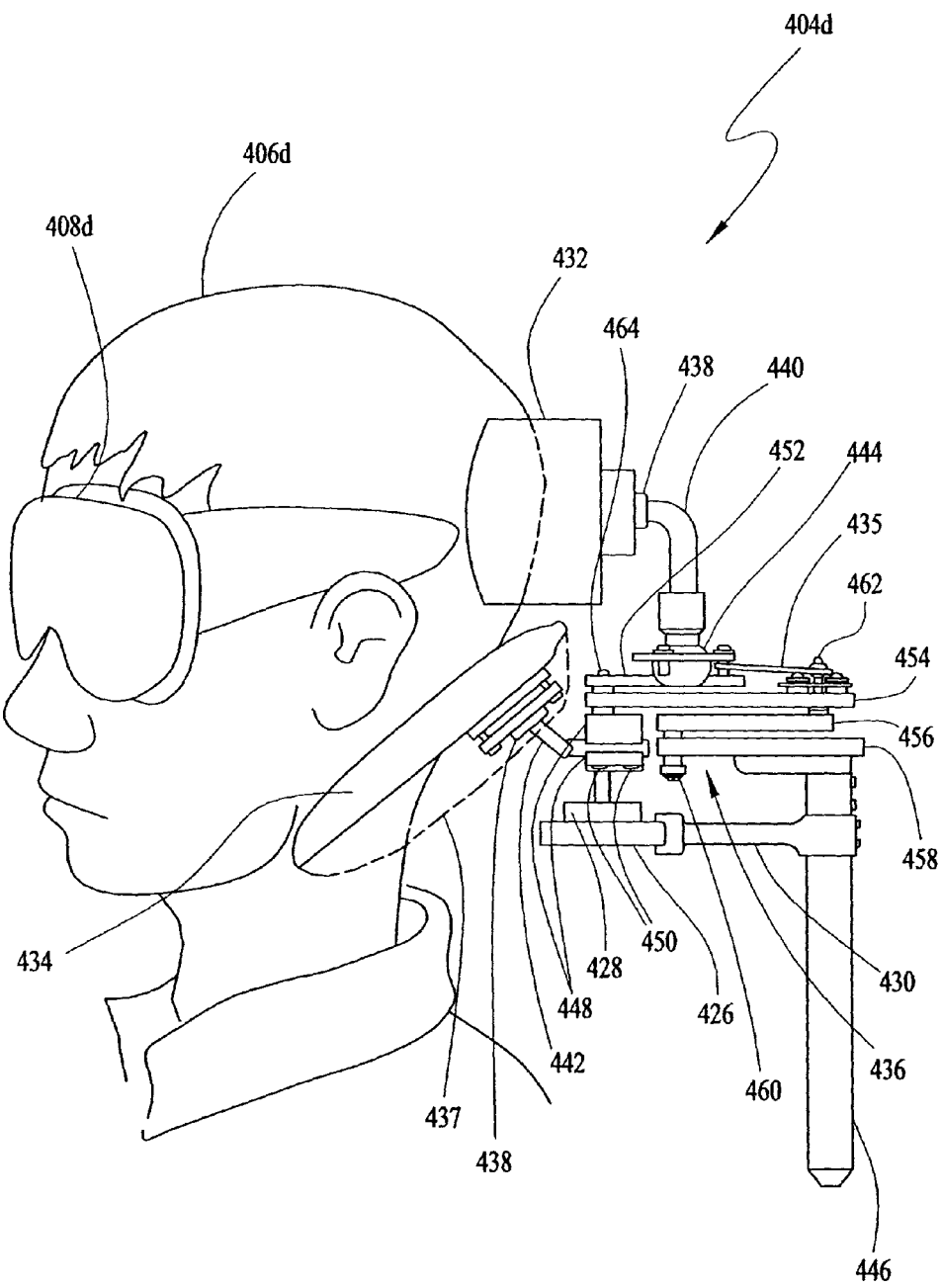
FIG. 26 shows a moveable headrest with a pivotal support assembly for supporting he head of a user in executing head movements while viewing images from a changing direction.

FIG. 26 shows a moveable headrest 404d with a pivotal support assembly for supporting the head 406d of a user in executing head movements with a changing direction-of-view while viewing images from a correspondingly changing direction-of-view. Except for the display 408d, an actuator 426, a sensor 428 and a supporting bracket 430, the hardware for the headrest structure shown in FIG. 26 and described below is taken from U.S. Pat. No. 5,791,735 of Helman entitled "Headrest assembly with user actuated pivotal support assembly." The Helman headrest is for attachment to a wheelchair seating system for use in supporting and assisting with movements of the head of a patient with weak neck muscles. It includes a cushioned backpad 432, a pair of laterally spaced apart cushioned side pads 434, and a mounting assembly 436 located substantially to the rear of said headrest. The mounting assembly 436 enables the backpad and the sidepads to rotate together as a unit about a vertical axis located forward of the mounting assembly. The mounting assembly is formed such that the vertical axis of rotation of the assembly substantially coincides with the spinal column of the human patient seated in the wheelchair. The rotational range of backpad 432 and sidepads 434 is manually adjustable and limited to a prescribed range. A force is formed with a rubber band 435 resisting rotational displacement in said backpad 432 and sidepads 434 returning said headrest to a null, forward facing orientation. The strength of the force increases with a corresponding increase in rotational displacement of the headrest. For the purposes of the present invention, the headrest assembly can be used to support the head of a user while viewing images from a controlled location.

To enable cushions 432, 434 to be positioned so that they best fit the particular user's head 406d, pivoting assemblies 438 connect the support cushions 432, 434 to structural members 440, 442, respectively. The pivoting assemblies 438 are composed off a ball and socket type joint which allows pivoting of cushions 432, 434. This pivoting action allows cushions 432, 434 to be tilted and oriented such that they best firmly contact the head of the particular user supported as shown e.g. in FIGS. 23-25, thus accommodating different shapes and sizes of heads of different users. It should be realized that the left sidepad 434 is shown unpivoted in FIG. 26 in order to show the pivoting assembly. With a human head resting against the sidepad 434 it will be tilted downward to engage the bottom of the skull of the head 406d as suggested by the dashed line 437. An additional pivoting assembly 444 connects extension member 440 to the mounting assembly 436. The mounting assembly 436 extends rearwardly of the backpad 432 and the sidepads 434 to a support mounting structure 446. Pivoting assembly 444 is composed of a ball and a socket type joint. Pivoting assembly 444 permits cushion 432 to be moved in a back and forth direction thus enabling even greater flexibility in positioning cushion 432 to the particular shape of the user's head. Side cushions 434 may also be adjusted in a back and forth direction since structural members 442 are received in a vice type bracket 448 which holds structural members 442 in place. Bolts 450 in brackets 448 can be loosened such that structural members 418 can be slid the slightly forward and backward, thus giving another dimension of movement in positioning cushions 434. After adjusting structural members 442 to the particular head shape of the user, bolts 450 are tightened in place fixing the side cushions 434 in position. Operating together, cushions 432 and 434 provide comfortable support to the rear and sides on the user's head. Balancing for the user's head is also provided by these supporting cushions.

The Helman headrest assembly provides support and balancing to the user's head not only when it is stationary, but also through limited degrees of motion. To accomplish this, the supporting cushions 432, 434 must be able to move with the rotation of the head. The mechanism to accomplish this function is found in the design of mounting assembly 436 which guides the motion of the cushions 432, 434. Mounting assembly 436 comprises a plurality of four forwardly extending arms 452, 454, 456, 458 which together comprise a linkage assembly. The movement of these forwardly extending arms with respect to one another allows the user to have freedom to rotate his head to a limited degree. The method of functioning of the forwardly extending arms 452, 454, 456 and 458 is explained in more detail in the above-mentioned U.S. Pat. No. 5,791,735 of Helman which is hereby incorporated by reference. Suffice it to say that connectors 460, 462, 464 separate the various forwardly extending arms 452, 454, 456, 458 and enable these arms to pivotally rotate freely about the points through which the respective connector passes.

As mentioned above, the user is equipped with a display 408d, according to the present invention, which provides images from a changing direction-of-view in correspondence with a changing direction-of-view of the head 6d of the user. The user's head is supported and/or guided from the rear and the user can consequently assume a relaxed posture. The display need not be of the goggle type shown in FIG. 26, but may be of any type. FIG. 27 shows the user with his head 406d oriented in a straight-ahead looking direction for viewing a central rotund part of the U.S. Capital Building in silhouette with a certain field-of-view. In FIG. 28, the field-of-view has been shifted left for viewing the left-hand side of the U.S. Capital Building. In FIG. 29, the field-of-view has been shifted right for viewing the right-hand side of the U.S. Capitol Building.

Figure 30:
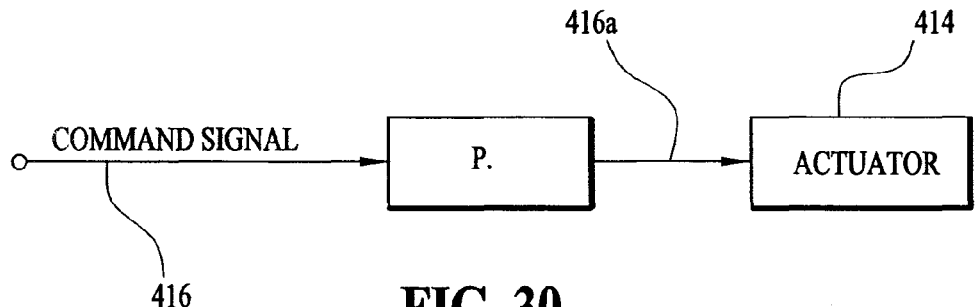
FIG. 30 shows an open-loop proportional control for a moveable headrest used passively.
Figure 31:
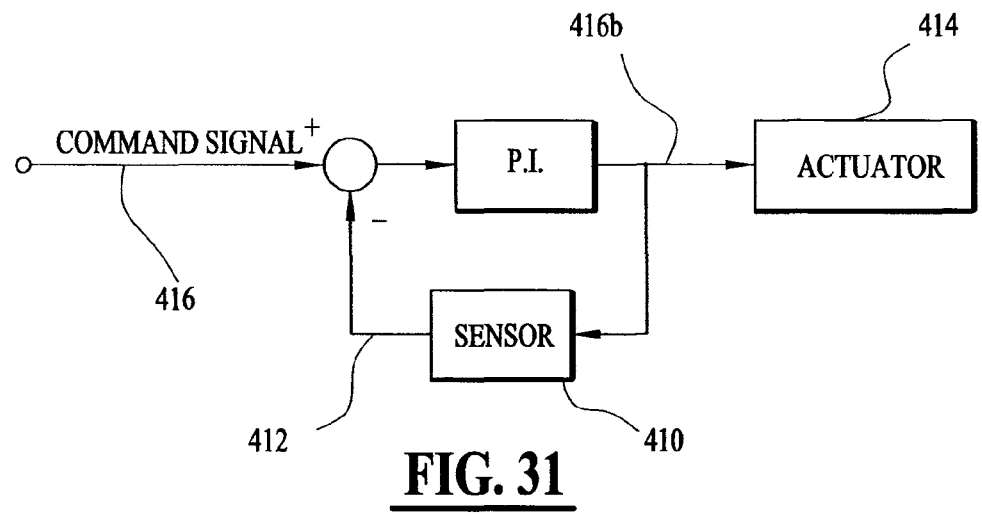
FIG. 31 shows a closed loop proportional-plus-integral control for a moveable headrest used passively.

Depending on the design, the display can be used actively only, passively only, or in a dual mode version either actively or passively. FIG. 26 shows a design in which the headrest assembly of Helman can be used either actively or passively. This is accomplished by providing both a motor 426 and a sensor 428 on the bracket 430 which is rigidly attached to the mounting structure 446. The shaft of the motor and sensor may be axially coupled and fixed to the arm 454 for rotating the arm 454 about the common axis of the motor and sensor. This causes rotations of the other arms 452, 456, 458, which are shown in more detail in U.S. Pat. No. 5,791,735 of Helman. The motor 426 may be a stepping motor, a servo motor, or the like, for use in a passive mode of operation to actuate the headrest assembly in executing headrest movements such as illustrated in FIGS. 27-29 for guiding the head 406d of the user. In that case, the sensed output signal from the sensor 426 may be unutilized (open loop control) or may be used as a feedback signal (closed loop control). An open loop control is shown in FIG. 30 with the command signal on the line 416 provided to a simple proportional amplifier that in turn provides an amplified output signal on a line 416a to the actuator 414. On other hand, the sensor 428 may be used in an active mode of operation to sense movements of the headrest assembly such as illustrated in FIGS. 27-29 as actuated by the volitional movements of the user's head 6d. The sensor may be an RVDT or rotary potentiometer, for instance, for sensing angular displacement. A closed loop control is shown in FIG. 31 with the command signal on the line 416 provided to a summing junction where the sensed signal on the line 412 is subtracted therefrom. A difference signal is provided by the summer to a compensator such as a proportional-integral (P-I) compensator that in turn provides a compensated output signal on a line 416b to the actuator 414 such as the motor 426.

Figure 32:
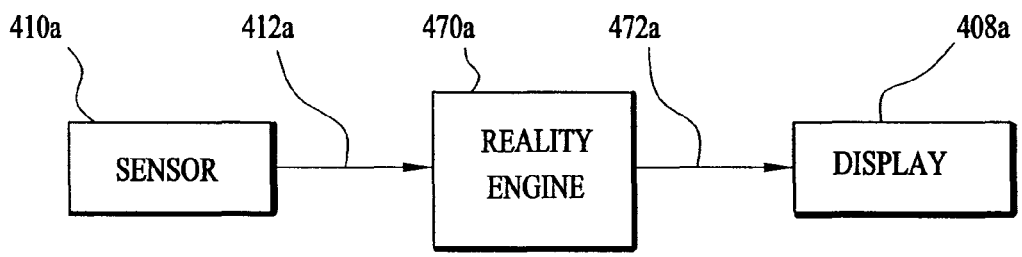
FIG. 32 shows hardware setup for active use of the moveable headrest, i.e., with the user moving his head at will.
Figure 33:
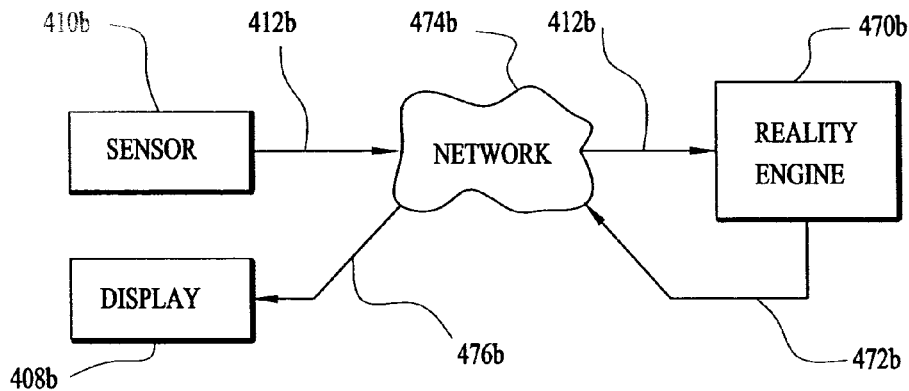
FIG. 33 is the same as FIG. 32 except that the reality engine 70b is remote and is accessed via a network 74b.

FIG. 32 shows hardware setup for active use of the moveable headrest, i.e., with the user moving his head at will. A sensor 410a provides a senses signal on a line 412a to a local reality engine 470a which, in response thereto, retrieves an image sequence from a memory therein having a plurality of such stored sequences. The signal on the line 412a is comparable to the signal on the line 28 of FIG. 3 of U.S. Pat. No. 5,644,324. The retrieved sequence is provided on a line 472a to a display 408a for viewing by the active user. The reality engine 408a may be embodied in a local computer or a remote computer accessible through a network 474b, as shown in FIG. 33. In the example of FIG. 32, the active user moves his head and the headrest follows. The sensor 410a senses the angular rotation of the headrest and provides the sensed signal on the line 412a to the reality engine 470a which in turn provides the retrieved sequence on the line 472a to the display 408a. The retrieved sequence of images are taken from different directions of view, corresponding to the viewer's active head movements. The images are presented from differing directions of view according to the active user's head movements to make him feel that he is moving his head and viewing the virtual world in the same way he views the real world. FIG. 33 is the same as FIG. 32 except that the reality engine 470b is remote and is accessed via a network 474b. The reference numerals are similar to those of FIG. 32 except with the "be" suffix.

Figure 34:
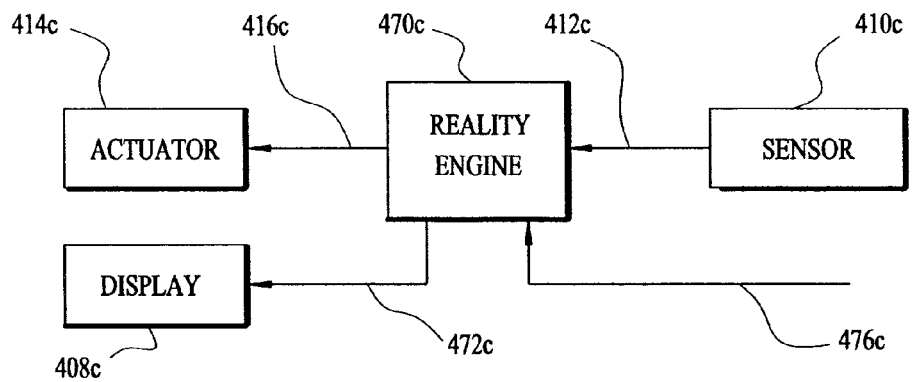
FIG. 34 shows passive use of the moveable headrest with an actuator 14c moving the headrest and hence the user's head in response to a signal on a line 16c from a local reality engine 70c.
Figure 35:
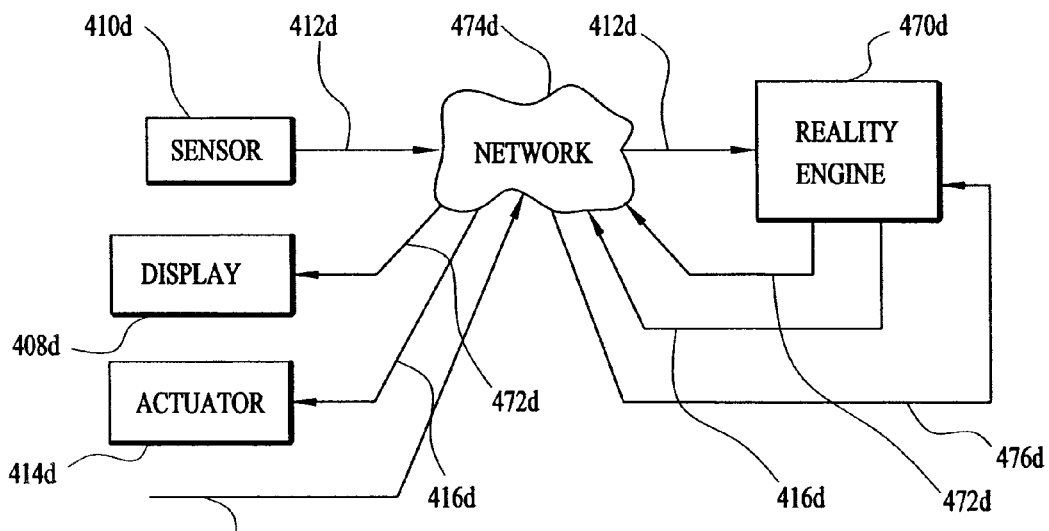
FIG. 35 is the same as FIG. 34 except the reality engine is remote.

FIG. 34 shows passive use of the moveable headrest with an actuator 414c moving the headrest and hence the user's head in response to a signal on a line 416c from a local reality engine 470c. The signal on the line 416c is comparable to the signal on the line 20 of FIG. 1 of U.S. Pat. No. 5,734,421. The sensor 490c provides the sensed signal on the line 412c to the local reality engine 470c as a feedback signal, for closed loop control. For a headrest that is only to be used for passive users, it should be realized that a sensor is not absolutely necessary since open loop control of the headrest will work. In the case of passive use, the reality engine retrieves a single, pre-planned image sequence from a memory therein, in response to a start command signal on a line 476c. The start command signal on the line 476c can originate with the passive viewer pressing a button, voicing a speech command, having his eyes monitored, by some combination of such commands, or the like. The retrieved sequence is provided on a line 472c to a display 408c for viewing by the passive user. The reality engine 470c may be embodied in a local computer or a remote computer accessible through the network 474d, as shown in FIG. 35. FIG. 35 is the same as FIG. 34 except the reality engine is remote and accessed via a network 474d. The reference numerals in FIG. 35 are similar to those of FIG. 34 except having the suffix "d".

Referring back to the variable magnification device 239 of FIG. 13, it should be pointed out that the provision of successive images to the eye at varying apparent distances for viewing with correspondingly varying focus (accommodation) creates a granularity problem. With increasing focus, because of the limitations of man-made imaging technology, there is not any increased level of granularity available for inspection. Therefore, there can be a problem with the simulated reality of the imagery under increased focus. As suggested, the granularity of a given static man-made image of a real object is only as good as that of the imaging technology used to acquire and present it. Closer inspection with a magnifying glass or other aid to eyesight does not ultimately reveal any deeper granularity but only the limitations of the imaging technology used. This is not usually a problem for images in books, movies and other conventional media.

On the other hand, the granularity of real objects is unlimited as far as the human eye is concerned. Considering the eye itself, with increased focus, more detailed granularity of objects is always revealed. Moreover, with technological aids to the eye, e.g., the magnifying glass, the optical microscope, the electron microscope, and other tools, smaller details are always revealed.

Figure 36:
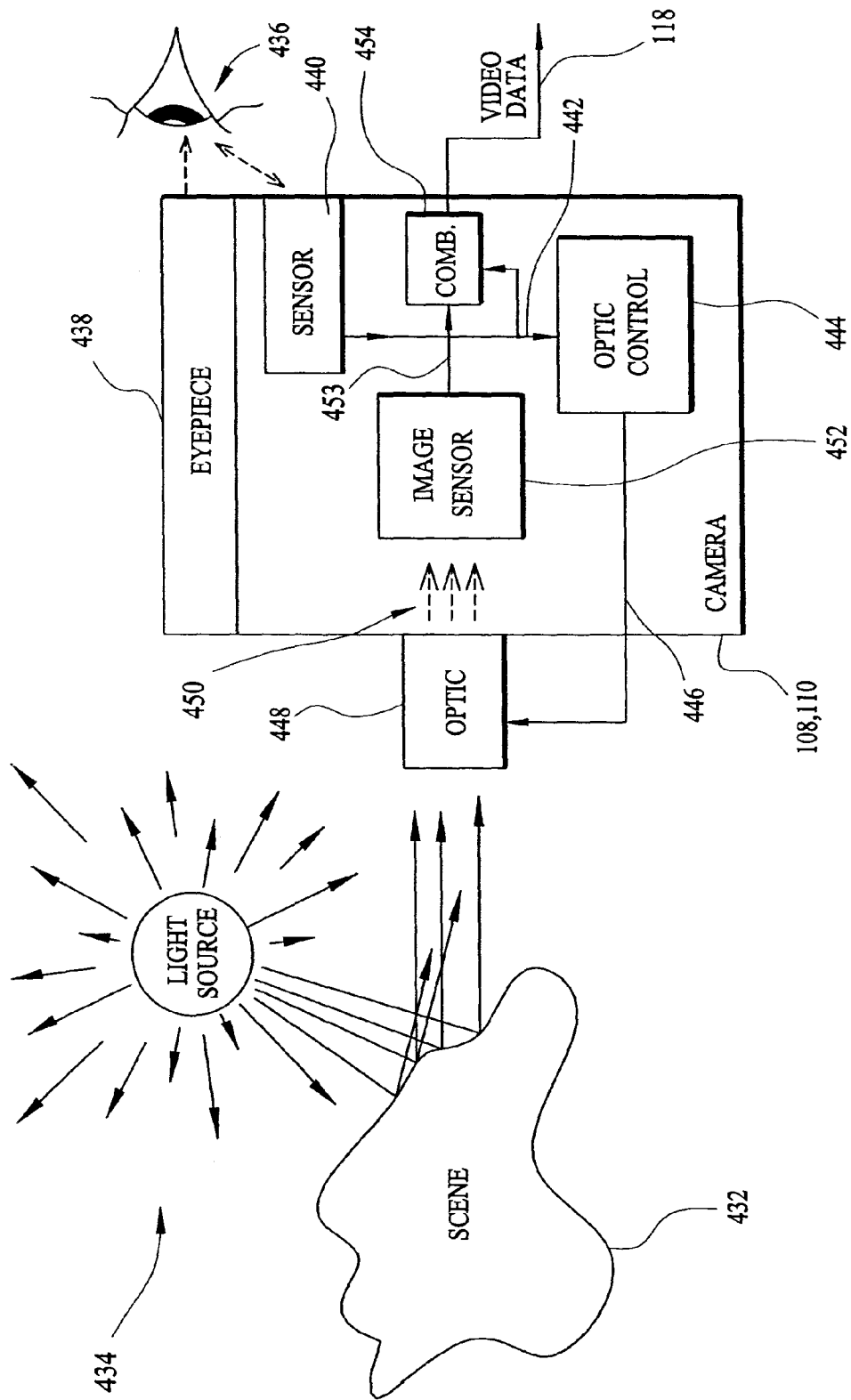
FIG. 36 shows a video camera collecting images of a scene illuminated by a light source with an eye of a cameraman shown using an eyepiece to view the scene being photographed.

Referring back to the cameras 108, 110 of FIGS. 7, 12 and 13, these can be equipped with lenses that vary the focal length according to a control signal. For instance, as shown in FIG. 36, one of the cameras 108, 110 of FIGS. 7, 12 and 13 is shown collecting images of a scene 432 illuminated by a light source 434. An eye 436 of the cameraman of FIG. 7 is shown using an eyepiece 438 for viewing the scene 432.being photographed. A sensor 440 which may take the form of one of the eye monitors 169 of FIG. 13 such as does an eye accommodation sensor senses the accommodation of the eye 436.

The sensor 440 provides a sensed signal on a line 442 to an optic control 444. The optic control 444 provides a camera optic control signal on a signal line 446 to, e.g., a motorized camera optic 448. A motorized optic is for example only and could take other forms. The optic control 444 causes the motorized optic 448 to focus on the scene 432 at differing focal lengths according to changes in the accommodation, direction, or the like, of the eye 436 as detected by the sensor 440. The optic 448 casts rays 450 on to an image sensor 452 that provides a video image signal on a line 453 to a combiner 454. It combines, e.g., in a time division multiplexed way, the image signal on the line 453 with the signal on the line 442 to form the video data signal on the line 118 of FIG. 7. As explained above, the signal on the line 442 could be provided in parallel on a separate signal line alongside the signal on the line 222. In that case, it would only carry video information.

Figure 37:
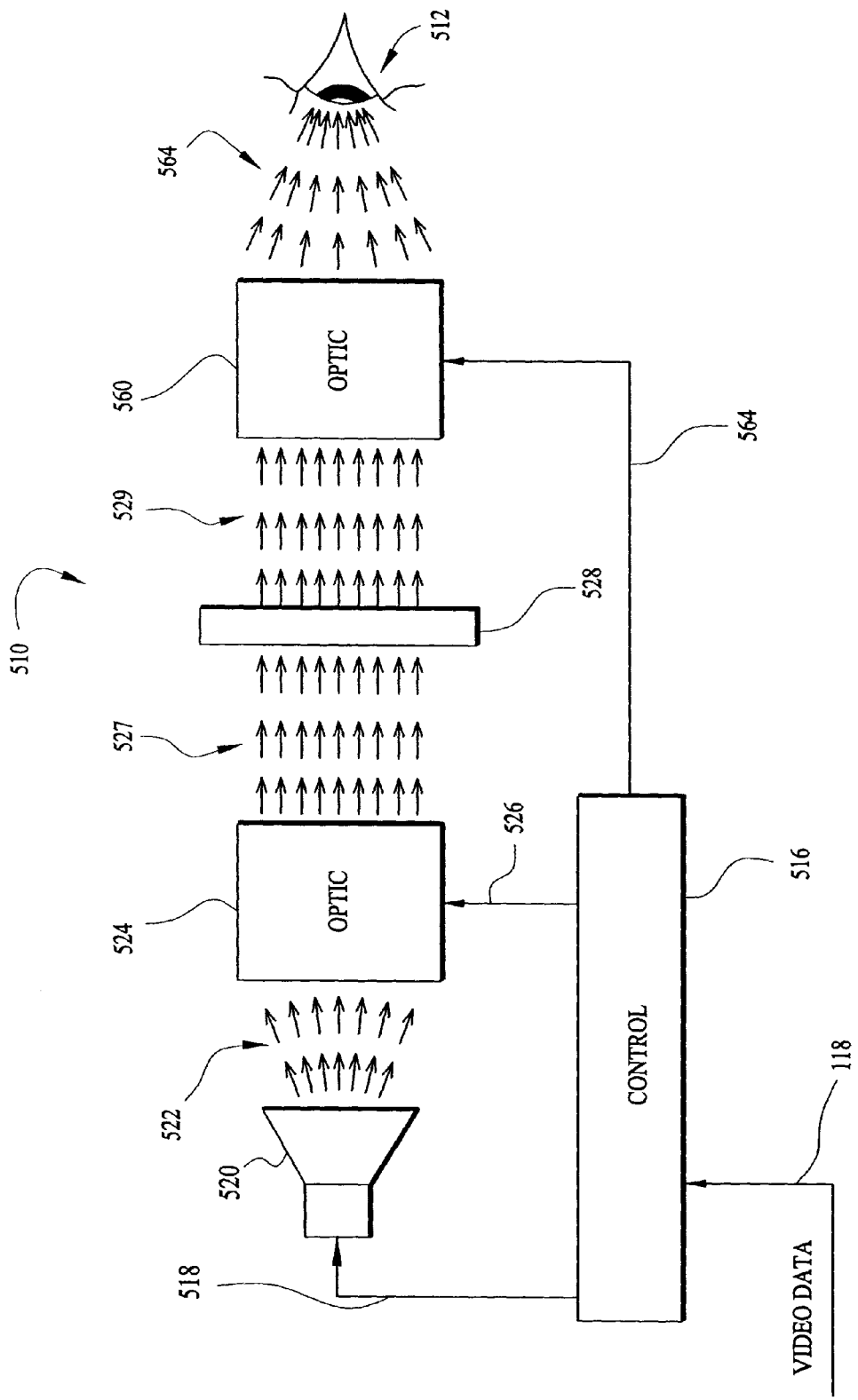
FIG. 37 shows apparatus for showing images to an eye of a user with appropriate granularity.
Figure 38:
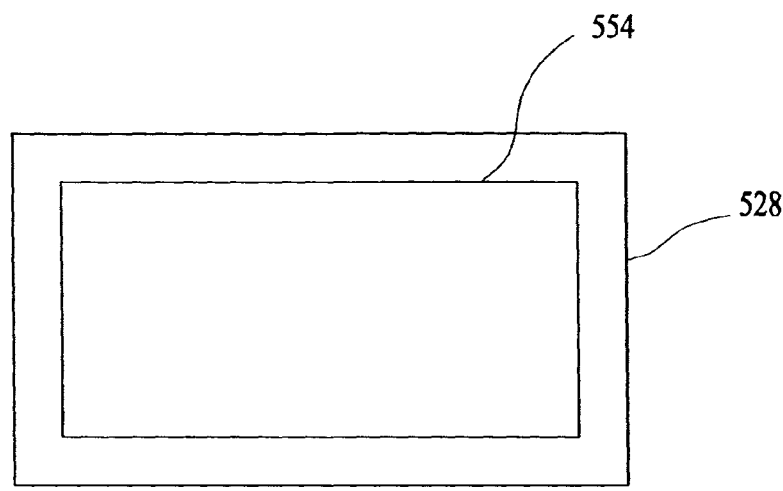
FIG. 38 shows light rays projected to form an image that fills or almost fills the entire area or extent of a screen shown in FIG. 37.
Figure 39:
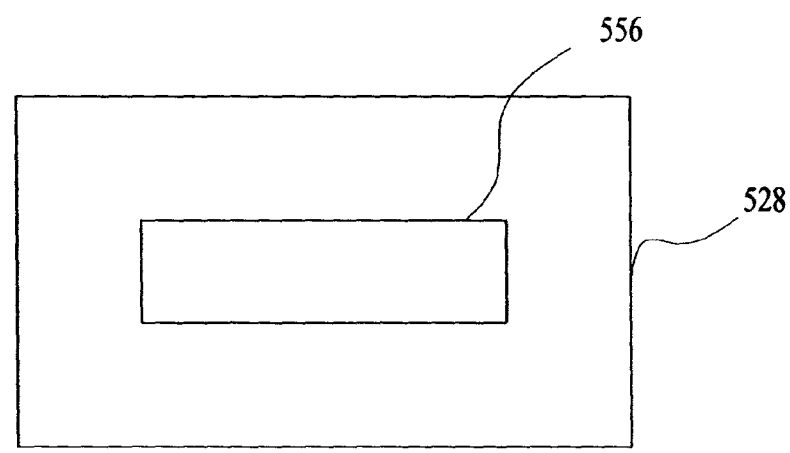
FIG. 39 shows light rays projected to form an image that only partially fills the entire extent of the screen of FIG. 37.
Figure 40:
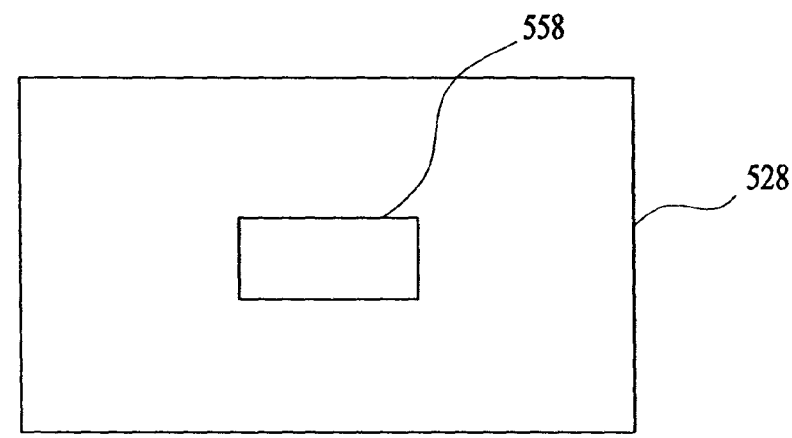
FIG. 40 shows light rays projected to form an image that only fills a small extent of the entire extent of the screen of FIG. 37.

Referring now to FIG. 37, an apparatus 510 is there shown for showing images to an eye 512 of a passive viewer such as the eye 14 of FIG. 1 or an eye of a user of the devices of FIG. 2A, 2B, 3, 4, 7, 23, 24, or 25. A video signal is received on the line 118 by a control 516 similar to the controls 224 and 205 of FIG. 7, for example. The video signal contains image information which is decoded and provided on a signal line 518 to for instance an image projector 520 which projects images with first light rays 522 to a first optic 524. The first optic 524 may for instance be a lens that is under the control of a control signal on a line 526 from the control 516. The control signal on the line 526 is decoded by the control 516 from the video signal on the line 118. The first optic 524 refracts or otherwise bends the light rays 522 into second light rays 527 that are projected on to a screen such as a translucent screen 28 to form images of different sizes, i.e., that fill the screen 28 to a greater or lesser extent as shown in FIGS. 38-40, as discussed below. The signal on the line 118 can be provided in many different ways. For instance, it should be realized that the signal on the line 118 need not be a single line (which implies some form of multiplexing) but could be two or more signal lines.

It will also be realized from the foregoing that the control signal on the line 526 changes the projected first light rays 522 by means of the optic 524 according to changes detected in the cameraman's eye 436 of FIG. 36 by the sensor 440. In other words, the signal on the line 442 from the sensor 440 is not only used to control the optic 448 in the object space of FIG. 36, but is also used to control the optic 524 in the image space of FIG. 37 after transmission to the image space over the signal line 118. The nature of the change in the projected first light rays 522 is manifested by the manner in which the light rays 527 are projected on to the screen 528. It should be realized that the rays 527 would be reflected from a mirror before being sent to the screen 528 which could be reflective rather than transmissive. Such would result in a folded embodiment rather than the straight system shown. The examples of FIGS. 38-40 have already been referred to. If the eye 436 of FIG. 36 is detected by the sensor 440 viewing the scene 432 with a long focal distance, such as infinity, the optic control 444 causes the optic 448 to focus on a correspondingly long distance. The optic 448 focuses the scene 432 at infinity and projects the details of the scene with a wide field of view on to the image sensor 452. Consequently, the available sensor 452 pixels are spread over a relatively wide field of view. In other words, the granularity of the image is spread over a wide field of view. FIG. 38 shows the second light rays 527 projected to form an image 554 that fills or almost fills the entire area or extent of the screen 528.

If the eye 436 of FIG. 36 is detected by the sensor 440 viewing the scene 432 with a lesser focal distance such as an intermediate focal distance, the optic control 444 causes the optic 448 to focus at a correspondingly intermediate distance. The optic 448 focuses the scene 432 at the intermediate distance and projects the details of the scene with an intermediate field of view on to the image sensor 452. Consequently, the granularity, i.e., the available sensor pixels are spread over a relatively intermediate field of view. FIG. 39 shows the second light rays 527 projected to form an image 556 that only partially fills the entire extent of the screen 528.

If the eye 436 of FIG. 36 is detected by the sensor 440 viewing the scene 432 with a short focal distance, the optic control 444 causes the optic 448 to focus at a correspondingly short distance. The optic 448 focuses the scene 432 at a correspondingly short distance and projects the details of the scene with a narrow field of view on to the image sensor 452. Consequently, the available sensor pixels are spread over a relatively narrow field of view. Particular objects within the narrowed field of view of FIG. 40 can be viewed with more granularity than those same objects could be with the granularity provided by that of FIG. 39 and even more so than that of FIG. 38. FIG. 40 shows the result of the second light rays 527 projected to form an image 558 that only fills a small extent of the entire extent of the screen 528.

Referring back to FIG. 37, as explained above, the second light rays 527 are projected on to the screen 528 with different areas or extents 554, 556, 558, all of which have the same total number of pixels. These are transmitted as a third bundle of rays 529 to an optic 560. The advantage of this feature of the invention is that with the aid of the optic 560, the field of view of the eye 512 of the viewer can be fully occupied with all of these pixels even though the accommodation of the eye changes. The total number of pixels can be spread over the full extent of the retina in all cases by a combination of changes in the focal length of the optic 560 and the accommodation of the eye 512. When the optic 448 focuses in on a detail of the wider scene 432, it increases the granularity of the imaged scene in that area. At the same time, the optic 524 causes the size of the image to be reduced on the screen 528 as shown, e.g., in FIG. 39 or 40. In other words, when the focal length of the optic 448 is shortened to capture a narrowed field of view of the scene 432 with increased magnification, the granularity of that smaller portion of the imaged scene increases as manifested in a smaller area on the screen 528 as controlled by the optic 524 and signal 526. At the same time, the focal length of the optic 560 is controlled by a control signal on a line 564 from the control 516 to allow the eye 512 to accommodate, i.e., to focus closer on to the scene with increased granularity in the area of interest. In other words, at the same time that the control signal on the line 526 causes the optic 524 to reduce the extent to which the screen 28 is filled by imagery (see FIG. 39 or 40), the signal on the line 564 causes the optic 560 to reduce the field of view provided for the eye 512, e.g., by increasing its magnification. Thus, the optic 560 refracts third rays 529 to provide fourth light rays 564 in such a way that the eye 512 must change its accommodation so as to bring the image into focus on the reduced size imagery. This causes the field of view of the eye 512 to be reduced but fully occupied with an up-close image while taking full advantage of the available granularity.

If the cameraman's eye 436 changes to a long view of the scene 432, as explained above, the image 554 fills the screen 528 because of the control signal on the line 526 causing the optic 524 to expand the extent to which the screen 28 is filled by imagery. At the same time, the signal on the line 564 causes the optic 560 to expand the field of view provided for the eye 512, e.g., by reducing its magnification or increasing its focal length. The eye 512 changes its accommodation accordingly.

In other words, when the control signal on the line 526 causes the optic 524 to increase the extent to which the screen 24 is filled by imagery, as in FIG. 38, the signal on the line 564 causes the optic 560 to increase the field of view provided for the eye 512 even further, e.g., by decreasing its magnification even more.

Similarly, although the invention has been shown and described with respect to a best mode embodiment thereof, it should be understood by those skilled in the art that various changes, omissions and deletions in the form and detail of the foregoing may be made therein without departing from the spirit and scope of the invention.

The invention claimed is:

1. A method comprising:
   decoding a light control signal comprising successive computer generated images from storage on a storage medium, said computer generated images made for passive viewing, and
   controlling light, in response to said decoded light control signal, so as to present said successive computer generated images to a viewer in a passive role in viewing said successive computer generated images in an image space, said successive computer generated images presented with a point of view having a translatory position and an orientation with respect to a frame of reference of said image space, said point of view of said successive computer generated images presented in correspondence with a changing point of view of images acquired in an object space by a device tracked changing in translatory position and orientation with respect to a frame of reference of said object, space as said device is navigated in motion in said object space, wherein said changing in translatory position comprises changing with three dimenstional translations in position of said device with respect to said frame of reference of said object space, said frame of reference of said image space corresponding to said frame of reference of said object space, said presented point of view of said successive computer generated images changing in translatory position and orientation with respect to said frame of reference of said image space in correspondence with said tracked changes in translatory position and orientation with respect to said frame of reference of said object space of said device navigated in motion in said object space.

2. The method of claim 1, wherein said successive computer generated images are stereoscopic.

3. Apparatus, comprising a playback device and a decoder for retrieving an encoded signal from a storage medium having successive images made for passive viewing stored thereon for decoding and playback to a viewer in a passive role in viewing said successive images in an image space, said successive images including successive computer generated images presented with a point of view having a translatory position and an orientation with respect to a frame of reference of said image space, said presented point of view of said successive computer generated images in correspondence with a changing point of view acquired in an object space by a device tracked changing in translatory position and orientation with respect to a frame of reference of said object space corresponding to navigation of said device in motion in said object space, wherein said changing in translatory position comprises changing with three dimensional translations in position of said device with respect to said frame of reference of said object space, said frame of reference of said image space corresponding to said frame of reference of said object space, said presented point of view of said successive computer generated images changing in said translatory position and orientation with respect to said frame of reference of said image space in correspondence with said tracked changes in translatory position and orientation with respect to said frame of reference of said object space of said device navigated in motion in said object space.

4. The apparatus of claim 3, wherein said successive images are stereoscopic images.

5. The method of claim 1, wherein said device is a head mounted camera.

6. The apparatus of claim 5, wherein said device is a head mounted camera.

7. The apparatus of claim 3, wherein said successive images including said successive computer generated images are produced by a computer workstation with software.

8. The apparatus of claim 3, wherein said successive images are produced by a workstation on which software is used to carry out post-production work on images of real objects taken from said device comprising a camera.

9. The apparatus of claim 8, wherein said camera comprises a head mounted camera.

10. Apparatus, comprising: a non-transitory storage medium having a signal comprising successive computer generated images made for passive viewing stored thereon and a playback device for retrieval of said successive computer generated images for presentation of said successive computer generated images to a viewer in a passive role in viewing said successive computer generated images in an image space with a point of view having a translatory position and an orientation with respect to a frame of reference of said image space, said presented point of view of said computer generated images in correspondence with a changing point of view acquired in an object space by a device tracked changing in translatory position and orientation with respect to a frame of reference of said object space as said device is navigated in motion in said object space, wherein said changing in translatory position comprises changing with three dimensional translations in position of said device with respect to said frame of reference of said object space, said frame of reference of said image space corresponding to said frame of reference of said object space, said presented point of view of said successive computer generated images changing in said translatory position and orientation with respect to said frame of reference of said image space in correspondence with said tracked changes in translatory position and orientation with respect to said frame of reference of said object space of said device navigated in motion in said object space.

11. The apparatus of claim 10, wherein said successive computer generated images are stereoscopic images.

12. The method of claim 1, wherein said successive computer generated images comprise animation.

13. The apparatus of claim 3, wherein said successive computer generated images comprise animation.

14. The apparatus of claim 10, wherein said successive computer generated images comprise animation.

15. The method of claim 1, wherein said decoding said light control signal comprises decoding a motion control signal for controlling a motion-controlled apparatus in changing in at least one of translatory position and orientation of said motion-controlled apparatus with respect to said frame of reference of said image space corresponding to said changing point of view of said presented point of view of said successive computer generated images with respect to said frame of reference of said image space corresponding to said tracked changes in translatory position and orientation of said device with respect to said frame of reference of said object space, wherein said motion control signal corresponding to tracked changes in translatory position includes one or more linear motion control signal components and wherein said motion control signal corresponding to tracked changes in orientation includes one or more of attitudinal roll, pitch, and yaw motion control signal components.

16. The apparatus of claim 3, wherein said decoding said encoded signal comprises decoding a motion control signal for controlling a motion-controlled apparatus in changing in at least one of translatory position and orientation with respect to said frame of reference of said image space corresponding to said changing point of view of said presented point of view of said successive computer generated images with respect to said frame of reference of said image space corresponding to said tracked changes in translatory position and orientation of said device with respect to said frame of reference of said object space, wherein said motion control signal corresponding to tracked changes in translatory position includes one or more linear motion control signal components and wherein said motion control signal corresponding to tracked changes in orientation includes one or more of attitudinal roll, pitch, and yaw motion control signal components.

17. The apparatus of claim 10, wherein said non-transitory storage medium comprises a motion control signal for controlling a motion-controlled apparatus in changing in at least one of translatory position and orientation of said motion-controlled apparatus with respect to said frame of reference of said image space corresponding to said changing point of view of said presented point of view of selected successive computer generated images with respect to said frame of reference of said image space corresponding to said tracked changes in translatory position and orientation of said device with respect to said frame of reference of said object space, wherein said motion control signal corresponding to tracked changes in translatory position includes one or more linear motion control signal components and wherein said motion control signal corresponding to tracked changes in orientation includes one or more of attitudinal roll, pitch, and yaw motion control signal components.

18. The method of claim 1, wherein among said successive computer generated images are a sequence of distinct visual fixation images representative of a sequence of distinct visual fixations, each distinct visual fixation image comprising distinct areas of different visual emphasis within said field of view, wherein said distinct areas of different visual emphasis change between said distinct visual fixation images by representing visually emphasized areas moving about within said field of view during said representation of said distinct visual fixations among said successive images.

19. The apparatus of claim 3, wherein among said successive computer generated images are a sequence of distinct visual fixation images representative of a sequence of distinct visual fixations, each distinct visual fixation image comprising distinct areas of different visual emphasis within said field of view, wherein said distinct areas of different visual emphasis change between said distinct visual fixation images by representing visually emphasized areas moving about within said field of view during said representation of said distinct visual fixations among said successive images.

20. The apparatus of claim 10, wherein among said successive computer generated images are a sequence of distinct visual fixation images representative of a sequence of distinct visual fixations, each distinct visual fixation image comprising distinct areas of different visual emphasis within said field of view, wherein said distinct areas of different visual emphasis change between said distinct visual fixation images by representing visually emphasized areas moving about within said field of view during said representation of said distinct visual fixations among said successive images.

21. The method of claim 1, wherein said device is navigated by a person free to walk about with said device in navigating said device in motion, wherein said changes in translatory position and orientation of said device navigated in motion in said object space are tracked with respect to said frame of reference of said object space by one or more tracking methods based on at least one of gyro, accelerometer, radio, magnetic, and light beam types of sensors.

22. The apparatus of claim 3, wherein said device is navigated by a person free to walk about with said device in navigating said device in motion, wherein said changes in translatory position and orientation of said device navigated in motion in said object space are tracked with respect to said frame of reference of said object space by use of one or more sensors including at least one of gyro, accelerometer, radio, magnetic, and light beam types of sensors.

23. The apparatus of claim 10, wherein said device is navigated by a person free to walk about with said device in navigating said device in motion, wherein said changes in translatory position and orientation with respect to said frame of reference of said object space of said device navigated in motion in said object space are tracked by use of one or more sensors including at least one of gyro, accelerometer, radio, magnetic, and light beam types of sensors.

24. The apparatus of claim 10, wherein said device is a head mounted camera.

* * * * *

UNITED STATES PATENT AND TRADEMARK OFFICE
CERTIFICATE OF CORRECTION

PATENT NO. : 8,384,777 B2  
APPLICATION NO. : 12/714472  
DATED : February 26, 2013  
INVENTOR(S) : Francis J. Maguire, Jr.

Page 1 of 1

It is certified that error appears in the above-identified patent and that said Letters Patent is hereby corrected as shown below:

In the Claims

Column 33, line 31 (claim 1, line 18): cancel "object, space" and substitute --object space--;

Column 34, line 10 (claim 6, line 1): cancel "claim 5" and substitute --claim 3--; and Column 34, line 24 (claim 10, line 4): cancel "said successive" and substitute --said signal comprising successive--.

Signed and Sealed this
Sixteenth Day of September, 2014

Michelle K. Lee
*Deputy Director of the United States Patent and Trademark Office*